United States Patent
Kuge et al.

(10) Patent No.: US 11,202,332 B2
(45) Date of Patent: Dec. 14, 2021

(54) TERMINAL APPARATUS, AMF, SMF, CORE NETWORK APPARATUS, AND COMMUNICATION CONTROL METHOD

(71) Applicants: SHARP KABUSHIKI KAISHA, Sakai (JP); FG Innovation Company Limited, Tuen Mun (HK)

(72) Inventors: Yoko Kuge, Sakai (JP); Masafumi Aramoto, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 152 days.

(21) Appl. No.: 16/612,040

(22) PCT Filed: May 9, 2018

(86) PCT No.: PCT/JP2018/017978
§ 371 (c)(1),
(2) Date: Nov. 8, 2019

(87) PCT Pub. No.: WO2018/207839
PCT Pub. Date: Nov. 15, 2018

(65) Prior Publication Data
US 2021/0136854 A1    May 6, 2021

(30) Foreign Application Priority Data
May 9, 2017    (JP) .............................. JP2017-092902

(51) Int. Cl.
*H04W 76/19*    (2018.01)
*H04W 76/30*    (2018.01)
*H04W 80/10*    (2009.01)

(52) U.S. Cl.
CPC ........... *H04W 76/19* (2018.02); *H04W 76/30* (2018.02); *H04W 80/10* (2013.01)

(58) Field of Classification Search
CPC ..... H04W 76/19; H04W 76/30; H04W 80/10; H04W 76/20; H04W 88/14; H04W 76/11
See application file for complete search history.

(56) References Cited

U.S. PATENT DOCUMENTS 10,779,345 B2 * 9/2020 Faccin .................. H04W 36/22
10,827,553 B2 * 11/2020 Zhang .................. H04W 76/19
(Continued)

OTHER PUBLICATIONS

3rd Generation Partnership Project; Technical Specification Group Services and System Aspects; Study on Architecture for Next Generation System (Release 14); 3GPP TR 23.799 V14.0.0 (Dec. 2016).
(Continued)

*Primary Examiner* — Will W Lin
(74) *Attorney, Agent, or Firm* — ScienBiziP, P.C.

(57) ABSTRACT

To provide a control apparatus or a terminal apparatus included in a communication system with a preferable measure for session management, a preferable communication control measure for establishing a session corresponding to a session continuation mode, or a preferable communication control measure for session control. With this configuration, the control apparatus or the terminal apparatus included in the communication system is provided with a session anchor relocation procedure corresponding to a mode relating to continuation of a preferable session, a communication control measure, and a management measure.

4 Claims, 19 Drawing Sheets

(56) References Cited

U.S. PATENT DOCUMENTS

| | | | |
|---|---|---|---|
| 2018/0270715 A1* | 9/2018 | Lee ................... | H04W 36/0011 |
| 2018/0270888 A1* | 9/2018 | Faccin ................. | H04W 76/15 |
| 2019/0150219 A1* | 5/2019 | Wang ................... | H04W 76/30 |
| | | | 370/329 |
| 2020/0275510 A1* | 8/2020 | Zhang .................. | H04W 76/11 |

OTHER PUBLICATIONS

3rd Generation Partnership Project; Technical Specification Group Services and System Aspects; System Architecture for the 5G System;Stage 2 (Release 15); 3GPP TS 23.501 V0.4.0 (Apr. 2017).

3rd Generation Partnership Project; Technical Specification Group Services and System Aspects; Procedures for the 5G System; Stage 2 (Release 15); 3GPP TS 23.502 V0.3.0 (Mar. 2017).

3rd Generation Partnership Project; Technical Specification Group Services and System Aspects; Procedures for the 5G System; Stage 2 (Release 15); 3GPP TS 23.502 V0.3.0 (Mar. 2017) pp. 29-51.

Huawei, Hisilicon, "TS 23.502: Selection of same SMF in UPF relocation procedure for SSC mode 3 with multiple PDU sessions", S2-171865, SA WG2 Meeting #120, Mar. 27-31, 2017, Busan, South Korea.

Interdigital, "PDU session association In SSC mode 2 and SSC mode 3", S2-171972, SA WG2 Meeting #120, Mar. 27-31, 2017, Busan, Korea.

* cited by examiner (b)

| SUPI |
|---|
| RM State |
| GUTI |
| ME Identity |

(c)

| DNN |
|---|
| Assigned Session Type |
| IP Address(es) |

(d)

| EPS Bearer ID |
|---|
| TI |
| TFT |

| SUPI |
|---|
| MSISDN |
| RM State |
| GUTI |
| ME Identity |
| UE Radio Access Capability |
| UE Network Capability |
| MS Network Capability |
| Access Restriction |
| MME F-TEID |
| SGW F-TEID |
| eNB Address |
| MME UE S1AP ID |
| eNB UE S1AP ID |
| AN node Address |
| AN node ID |

| |
|---|
| DNN |
| Assigned Session Type |
| IP Address(es) |
| PGW F-TEID |
| Default bearer |

(d)

| |
|---|
| EPS Bearer ID |
| TI |
| TFT |
| SGW F-TEID |
| PGW F-TEID |
| MME F-TEID |
| eNB address |
| AN node address |
| eNB ID |
| AN node ID |

| SUPI |
|---|
| ME Identity |
| MSISDN |
| MME F-TEID |
| SGW F-TEID |

(c)

| DNN |
|---|
| Assigned Session Type (Assigned PDN Type) |
| SGW F-TEID |
| PGW F-TEID |
| Default Bearer |
| IP Address(es) |

(d)

| EPS Bearer ID |
|---|
| TFT |
| PGW F-TEID |
| SGW F-TEID |
| eNB F-TEID |
| MME address |
| AN node address |
| MME ID |
| AN node ID |

| SUPI |
|---|
| ME Identity |
| MSISDN |
| RAT type |

(c)

| DNN |
|---|

(d)

| Assigned Session Type |
|---|
| IP Address(es) |
| SGW F-TEID |
| PGW F-TEID |
| Default Bearer |

(e)

| EPS Bearer ID |
|---|
| TFT |
| SGW F-TEID |
| PGW F-TEID |

FIG. 12

TERMINAL APPARATUS, AMF, SMF, CORE NETWORK APPARATUS, AND COMMUNICATION CONTROL METHOD

TECHNICAL FIELD

The present invention relates to a terminal apparatus, an AMF, an SMF, a core network apparatus, and a communication control method. This application claims priority based on JP 2017-92902 filed on May 9, 2017 in Japan, the contents of which are incorporated herein in its entirety by reference.

BACKGROUND ART

The 3rd Generation Partnership Project (3GPP), which undertakes activities for standardizing recent mobile communication systems, discusses System Architecture Evolution (SAE), which is the system architecture of Long Term Evolution (LTE). The 3GPP is in the process of creating specifications for the Evolved Packet System (EPS) as a communication system for realizing an all-Internet Protocol (IP) architecture. Note that a core network constituting the EPS is called an Evolved Packet Core (EPC).

In recent years, the 3GPP also discusses next generation communication technology or system architecture of the 5th Generation (5G) mobile communication system that is a next generation mobile communication system, where Architecture and Security for Next Generation System (NextGen) is discussed as a next generation communication technology. Furthermore, in the 3GPP, specifications for the 5G System (5GS) is created as a system for realizing the 5G mobile communication system. In the 5GS, technical problems for connecting various terminals to a cellular network are extracted to standardize solutions.

For example, requirement conditions include optimization and diversification of a communication procedure for supporting a continual mobile communication service depending on a terminal supporting various access networks, optimization of a system architecture suitable for the optimization and diversification of the communication procedure, and the like.

CITATION LIST

Non Patent Literature

NPL 1: 3GPP TR 23.799; Technical Specification Group Services and System Aspects; Study on Architecture for Next Generation System; (Release 14)

NPL 2: 3GPP TS 23.501; Technical Specification Group Services and System Aspects; System Architecture for the 5G System; Stage 2; (Release 15)

NPL 3: 3GPP TS 23.502; Technical Specification Group Services and System Aspects; Procedures for the 5G System; Stage 2; (Release 15)

SUMMARY OF INVENTION

Technical Problem

In the 5GS, discussed is session management in the mobile communication service between a terminal and a network apparatus. More specifically, for session continuity, a PDU session anchor relocation procedure or a procedure for establishing connections to multiple anchor points have been examined in which the type of the Data Network (DN) of the connection destination of the session is not changed but the anchor point serving as the gateway to the DN is switched.

However, detailed measures for the procedure for session continuity and the procedure for switching the anchor point have not been apparent.

The present invention has been made in view of the above described circumstances, and has an object to provide measures for realizing a variety of session continuity or communication procedure measures, and the like.

Solution to Problem

A terminal apparatus according to the present invention includes: a transmission and/or reception unit; and a controller, wherein, in a PDU session anchor relocation procedure to relocate an anchor apparatus of a Packet Data Unit (PDU) session of Session and Service Continuity (SSC) mode 2, first identification information is information for indicating that re-establishment of the PDU session is necessary, second identification information is PDU session identification information associated with the PDU session of the SSC mode 2, the transmission and/or reception unit is configured to receive a PDU session release command including the first identification information and the second identification information from a core network, and the controller is configured to transmit a PDU session establishment request message including the first identification information to the core network and initiate a PDU session establishment procedure, based on reception of the PDU session release command.

The terminal apparatus according to the present invention, wherein in the PDU session anchor relocation procedure to relocate the anchor apparatus of the PDU session of SSC mode 3, the transmission and/or reception unit transmits, to the core network, the PDU session establishment request message including information for indicating a request of transmission of a route preference; and receives, from the core network, a Router Advertizement (RA) message or a PDU session establishment accept message including an IPv6 network prefix and identification information of the route preference associated with the IPv6 network prefix.

An Access and Mobility Management Function (AMF) according to the present invention includes: a transmission and/or reception unit; and a controller, wherein in a PDU session anchor relocation procedure to relocate an anchor apparatus of a Packet Data Unit (PDU) session of Session and Service Continuity (SSC) mode 2, first identification information is information for indicating that re-establishment of the PDU session is necessary, second identification information is PDU session identification information associated with the PDU session of the SSC mode 2, the transmission and/or reception unit is configured to transmit a PDU session release command including the first identification information and the second identification information to a terminal apparatus, and the controller is configured to store the second identification information and count an effective time of the second identification information by using a timer.

A Session Management Function (SMF) according to the present invention includes: a transmission and/or reception unit; and a controller, wherein in a PDU session anchor relocation procedure to relocate an anchor apparatus of a Packet Data Unit (PDU) session of Session and Service Continuity (SSC) mode 2, first identification information is information for indicating that re-establishment of a PDU session is necessary, second identification information is PDU session identification information associated with the PDU session of the SSC mode 2, the transmission and/or reception unit is configured to transmit a PDU session release command including the first identification information and the second identification information to a terminal apparatus via an Access and Mobility Management Function (AMF); and the controller is configured to store the second identification information and count an effective time of the second identification information by using a timer.

The SWF according to the present invention, wherein in the PDU session anchor relocation procedure to relocate the anchor apparatus of the PDU session of SSC mode 3, the transmission and/or reception unit receives, from the terminal apparatus via the Access and Mobility Management Function (AMF), a PDU session establishment request message including information for indicating a request of transmission of a route preference; and transmits, to the terminal apparatus via the AMF, a Router Advertizement (RA) message or a PDU session establishment accept message including an IPv6 network prefix and identification information of the route preference associated with the IPv6 network prefix.

A communication control method for a terminal apparatus according to the present invention, in a PDU session anchor relocation procedure to relocate an anchor apparatus of a Packet Data Unit (PDU) session of Session and Service Continuity (SSC) mode 2, first identification information being information for indicating that re-establishment of the PDU session is necessary, and second identification information being PDU session identification information associated with the PDU session of the SSC mode 2, the communication control method including the steps of: receiving a PDU session release command including the first identification information and the second identification information from a core network; and transmitting a PDU session establishment request message including the first identification information to the core network and initiating a PDU session establishment procedure, based on reception of the PDU session release command.

The communication control method for the terminal apparatus according to the present invention, wherein in the PDU session anchor relocation procedure to relocate the anchor apparatus of the PDU session of SSC mode 3, the communication control method comprises the steps of: transmitting, to the core network, the PDU session establishment request message including information for indicating a request of transmission of a route preference; and receiving, from the core network, a Router Advertisement (RA) message or a PDU session establishment accept message including an IPv6 network prefix and identification information of the route preference associated with the PO network prefix.

A communication control method for an Access and Mobility Management Function (AMF) according to the present invention, in a PDU session anchor relocation procedure to relocate an anchor apparatus of a Packet Data Unit (PDU) session of Session and Service Continuity (SSC) mode 2, first identification information being information for indicating that re-establishment of the PDU session is necessary, and second identification information being PDU session identification information associated with the PDU session of the SSC mode 2, the communication control method including the steps of: transmitting a PDU session release command including the first identification information and the second identification information to a terminal apparatus; and storing the second identification information and counting an effective time of the second identification information by using a timer.

A communication control method for a Session Management Function (SMF) according to the present invention, in a PDU session anchor relocation procedure to relocate an anchor apparatus of a Packet Data Unit (PDU) session of Session and Service Continuity (SSC) mode 2, first identification information being information for indicating that re-establishment of the PDU session is necessary, and second identification information being PDU session identification information associated with the PDU session of the SSC mode 2, the communication control method including the steps of: transmitting a PDU session release command including the first identification information and the second identification information to a terminal apparatus via an Access and Mobility Management Function (AMF); and storing the second identification information and counting an effective time of the second identification information by using a timer.

The communication control method for the SMF according to the present invention, wherein in the PDU session anchor relocation procedure to relocate the anchor apparatus of the PDU session of SSC mode 3, the communication control method comprises the steps of: receiving, from the terminal apparatus via the Access and Mobility Management Function (AMF), a PDU session establishment request message including information for indicating a request of transmission of a route preference; and transmitting, to the terminal apparatus via the AMF, a Router Advertizement (RA) message or a PDU session establishment accept message including an IPv6 network prefix and identification information of the route preference associated with the IPv6 network prefix.

A communication control method for a core network according to the present invention, in a PDU session anchor relocation procedure to relocate an anchor apparatus of a Packet Data Unit (PDU) session of Session and Service Continuity (SSC) mode 2, first identification information being information for indicating that re-establishment of the PIN/session is necessary, and second identification information being PDU session identification information associated with the PDU session of the SSC mode 2, the communication control method including the steps of: transmitting a PDU session release command including the first identification information and the second identification information to a terminal apparatus; and storing the second identification information and counting an effective time of the second identification information by using a timer.

The communication control method for the core network according to the present invention, wherein in the PDU session anchor relocation procedure to relocate the anchor apparatus of the PDU session of SSC mode 3, the communication control method comprises the steps of: receiving, from a terminal apparatus, a PDU session establishment request message including information for indicating a request of transmission of a route preference; and transmitting, to the terminal apparatus, a Router Advertizement (RA) message or a PDU session establishment accept message including an IPv6 network prefix and identification information of the route preference associated with the IPv6 network prefix.

A core network apparatus according to the present invention, in a PDU session anchor relocation procedure to relocate an anchor apparatus of a Packet Data Unit (PDU) session of Session and Service Continuity (SSC) mode 2, first identification information being information for indicating that re-establishment of the PDU session is necessary, and second identification information being PDU session identification information associated with the PDU session of the SSC mode 2, the core network apparatus being configured to: transmit a PDU session release command including the first identification information and the second identification information to a terminal apparatus; and store the second identification information and count an effective time of the second identification information by using a timer.

The core network apparatus according to the present invention, wherein in the PDU session anchor relocation procedure to relocate the anchor apparatus of the PDU session of SSC mode 3, the core network apparatus receives, from the terminal apparatus, a PDU session establishment request message including information for indicating a request of transmission of a route preference, and transmits, to the terminal apparatus, a Router Advertizement (RA) message or a PDU session establishment accept message including an IPv6 network prefix and identification information of the route preference associated with the IPv6 network prefix.

Advantageous Effects of Invention

According to the present invention, the terminal apparatus and each apparatus in the core network supports a variety of session continuation modes, and can realize a communication control procedure corresponding to a session continuation mode.

BRIEF DESCRIPTION OF DRAWINGS

FIG. 5 is a diagram illustrating a storage unit of the UE.

FIG. 8 is a diagram illustrating a storage unit of the AMF/MME/CPF.

FIG. 9 is a diagram illustrating the storage unit of the AMF/MME/CPF.

FIG. 11 is a diagram illustrating a storage unit of the SGW.

FIG. 12 is a diagram illustrating a storage unit of the UPF/PGW.

DESCRIPTION OF EMBODIMENTS

Figure 1:
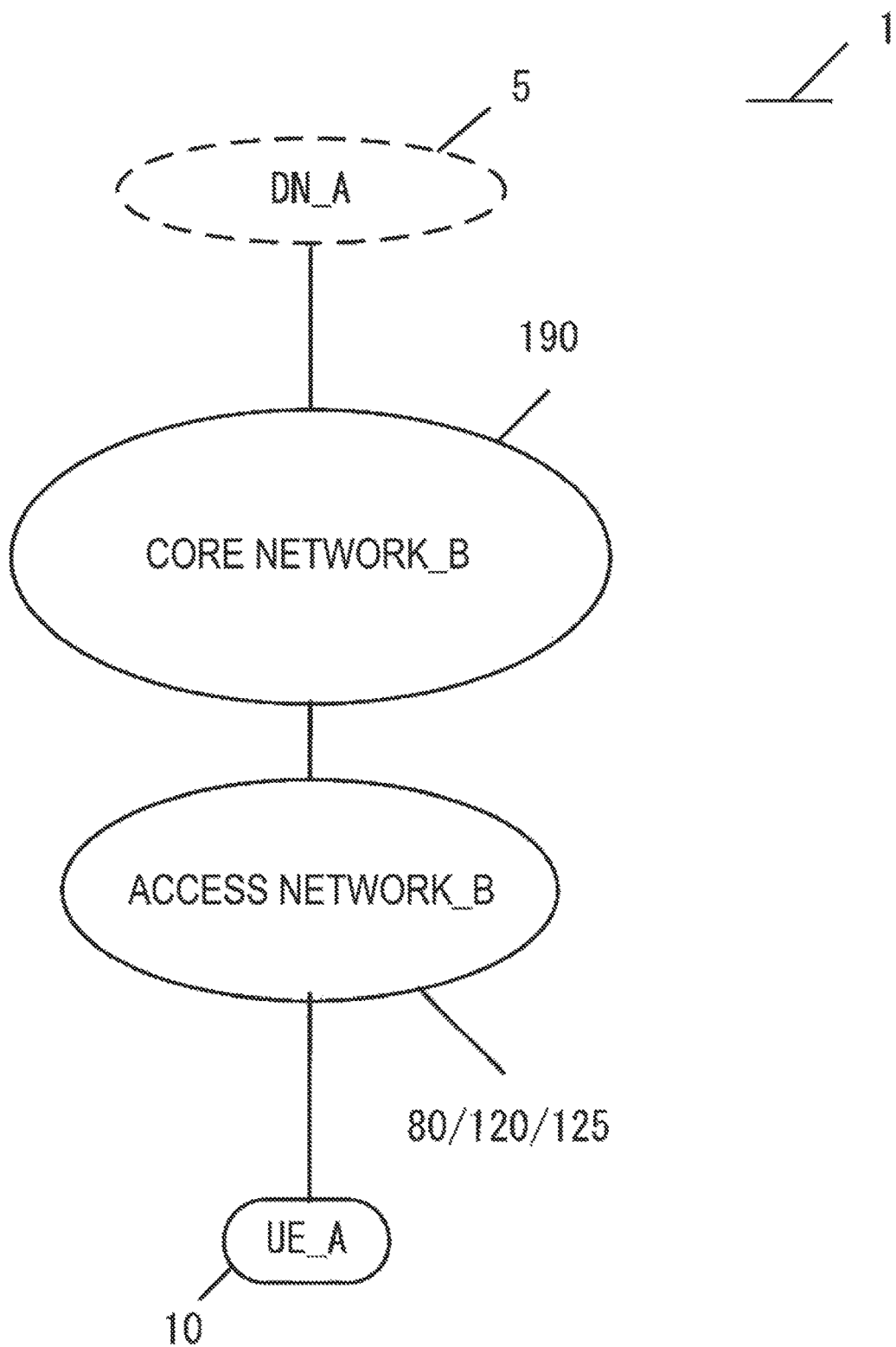
FIG. 1 is a diagram illustrating an overview of a mobile communication system.

A preferred embodiment for carrying out the present invention will be described below with reference to the drawings. Note that as an example, the present embodiment describes an embodiment of a mobile communication system to which the present invention is applied, 1. System Overview FIG. 1 is a diagram illustrating an overview of a mobile communication system according to the present embodiment. As illustrated in FIG. 1, a mobile communication system 1 includes a mobile terminal apparatus UE_A 10, an access network_B, a core network_B 190, and a Data Network (DN)_A 5. Note that the DN_A 5 may be a Packet Data Network (PDN). Here, the UE_A 10 may be any wirelessly connectable terminal apparatus, and may be a User Equipment (UE), a Mobile Equipment (ME), a Mobile Station (MS), a Cellular Internet of Things (CIoT) terminal (MT UE), or the like. Furthermore, a core network may be the core network_B 190, and an access network may be the access network_B. Furthermore, the core network may be a core network apparatus. Alternatively, in the present embodiment, the core network apparatus may be each apparatus included in the core network_B 190 and/or an apparatus that performs a part or all of processing or a function of each apparatus. The access network_B may be a 5G RAN_A 120 and/or an E-UTRAN_A 80 and/or a WLAN ANc 125.

The UE_A 10 is capable of connecting to the access network and/or the core network. Furthermore, the UE_A 10 is capable of connecting to the DN_A 5 via the access network and/or the core network, and further transmits and/or receives user data to and/or from the DN_A 5. Note that the user data may be data transmitted and/or received between the UE_A 10 and the DN_A 5. Furthermore, transmission and/or reception (communication) of the user data may be performed by using a Protocol Data Unit or Packet Data Unit (PDU) session, or by using a Packet Data Network Connection (PDN connection). Furthermore, the communication of the user data may not be limited to Internet Protocol (IP) communication, but may be non-IP communication.

Here, the PDU session or the PDN connection (hereinafter also referred to as PDN connectivity) is connectivity established between the UE_A 10 and the DN_A 5 for providing a PDU connectivity service to transmit and/or receive the user data between the UE_A 10 and the DN_A 5, or the like. More specifically, the PDU session or the PDN connection may be connectivity established between the UE_A 10 and an external gateway. Here, the external gateway may be an apparatus connecting the core network such as a User plane function (UPF)_A 235, a Packet Data Network Gateway (PGW), a User Plane Gateway (UPGW), and a Service Capability Exposure Function (SCEF) with the DN_A 5.

The PDU session or the PDN connection may be a communication path established for transmitting and/or receiving the user data between the UE_A 10 and the core network and/or the DN_A 5, or a communication path for transmitting and/or receiving the PDU. Furthermore, the PDU session or the PDN connection may be a session established between the UE_A 10 and the core network and/or the DN_A 5, or may be a logical communication path including a transfer path such as one or multiple bearers and the like between each apparatus in the mobile communication system 1. More specifically, the PDU session may be a connection established by the UE_A 10 between the UE_A 10 and the core network_B 190 and/or the external gateway, a connection established between the UE_A 10 and the UPGW or the UPF_A 235, or a connection such as a Packet Data Network Connection (PDN connection).

Note that the PDN connection may be connectivity and/or a connection between the UE_A 10 and the PGW via an evolved Node B (eNB)_A 45 and/or a Serving Gateway (SGW), or connectivity and/or a connection between the UE_A 10 and the SCEF via the eNB_A 45 and/or a Mobility Management Entity (MME). Furthermore, the PDU session may be connectivity and/or a connection between the UE_A 10 and the UPGW or the UPF_A 235 via an AN node_A 122. Note that the connectivity between the UE_A 10 and the UPF_A 235 may include one or more UPFs. Furthermore, the PDN connection may be identified by a PDN connection ID, and the PDU session may be identified by a PDU session ID, Furthermore, the PDN connection and the PDU session may be identified by an EPS bearer ID.

Note that the UE_A 10 can transmit and/or receive the user data to and/or from an apparatus located in the DN_A 5 such as an application server by using the PDU session or the PDN connection. In other words, the PDU session or the PDN connection can transfer the user data transmitted and/or received between the UE_A 10 and the apparatus located in the DN_A 5 such as an application server. Furthermore, each apparatus (the UE_A 10, apparatus in the access network, and/or apparatus in the core network) may associate one or multiple pieces of identification information with the PDU session or the PDN connection for management. Note that these pieces of identification information may include at least one of a Data Network Name (DNN), an Access Point Name (APN), a Traffic Flow Template (TFT), a session type, application identification information, identification information of the DN_A 5, Network Slice Instance (NSI) identification information, and Dedicated Core Network (DCN) identification information, and access network identification information, or may further include other information. Furthermore, in a case that multiple PDU sessions or PDN connections are established, respective pieces of identification information associated with the PDU sessions or the PDN connections may have the same content or different contents. Furthermore, the NSI identification information may be information for identifying an NSI, and hereinafter, may be an NSI ID or a Slice Instance ID, may be Network Slice Selection Assistance information (NSSAI), or may be Single Network Slice Selection Assistance information (S-NSSAI).

IP communication is communication of data using IP, and is data communication achieved through transmitting and/or receiving an IP packet which is given an IP header. Note that a payload section constituting an IP packet may include the user data transmitted and/or received by the UE_A 10. Non-IP communication is communication not using IP, and is data communication achieved through transmitting and/or receiving data which is not given an IP header. For example, non-IP communication may be the data communication achieved through transmitting and/or receiving application data not given the IP packet, or may transmit and/or receive the user data transmitted and/or received by the UE_A 10 to which another header such as a MAC header and an Ethernet (trade name) frame header is given.

Furthermore, the DN_A 5 may be a Data Network (DN) to provide a communication service to the UE_A 10. Note that the DN may be configured as a packet data service network, or configured for each service. Furthermore, the DN_A 5 may include a connected communication terminal. Therefore, connecting with the DN_A 5 may be connecting with the communication terminal or a server apparatus located in the DN_A 5. Furthermore, the transmission and/or reception of the user data to and/or from the DN_A 5 may be transmission and/or reception of the user data to and/or from the communication terminal or a server apparatus located in the DN_A 5.

Furthermore, the access network is a radio network connecting with the UE_A 10 and/or the core network. The access network may be a 3GPP access network, or a non-3GPP access network. Note that the 3GPP access network may be the Evolved Universal Terrestrial Radio Access Network (E-UTRAN)_A 80 and the Next Generation Radio Access Network (5G RAN)_A 120, and the non-3GPP access network may be the WLAN ANc 125. Note that the UE_A 10 may connect with the access network in order to connect to the core network, or may connect to the core network via the access network.

Furthermore, the core network is an IP mobile communication network run by a Mobile Network Operator to which the access network and/or the DN_A 5 connects. The core network may be a core network for the mobile network operator that runs and manages the mobile communication system 1, or may be a core network for a virtual mobile network operator such as a Mobile Virtual Network Operator (MVNO) or a Mobile Virtual Network Enabler (MVNE), or a virtual mobile communication service provider. Note that the core network_B 190 may be an Evolved Packet Core (EPC) constituting an Evolved Packet System (EPS), and a 5GCore (5GC) Network constituting a 5G Core (5GC) Network. Furthermore, the core network_B 190 may be a core network for a system providing the 5G communication service. Note that the core network_B 190 is not limited to that above described, but may be a network for providing a mobile communication service.

Figure 2:
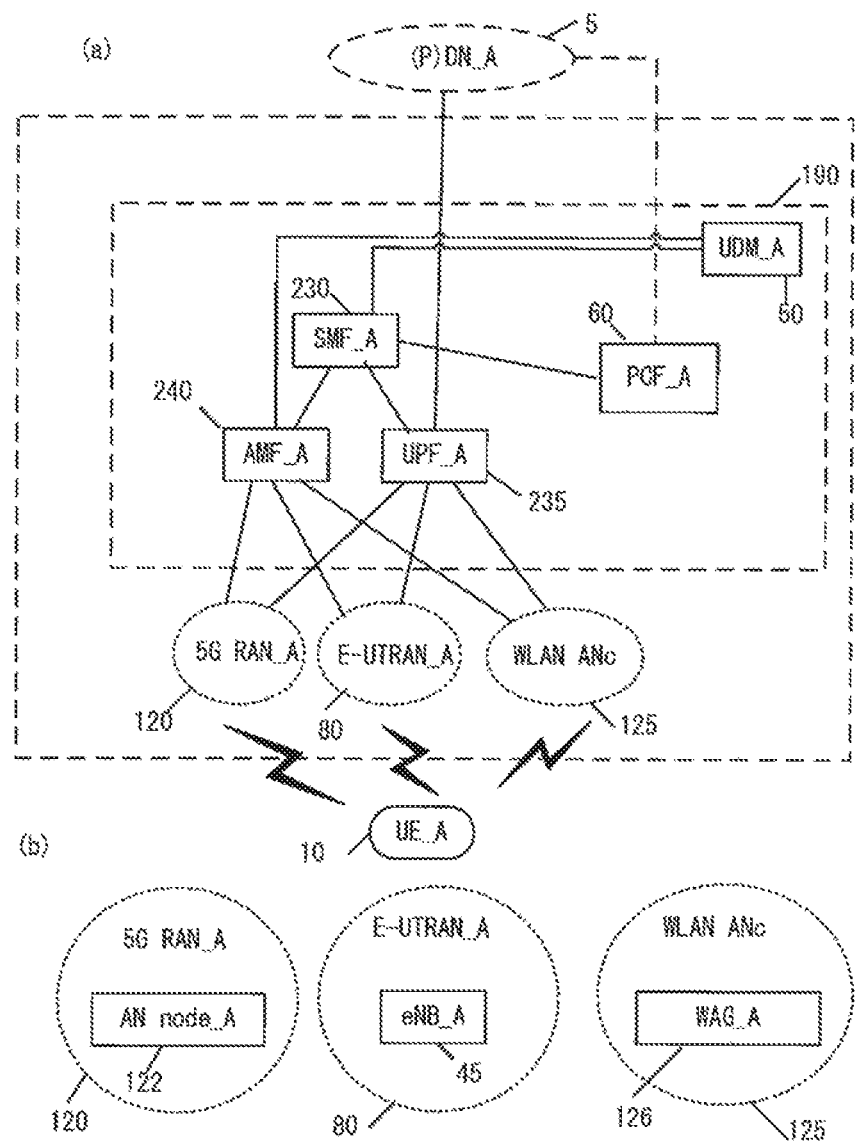
FIG. 2 is a diagram illustrating examples of a configuration or the like of a core network and an access network in the mobile communication system.

Next, a configuration example of the core network_B 190 will be described. An example of the configuration of the core network_B 190 will be described. FIG. 2 illustrates an example of the configuration of the core network_B 190. The core network_B 190 in FIG. 2(a) includes a UDM_A 50, a PCF_A 60, a Session Management Function (SMF)_A 230, a UPF_A 235, an Access and Mobility Management Function (AMF)_A 240.

Note that the SMF_A 230 and/or the AMF_A 240 may be a Control Plane Function (CPF), and the UPF_A 235 may be a User Plane Gateway (PGW).

The core network_B 190 is capable of connecting to multiple radio access networks (E-UTRAN_A 80, 5G RAN_A 120, and WLAN ANc 125). Such a radio access network may be configured to connect to multiple different access networks, or may be configured to connect to any one of the access networks. Furthermore, the UE_A 10 is capable of wirelessly connecting to the radio access network.

Furthermore, the E-UTRAN_A 80 and the 5G RAN_A 120 can be configured as access networks connectable in a 3GPP access system. Furthermore, the WLAN access network c (WLAN ANc 125) that connects to the CPF or AMF_A 240 and the UPF_A 235 can be configured as an access network connectable in the WLAN access system. Each apparatus will be described briefly below.

The UPF_A 235 is an apparatus connected to the DN_A 5, the SMF_A 230, the E-UTRAN 80, the 5G RAN_A 120, and the WLAN ANc 125, and serves as a relay apparatus configured to transfer the user data by functioning as a gateway between the DN_A 5 and the core network_B 190. In other words, the UPF_A 235 is the anchor point of the PDL session established for the UE_A 10 to deliver the user data or an anchor apparatus. Note that the UPF_A 235 may serve as a gateway for IP communication and/or non-IP communication. Furthermore, the UPF_A 235 may have a function to transfer IP communication, or may have a function to convert between non-IP communication and IP communication. Note that multiple gateways like this may be located in the core network_B 190. The multiple gateways located may serve as gateways connecting the core network_B 190 with a single DN. Note that the UPF_A 235 may have connectivity with another NF to connect to each apparatus via another NE. Note that the UPF_A 235 may be the SGW and/or the PGW and/or the UPGW.

The PGW is connected to the DN_A 5, the SGW, and the PCF_A 60, and serves as a relay apparatus configured to transfer the user data by functioning as a gateway between the DN_A 5 and the core network_B 190. Note that the PGW may serve as a gateway for IP communication and/or non-IP communication.

Furthermore, the PGW may have a function to transfer IP communication, or may have a function to convert between non-IP communication and IP communication. Note that multiple gateways like this may be located in the core network_B 190. The multiple gateways located may serve as gateways connecting the core network_B 190 with a single DN.

Note that a User Plane (U-Plane) may be a communication path for transmitting and/or receiving the user data, and may include multiple bearers. Furthermore, a Control Plane (C-Plane) may be a communication path for transmitting and/or receiving a control message, and may include multiple bearers.

Furthermore, the pciw may be connected to a UP function and a Policy function, or may be connected to the UE_A 10 via the U-Plane. Furthermore, the PGW may be configured integrally with the UPF_A 235.

The SGW is connected to the PGW, the MME, and the E-UTRAN_A 80, and serves as a relay apparatus configured to transfer the user data by functioning as a gateway between the core network_B 190 and the 3GPP access network (the E-UTRAN_A 80, the 5G RAN_A 120).

Furthermore, the SGW may be a UP function which has a contact with the access network and transfers the user data, or may be the User Plane Gateway (UPGW) that is a gateway for transferring the user data between the access network and the core network.

Furthermore, the CPF is an apparatus connected to the UPF_A 235, the R-UTRAN_A 80, the 5G RAN_A 120, the WLAN ANc 125, and the UDM_A 50. The CPF may be an NF having a function of the mobility management of the UE_A 10 or the like, an NF having a function of the session management of the PDU session or the like, or an NF managing one or multiple NSIs. The CPF may be an NE having one or multiple of these functions. Note that the NF may be one or multiple apparatus located in the core network_B 190, may be a Control Plane Function or a Control Plane Network Function (CP function) for the control information and/or the control message, or may be a common CP function (Common Control Plane Network Function (CPNF) (CCNF) shared between multiple NSIs. Note that the CPF may have connectivity with another NE to connect to each apparatus via another NF. Note that the CPF may be an MME, may be a NE having a function of the AMF_A 240 and the SMF_A 230, may be the AMF_A 240, or may be the SMF_A 230.

Furthermore, the AMF_A 240 is an apparatus connected to the SMF_A 230, the E-UTRAN_A 80, the 5G RAN_A 120, the WLAN ANc 125, and the UDM_A 50. The AMF_A 240 may be a NF serving the mobility management of the UE_A 10 or the like, or may be a NF managing one or multiple NSIs. The AMF_A 240 may be an NF having one or multiple of these functions. Note that the NE may be one or multiple apparatus located in the core network_B 190, may be a Control Plane Function or a Control Plane Network Function (CP function) for the control information and/or the control message, or may be a common CP function (Common Control Plane Network Function (CPNF) (CCNF) shared between multiple NSIs. Note that the AMF_A 240 may have connectivity with another NF to connect to each apparatus via another NF. Note that the AMF_A 240 may be a NF having a part of the function of the CPF.

Furthermore, the SMF_A 230 is an apparatus connected to the AMF_A 240, the UPF_A 235, the UDM_A 50, and the PCF_A 60. The SWF_A 230 may be a NF responsible for session management, such as a PDU session. Note that the NF may be one or multiple apparatus located in the core network_B 190, may be a Control Plane Function or a Control Plane Network Function (CP function) for the control information and/or the control message, or may be a common CP function (Common Control Plane Network Function (CPNF) (CCNF) shared between multiple NSIs. Note that the SMF_A 230 may have connectivity with another NF to connect to each apparatus via another NF. Note that the SMF_A 230 may be a NF having a part of the function of the CPF.

The MME is connected to the SGW, the access network, the HSS, and the SCEF, and is a control apparatus that performs location information management including mobility management of the UE_A 10 via the access network, and access control. Furthermore, the MME may include a function as a session management apparatus to manage a session established by the UE_A 10.

Multiple control apparatuses like this may be located in the core network_B 190, and for example, a location management apparatus different from the MME may be included in the core network_B 190. The location management apparatus different from the MME may be connected with the SGW, the access network, the SCEF, and the HSS, similarly to the MME.

In a case that multiple MMEs are included in the core network_B 190, the MMEs may be connected to each other. With this configuration, a context of the UE_A 10 may be transmitted and/or received between the MMEs. In this way, the MME is a management apparatus to transmit and/or receive the control information related to the mobility management and the session management to and/or from the UE_A 10. In other words, the MME may be a control apparatus for a Control Plane (C-Plane; CP).

Furthermore, described above is an example in which the MME is configured to be included in the core network_B 190. However, the MME may be a management apparatus included in one or multiple core networks, DCNs, or NSIs, or may be a management apparatus connected to one or multiple core networks, DCNs, or NSIs. Here, multiple DCNs or NSIs may be managed by a single network operator, or by network operators different from each other.

The MME may be a relay apparatus configured to transfer the user data by functioning as a gateway between the core network_B 190 and the access network. Note that the user data transmitted and/or received by the MME functioning as a gateway may be small data.

Furthermore, the MME may be an NF having a function of the mobility management of the UE_A 10 or the like, an NE having a function of the session management of the PDU session or the like, or an NF managing one or multiple NSIs. The MME may be an NF having one or multiple of these functions. Note that the NF may be one or multiple apparatus located in the core network_B 190, may be a CP function (hereinafter also referred to as a Control Plane Function (CPF) or a Control Plane Network Function) for the control information and/or the control message, or may be a common CP function shared between multiple NSIs.

Here, the NF is a processing function included in a network. Specifically, the NF may be a function apparatus such as the MME, the SGW, the PGW, the CPF, the UPGW, the AMF_A 240, the UPF_A 235, the SMF_A 230, and the PCF_A 60, or may be a function such as Mobility Management (MM) and Session Management (SM), or capability information. The NF may be a function apparatus to realize a single function, or a function apparatus to realize multiple functions. For example, an NF to realize the MM function and an NF to realize the SM function may be separately present, or an NF to realize both the MM function and the SM function may be present.

The SCEF is connected to the DN_A 5 and the CPF or the AMF_A 240, or to the MME and the UDM_A 50, and is a relay apparatus configured to transfer the user data by functioning as a gateway interfacing the DN_A 5 and/or the DN and the core network_B 190. Note that the SCEF may serve as a gateway for non-IP communication. Furthermore, the SCEF may have a function to convert between non-IP communication and IP communication. Multiple gateways like this may be located in the core network_B 190. Furthermore, multiple gateways connecting the core network_B 190 with a single DN_A 5 and/or DN may also be located. Note that the SCEF may be configured outside or inside the core network.

The UDM_A 50 is connected to the MME or the AMF_A 240 or the SMF_A 230, and the SCEF, and is a managing node configured to manage subscriber information. The subscriber information of the UDM_A 50 is referred to during the access control performed by the MME, for example. Furthermore, the UDM_A 50 may be connected to a location management apparatus different from the MME. For example, the UDM_A 50 may be connected to the CPF or the AMF_A 240 or the SMF_A 230.

The PCP_A 60 is connected to the UPGW or the SWF_A 230 or the PGW and the DN_A 5, and is configured to perform QoS management on data delivery. For example, the PCF_A 60 manages QoS of a communication path between the UE_A 10 and the DN_A 5. Furthermore, the PCF_A 60 may be an apparatus to create and/or manage a Policy and Charging Control (PCC) rule used by each apparatus for transmitting and/or receiving the user data, and/or a routing rule.

The PCP_A 60 may be a Policy function to create and/or manage a policy. More particularly, the PCF_A 60 may be connected to the UP function.

As illustrated in FIG. 2(*b*), each radio access network includes apparatuses to which the UE_A 10 is actually connected (such as a base station apparatus and an access point apparatus), and the like. The apparatus used in these connections can be thought of as apparatus adapted to the radio access networks.

In the present embodiment, the E-UTRAN_A 80 is an access network for Long Term Evolution (LTE) and includes the eNB_A 45. The eNB_A 45 is a radio base station to which the UE_A 10 connects through an Evolved Universal Terrestrial Radio Access (E-UTRA), and the E-UTRAN_A 80 may include one or multiple eNBs_A 45. The multiple eNBs may be connected to each other.

Furthermore, the 5G RAN_A 120 is a 5G access network, and includes a New Radio Access Technology node (AN node)_A 122. The AN node_A 122 is a radio base station to which the UE_A 10 connects through a Next Generation Radio Access (NextGen RA), and the 5G RAN_A 120 may include one or multiple AN nodes_A 122. Note that in a case that the 5G RAN_A 120 includes multiple AN nodes_A 122, the 5G RAN_A 120 may include the AN node_A 122 and an AN node_B 123. In this case, the AN node_B 123 may have the same configuration as the configuration of the AN node_A 122.

Furthermore, the 5G RAN_A 120 may be an access network including the E-UTRA and/or the NextGen RA. In other words, the 5G RAN_A 120 may include the eNB_A 45, the AN node_A 122, or both the eNB_A 45 and the AN node_A 122. In this case, the eNB_A 45 and the AN node_A 122 may be similar apparatuses. Therefore, the AN node_A 122 can be substituted with the eNB_A 45.

Note that the 5G RAN_A 120 may be a 5G Radio Access Network (5G-RAN) or a 5GAccess Network (5G-AN). In other words, the 5G RAN_A 120 may be expressed as the NextGen RAN and/or the 5G-AN, or the NextGen RAN and/or the 5GN-AN may be expressed as the 5G RAN_A 120.

The WLAN ANc 125 is a radio LAN access network, and includes a WAG_A 126. The WLAN Access Gateway (WAG)_A 126 is a radio base station to which the UE_A 10 connects through a radio LAN access, and the WLAN ANc 125 may include one or multiple WAGs_A 126. Furthermore, the WAG_A 126 may serve as a gateway between the core network_B 190 and the WLAN ANc 125. The WAG_A 126 may include a function unit for the radio base station, and a function unit for the gateway, which are configured as different apparatus.

Note that herein, the expression "the UE_A 10 is connected to each radio access network" is equivalent to "the UE_A 10 is connected to a base station apparatus, an access point, or the like included in each radio access network," and is equivalent to "data, signals, and the like transmitted and/or received also pass through the base station apparatus and the access point." Note that the control message transmitted and/or received between the UE_A 10 and the core network_B 190 may be the same control message, irrespective of a type of the access network. Therefore, the expression "the UE_A 10 and the core network_B 190 transmit and/or receive a message to and/or from each other via the AN node_A 122" may be equivalent to "the UE_A 10 and the core network_B 190 transmit a message to each other via the eNB_A 45 and/or the WAG_A 126."

Figure 3:
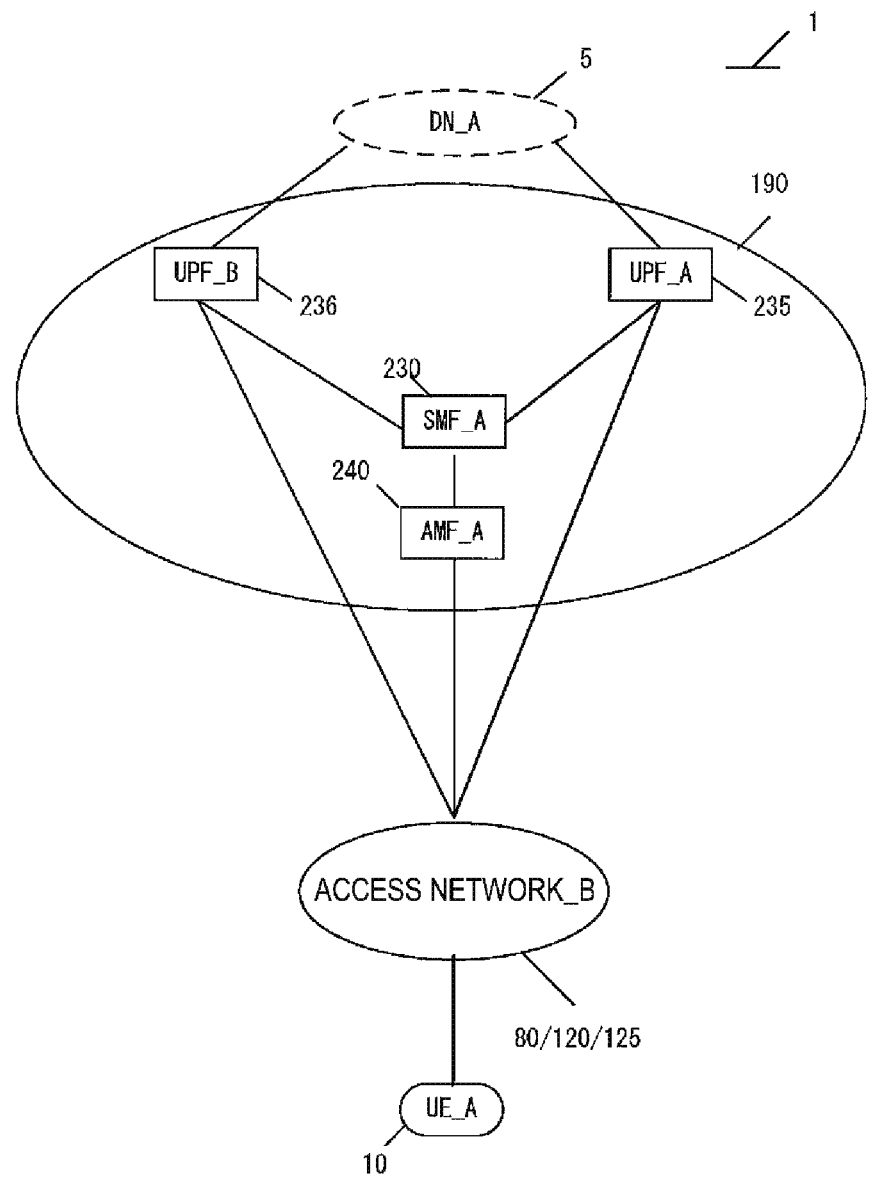
FIG. 3 is a diagram illustrating an overview of a mobile communication system at PDU session anchor relocation.

Next, an overview of a system at PDU session anchor relocation in the present embodiment will be described with reference to FIG. 3. The core network_B 190 includes at least two UPFs (the UPF_A 235 and the UPF_B 236) and the SMF_A 230 and the AMF_A 240. At this time, the DN to which the UPF_A 235 connects and the DN to which the UPF_B 236 connects are the same DN, Additionally, the UPF_A 235 and the UPF_B 236 are gateway apparatuses managed by the SMF_A 230.

The UE_A 10 can transmit and/or receive the user data to and/or from the UPF_A 235 and/or the UPF_B 236 via the access network_B.

1.2. Apparatus Configuration

First, a description is given of the identification information stored in each apparatus. A Subscriber Permanent Identifier (SUPI) is permanent identification information assigned to a 5G subscriber in the 5GS, is the permanent identification information of the subscriber (users), and is identification information assigned to the user using the UE. The SUPI may be an International Mobile Subscriber Identity (IMSI) or a Network Access Identifier (NAI). The SUPI stored by the UDM_A 50 and the IMSI stored by the HSS may be the same, or the SUPI stored by the UDM_A 50 and the IMSI stored by the HSS may be associated and stored in at least some NFs. The IMSI stored by the UE_A 10 and the AMF_A 240 may be the same as the IMSI stored by the UDM_A 50 or the HSS.

The IMSI is permanent identification information of a subscriber (user), and is identification information assigned to a user using the UE. The IMSI stored by the UE_A 10, the MME/CPF/AMF_A 240, and the SGW may be the same as the IMSI stored by the UDM_A 50 or the HSS.

RM State/MM State indicates a Mobility management state of the UE_A 10 or the AMF_A 240. For example, the RM State/MM State may be an RM-REGISTERED state (registered state) in which the UE_A 10 is registered in the network, and/or an RM-DEREGISTERD stale (deregistered state) in which the UE_A 10 is not registered in the network. The RM State/MM State may be an ECM-CONNECTED state in which a connection is continued between the UE_A 10 and the core network, and/or an ECM-IDLE state in which the connection is released. Note that the RM Statc/MM State may be information with which a state in which the UE_A 10 is registered in the EPC and a state in which the UE_A 10 is registered in the 5GC can be distinguished.

Globally Unique Temporary Identity (GUTI) is temporary identification information of the UE_A 10. The GUTI includes identification information of the MME/CPF/AMF_A 240 (Globally Unique MME Identifier (GUMMEI)), and identification information of the UE_A 10 in a specific MME/CPF/AMF_A 240 (M-Temporary Mobile Subscriber Identity (M-TMSI)). ME Identity is an ID of the UE_A 10 or the ME, and may be Permanent Equipment Identifier (PEI), International Mobile Equipment Identity (IMEI) or IMEI Software Version (IMEISV), for example. MSISDN represents a basic phone number of the UE_A 10. The MSISDN stored by the MME/CPF/AMF_A 240 may be information indicated by a storage unit of the UDM_A 50. Note that the GUTI may include information for identifying the CPF.

MME F-TEID is information for identifying the MME/CPF/AMF_A 240. The MME F-TEID may include an IP address of the MME/CPF/AMF_A 240, a Tunnel Endpoint Identifier (TEID) of the MME/CPF/AMF_A 240, or both of them. The IP address of the MME/CPF/AMF_A 240 and the TEID of the MME/CPF/AMF_A 240 may be stored independently of each other. The MME F-TEID may be identification information for user data, or identification information for control information. The MME F-TEID may be AMF ID.

SGW F-TEID is information for identifying the SGW. The SGW F-TEID may include an IP address of the SGW, a TEID of the SGW, or both of them. The IP address of the SGW and the TEID of the SGW may be stored independently of each other. The SGW F-TEID may be identification information for user data, or identification information for control information. The SGW F-TEID may be UPG ID.

PGW F-TEID is information for identifying the PGW/UPGW/SMF_A 230/UPF_A 235. The PGW F-TEID may include an IP address of the PGW/UPGW/SMF_A 230/UPF_A 235, a TEID of the PGW/UPGW/SMF_A 230/UPF_A 235, or both of them. The IP address of the PGW/UPGW/SMF_A 230/UPF_A 235 and the TEID of the PGW/UPGW/SMF_A 230/UPF_A 235 may be stored independently of each other. The PGW F-TEID may be identification information for user data, or identification information for control information. The PGW F-TEID may be UPGNAT ID.

eNB F-TEID is information for identifying the eNB_A 45. The eNB F-TEID may include an IP address of the eNB_A 45, a TEID of the eNB_A 45, or both of them. The IP address of the eNB_A 45 and the TEID of the SGW may be stored independently of each other. The eNB F-TEID may be identification information for user data, or identification information for control information.

Data Network Name (DNN) may be identification information for identifying the core network and an external network such as the DN. Furthermore, the DNN can also be used as information for selecting a gateway such as the PGW/UPGW/UPF_A 235 connecting the core network. Note that the DNN may be Access Point Name (APN). Therefore, the APN may be represented by the DNN, or the DNN may be represented by the APN.

Note that the DNN may be identification information for identifying such a gateway, or identification information for identifying an external network such as the DN. Note that in a case that multiple gateways connecting the core network and the DN are located, there may be multiple gateways that can be selected according to the DNN. Furthermore, one gateway may be selected from among such multiple gateways by another scheme using identification information other than the DNN.

Note that the DNN may be identification information for identifying such a gateway, or identification information for identifying an external network such as the DN. Note that in a case that multiple gateways connecting the core network_B 190 and the DN are located, there may be multiple gateways that can be selected according to the DNN. Furthermore, one gateway may be selected from among such multiple gateways by another scheme using identification information other than the DN ID.

Furthermore, the DNN may be information equivalent to the APN, or different from the APN. Note that in a case that the DNN is the information different from the APN, each apparatus may manage information indicating a correspondence relationship between the DNN and the APN, perform a procedure to inquire the APN by using the DNN, or perform a procedure to inquire the DNN by using the APN.

UE Radio Access Capability is identification information indicating a radio access capability of the UE_A 10. UE Network Capability includes an algorithm of security supported by the UE_A 10 and a key derivative function. MS Network Capability is information for including, in the UE_A 10 having a function of a GERAN_A 25 and/or a UTRAN_A 20, one or multiple pieces of information necessary for an SGSN_A 42. Access Restriction is registration information for access restriction. eNB Address is an IP address of the eNB_A 45. MME UE S1AP ID is information for identifying the UE_A 10 in the MME/CPF/AMF_A 240. eNB UE S1AP ID is information for identifying the UE_A 10 in the eNB_A 45.

APN in Use is an APN recently utilized. The APN in Use may be Data Network Identifier. This APN may include identification information of the network and identification information of a default operator. Furthermore, the APN in Use may be information for identifying a DN with which the PDU session is established.

Assigned Session Type is information indicating a PDU session type. The Assigned. Session Type may be Assigned PDN Type. The PDU session type may be IP, or non-IP. Furthermore, in a case that the PDU session type is an IP, information indicating a PDN type assigned by the network may be further included. Note that the Assigned Session Type may be IPv4, IPv6, or IPv4v6.

Unless otherwise specifically described, the IP Address refers to the IP address assigned to the UE. The IP address may be an IPv4 address, an IPv6 address, or an IPv6 prefix. Note that in a case that the Assigned Session Type indicates non-IP, an element of the IP Address may not be included.

EPS Bearer ID is identification information of the EPS bearer. The EPS Bearer ID may be identification information for identifying Signalling Radio Bearer (SRB) and/or Control-plane Radio bearer (CRB), or identification information for identifying Data Radio Bearer (DRB). Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying the EPS bearer different from the default bearer. The TFT indicates all the packet filters associated with the EPS bearer. The TFT is information for identifying some pieces of the transmitted and/or received user data, and thus, the UE_A 10 uses the EPS bearer associated with the TFT to transmit and/or receive the user data identified by the TFT. In still other words, the UE_A 10 uses Radio Bearer (RB) associated with the TFT to transmit and/or receive the user data identified by the TFT. The TFT may associate the user data such as the transmitted and/or received application data with an appropriate transfer path, and may be identification information for identifying the application data. The UE_A 10 may use the default bearer to transmit and/or receive the user data which cannot be identified by the TFT. The UE_A 10 may store in advance the TFT associated with the default bearer. The EPS Bearer ID may be route ID.

The Default Bearer is EPS bearer identification information for identifying a default bearer associated with a PDU session. Note that the EPS bearer may be a logical communication path established between the UE_A 10 and the PGW/UPGW/UPF_A 235, or a communication path configuring PDN connection/PDU session. Furthermore, the EPS bearer may be a default bearer, or a dedicated bearer. Furthermore, the EPS bearer may include an RB established between the UE_A 10 and the base station and/or the access point in the access network. Furthermore, the RB and the EPS bearer may be associated with each other on a one-to-one basis. Therefore, identification information of the RB may be associated with the identification information of the EPS bearer on a one-to-one basis, or may be the same identification information as the identification information of the EPS bearer. Note that the RB may be an SRB and/or a CRB, or a DRB. The Default Bearer may be information that the UE_A 10 and/or the SGW and/or the PGW/UPGW/SMF_A 230/UPF_A 235 acquire from the core network in establishing a PDU session. Note that the default bearer is an EPS bearer first established during the PDN connection/PDU session, and is such an EPS bearer that only one bearer can be established during one PDN connection/PDU session. The default bearer may be an EPS bearer that can be used to communicate user data not associated with the TFT. The dedicated bearer is an EPS bearer established after the default bearer has been established during the PDN connection/PDU session, and is such an EPS bearer that multiple bearers can be established during one PDN connection/PDU session. The dedicated bearer is an EPS bearer that cannot be used to communicate user data associated with the TFT. The Default Bearer may be default route ID, or may be information indicating one or multiple default routes.

User Identity is information for identifying a subscriber. The User Identity may be a SUPI, an IMSI, or an MSISDN. Furthermore, the User Identity may also be identification information other than a SUPI, an IMSI, or an MSISDN. Serving Node Information is information for identifying the MME/CPF/AMF_A 240 used in a PDU session, and may be an IP address of the MME/CPF/AMF_A 240.

eNB Address is an IP address of the eNB_A 45. eNB ID is information for identifying the UE in the eNB_A 45. MME Address is an IP address of the MME/CPF/AMF_A 240. MME ID is information for identifying the MME/CPF/AMF_A 240. AN node Address is an IP address of the AN node_A 122. AN node ID is information for identifying the AN node_A 122. WAG Address is an IP address of the WAG_A 126. WAG ID is information for identifying the WAG_A 126.

The configuration of each apparatus will be described below. Note that some or all of apparatuses described below and functions of units in the apparatuses may operate on physical hardware, or logical hardware which is virtually configured on general-purpose hardware.

1.2.1. Configuration of UE

Figure 4:
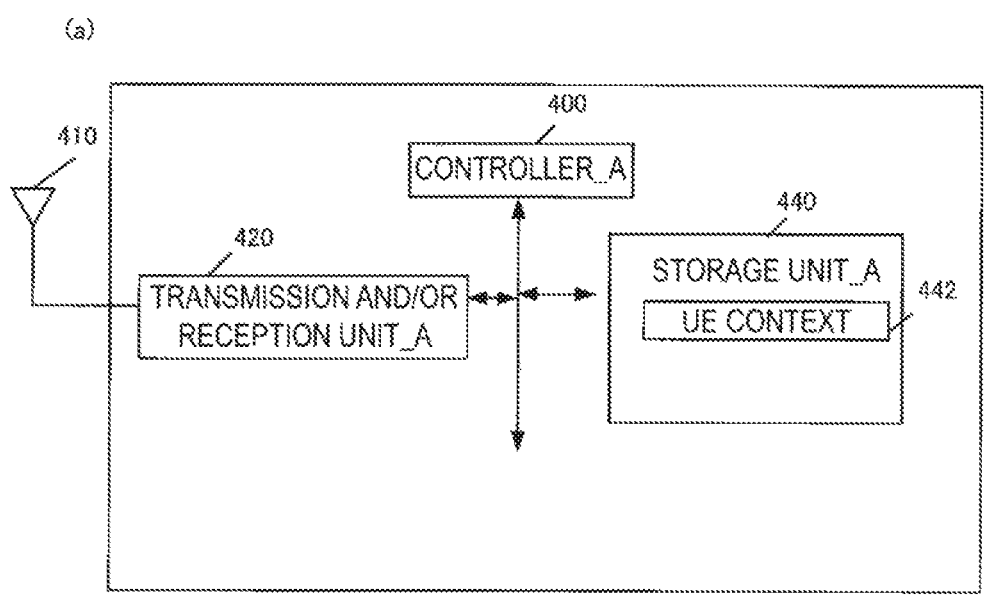
FIG. 4 is a diagram illustrating an apparatus configuration of a UE.

FIG. 4 illustrates an apparatus configuration of the UE_A 10. As illustrated in the drawing, the UE_A 10 includes a transmission and/or reception unit_A 420, a controller_A 400, and a storage unit_A 440. The transmission and/or reception unit_A 420 and the storage unit_A 440 are connected to the controller_A 400 via a bus. The controller_A 400 is a function unit to control the UE_A 10. The controller_A 400 implements various types of processing by reading out various programs stored in the storage unit_A 440 and performing the programs.

The transmission and/or reception unit_A 420 is a function unit through which the UE_A 10 connects to the base station and/or the access point in the access network to connect to the access network. An external antenna_A 410 is connected to the transmission and/or reception unit_A 420. In other words, the transmission and/or reception unit_A 420 is a function unit through which the UE_A 10 connects to the base station and/or the access point in the access network. Furthermore, the transmission and/or reception unit_A 420 is a transmission and/or reception function unit through which the UE_A 10 transmits and/or receives the user data and/or the control information to and/or from the base station and/or the access point in the access network.

The storage unit_A 440 is a function unit configured to store programs, data, and the like necessary for each operation of the UE_A 10. The storage unit_A 440 includes, for example, a semiconductor memory, a Hard Disk Drive (HDD), or the like. The storage unit_A 440 may store at least identification information and/or control information and/or a flag and/or a parameter included in a control message which is transmitted and/or received in a communication procedure described later. As illustrated in the drawing, the storage unit_A 440 stores a UE context 442. Hereinafter, information elements stored in the storage unit_A 440 will be described. Note that the UP context 442 may include a UE context used to connect to the core network_B 190 and a UP context used to connect to the core network_B 190. Furthermore, the UE context used to connect to the core network_B 190 and the UP context used to connect to the core network_B 190 may be stored together or separately.

First, FIG. 5(b) illustrates information elements included in the UE context stored for each UE. As illustrated in the drawing, the UE context stored for each UE includes SUPI, RM State, GIFU, and ME Identity. Next, FIG. 5(c) illustrates the UE context for each PDU session or PDN connection stored for each PDU session or PDN connection. As illustrated in the drawing, the UE context for each PDU session includes DNN, Assigned Session Type, IP Address(es), and Default Bearer.

FIG. 5(d) illustrates the UE context for each bearer stored in the storage unit of the UE. As illustrated in the drawing, the UE context for each bearer includes EPS Bearer ID, TI, and TFT.

1.2.2. Configuration of eNB/AN Node/WAG

Figure 6:
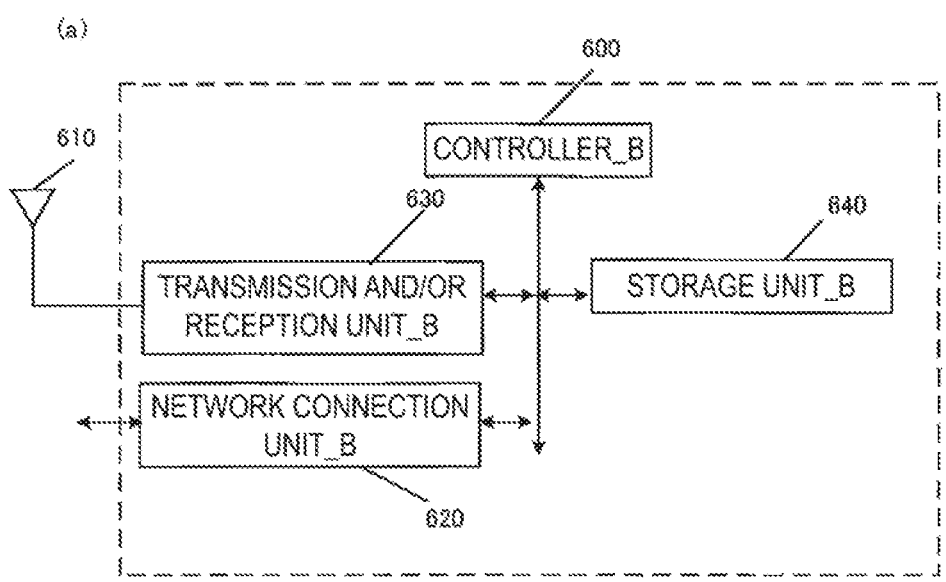
FIG. 6 is a diagram illustrating an apparatus configuration of the eNB/AN node.

A configuration of the eNB_A 45, the AN node_A 122, and the WAG_A 126 will be described below. FIG. 6(a) illustrates an apparatus configuration of the eNB_A 45, the AN node_A 122, and the WAG_A 126. As illustrated in the drawing, the eNEB_A 45, the AN node_A 122, and the WAG_A 126 include a network connection unit_B 620, a transmission and/or reception unit_B 630, a controller_B 600, and a storage unit_B 640. The network connection unit_B 620, the transmission and/or reception unit_B 630, and the storage unit_B 640 are connected to the controller_B 600 via a bus.

The controller_B 600 is a function unit for controlling the eNB_A 45. The controller_B 600 implements various types of processing by reading out various programs stored in the storage unit_B 640 and performing the programs.

The network connection unit_B 620 is a function unit through which the eNB_A 45, the AN node_A 122, and the WAG_A 126 connect to the MME and/or the SGW. Furthermore, the network connection unit_B 620 is a transmission and/or reception unit through which the eNB_A 45, the AN node_A 122, and the WAG_A 126 transmit and/or receive the user data and/or the control information to and/or from the MME and/or the SGW.

The transmission and/or reception unit_B 630 is a function unit through which the eNB_A 45, the AN node_A 122, and the WAG_A 126 connect to the UE_A 10. Furthermore, the transmission and/or reception unit_B 630 is a transmission and/or reception function unit for transmitting and/or receiving the user data and/or the control information to and/or from the UE_A 10. An external antenna_B 610 is connected to the transmission and/or reception unit_B 630.

The storage unit_B 640 is a function unit for storing programs, data, and the like necessary for each operation of the eNB_A 45, the AN node_A 122, and the WAG_A 126. The storage unit_B 640 includes, for example, a semiconductor memory, an HDD, or the like. The storage unit_B 640 may store at least identification information and/or control information and/or a flag and/or a parameter included in a control message which is transmitted and/or received in a communication procedure described later. The storage unit_B 640 may store these pieces of information as the contexts for each UE_A 10.

1.2.3. Configuration of MME/CPF/AMF

Figure 7:
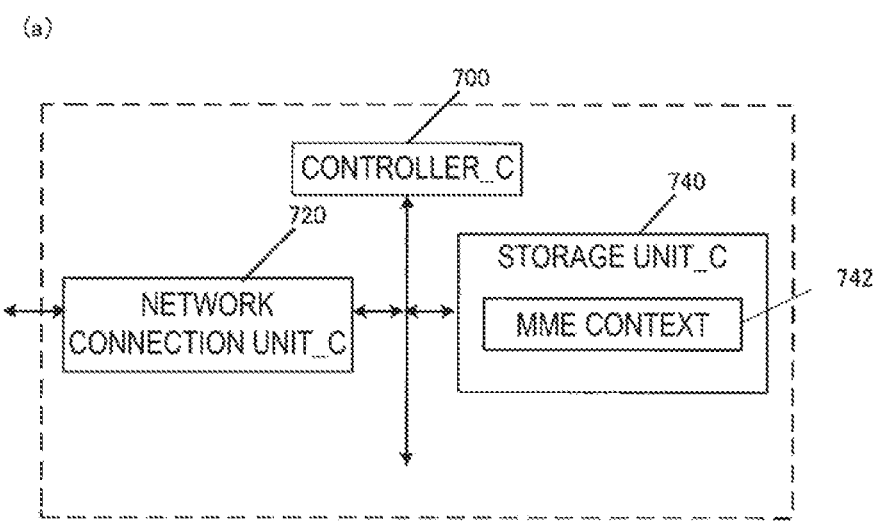
FIG. 7 is a diagram illustrating an apparatus configuration of the AMF/MME/CPF.

A configuration of the MME, the CPF, and the AMF_A 240 will be described below. FIG. 7(a) illustrates an apparatus configuration of the MME, the CPF, and the AMF_A 240. As illustrated in the drawing, the MME, the CPF, and the AMF_A 240 include a network connection unit_C 720, a controller_C 700, and a storage unit_C 740. The network connection unit_C 720 and the storage unit_C 740 are connected to the controller_C 700 via a bus. Note that functions of these units may operate on physical hardware, or logical hardware which is virtually configured on general-purpose hardware.

The controller_C 700 is a function unit for controlling the MME, the CPF, and the AMF_A 240. The controller_C 700 implements various types of processing by reading out various programs stored in the storage unit_C 740 and performing the programs.

The network connection unit_C 720 is a function unit through which the MME connects to the base station in the access network and/or the access point in the access network and/or the SCEF and/or the UDM_A 50 and/or the SGW. Furthermore, the network connection unit_C 720 is a transmission and/or reception unit through which the MME transmits and/or receives the user data and/or the control information to and/or from the base station in the access network and/or the access point in the access network and/or the SCEF and/or the UDM_A 50 and/or the SGW.

Furthermore, the network connection unit_C 720 is a function unit through which the CPF connects to the base station in the access network and/or the access point in the access network and/or the SCEF and/or the UDM_A 50 and/or the UPGW and/or the UPF_A 235 and/or the SMF_A 230. Furthermore, the network connection unit_C 720 is a transmission and/or reception unit through which the MME transmits and/or receives the user data and/or the control information to and/or from the base station in the access network and/or the access point in the access network and/or the SCEF and/or the UDM_A 50 and/or the UPGW and/or the UPF_A 235.

The storage unit_C 740 is a function unit for storing programs, data, and the like necessary for each operation of the MME, the CPF, and the AMF_A 240. The storage unit_C 740 includes, for example, a semiconductor memory, an HDD, or the like. The storage unit_C 740 may store at least identification information and/or control information and/or a flag and/or a parameter included in a control message which is transmitted and/or received in a communication procedure described later.

As illustrated in the drawing, the storage unit_C 740 stores an MME context 742. Hereinafter, information elements stored in the storage unit_C 740 will be described. Note that the MME context may be a context stored by the CPI. FIG. 8(b) illustrates information elements included in the UE context stored for each UE. As illustrated in the drawing, the MME context stored for each UE includes one or multiple pieces of SUPI, MSISDN, RM State, GUTI, ME Identity, UP Radio Access Capability, UE Network Capability, MS Network Capability, Access Restriction, MME F-TEM, SGW F-TEID, eNB Address, MME UE S1AP ID, eNB UE S1AP ID, AN node Address, AN node ID, WAG Address, and WAG ID.

Next, FIG. 9(c) illustrates the MME context for each PDU session or PDN connection stored for each PDU session or PDN connection. As illustrated in the drawing, the MME context for each PDU session includes DNN, Assigned Session Type, IP Address(es), PGW F-TEID, and Default bearer.

FIG. 9(d) illustrates the MME context for each bearer stored for each bearer. As illustrated in the drawing, the MME context stored for each bearer includes one or multiple pieces of EPS Bearer ID, TI, TFT, SGW F-TEID, F-TEID, MME F-TEID, eNB Address, AN node Address, WAG Address, eNB ID, AN node ID, and WAG ID. Here, the information elements included in the MME context illustrated in FIG. 8 and FIG. 9 may be included in either the MM context or the EPS bearer context and stored.

1.2.4. Configuration of SGW/UPF

Figure 10:
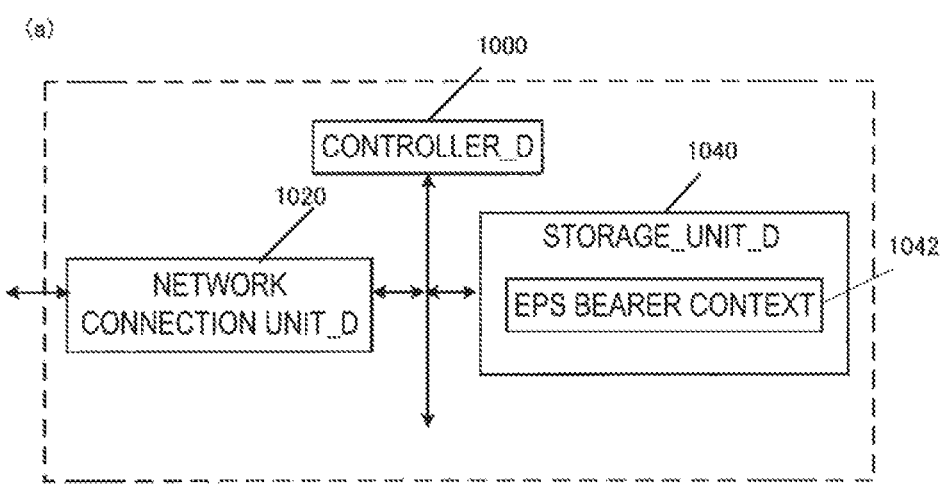
FIG. 10 is a diagram illustrating an apparatus configuration of the UPF/SGW/PGW.

FIG. 10 illustrates an apparatus configuration of the SGW/UPF_A 235. As illustrated in the drawing, the SGW/

UPF_A 235 includes a network connection unit_D 1020, a controller_D 1000, and a storage unit_D 1040. The network connection unit_D 1020 and the storage unit_D 1040 are connected to the controller_D 1000 via a bus.

The controller_D 1000 is a function unit for controlling the SGW/UPF_A 235. The controller_D 1000 implements various types of processing by reading out various programs stored in the storage unit_D 1040 and performing the programs.

The network connection unit_D_1020 is a function unit through which the SGW/UPF_A 235 connects to the base station and/or the access point in the access network and/or the MME and/or the PGW and/or the SGSN_A 42, Furthermore, the network connection unit_D 1020 is a transmission and/or reception unit through which the SGW/UPF_A 235 transmits and/or receives the user data and/or the control information to and/or from the base station and/or the access point in the access network and/or the MME and/or the PGW and/or the SGSN_A 42.

The storage unit_D 1040 is a function unit for storing programs, data, and the like necessary for each operation of the SGW/UPF_A 235. The storage unit_D 1040 includes, for example, a semiconductor memory, an HDD, or the like. The storage unit_D 1040 may store at least identification information and/or control information and/or a flag and/or a parameter included in a control message which is transmitted and/or received in a communication procedure described later.

As illustrated in the drawing, the storage unit_D 1040 stores an EPS bearer context 1042. Note that the EPS bearer context 1042 includes an EPS bearer context stored for each UE, an EPS bearer context stored for each PDU session, and an EPS bearer context stored for each bearer.

First, FIG. 11(b) illustrates information elements of the EPS bearer context stored for each UE. As illustrated in the drawing, the EPS bearer context stored for each UE includes SUPI, ME Identity, MSISDN, MME F-TEID, and SGW F-TEID.

Furthermore, the EPS bearer context includes an EPS bearer context for each PDU session stored for each PDU session. FIG. 11(c) illustrates the EPS bearer context for each PDU session. As illustrated in the drawing, the EPS bearer context for each PDU session includes DNN, Assigned Session Type, SGW F-TEID, PGW F-TEID, Default Bearer, and IP Address(es).

Furthermore, the EPS bearer context includes an EPS bearer context for each hearer. FIG. 11(d) illustrates the EPS bearer context for each bearer. As illustrated in the drawing, the EPS bearer context for each bearer includes one or multiple pieces of EPS Bearer ID, TFT, PGW SGW F-TEID, eNB F-TEID, MME Address, AN node Address, WAG Address, MME ID, AN node ID, and WAG ID.

1.2.5. Configuration of PGW/UPGW/SMF/UPF

FIG. 10 illustrates an apparatus configuration of the PGW, the UPGW, the SMF_A 230, and the UPF_A 235. As illustrated in the drawing, the PGW, the UPGW, the SMF_A 230, and the UPF_A 235 include a network connection unit_D 1020, a controller_D 1000, and a storage unit_D 1040. The network connection unit_D 1020 and the storage unit_D 1040 are connected to the controller_D 1000 via a bus. Note that functions of these units may operate on physical hardware, or logical hardware which is virtually configured on general-purpose hardware.

The controller_D 1000 is a function unit for controlling the PGW. The controller_D 1000 implements various types of processing by reading out various programs stored in the storage unit_D 1040 and performing the programs.

The network connection unit_D 1020 is a function unit through which the PGW connects to the SGW and/or the PCF_A 60 and/or an ePDG_A 65 and/or a AAA_A 55 and/or a TWAG_A 74 and/or the DN_A 5. The network connection unit_D 1020 is a transmission and/or reception unit through which the PGW transmits and/or receives the user data and/or the control information to and/or from the SGW and/or the PCF_A 60 and/or the ePDG_A 65 and/or the AAA_A 55 and/or the TWAG_A 74 and/or the DN_A 5.

Furthermore, the network connection unit_D 1020 is a function unit through which the UPGW connects to the PCF_A 60 and/or the AN node_A 122 and/or the DN_A 5. The network connection unit_D 1020 is a transmission and/or reception unit through which the PGW transmits and/or receives the user data and/or the control information to and/or from the SGW and/or the PCF_A 60 and/or the ePDG_A 65 and/or the AAA_A 55 and/or the TWAG_A 74 and/or the DN_A 5.

The network connection unit_D 1020 is a function unit through which the SMF_A 230 connects to the AMP_A 240 and/or the UPF_A 235 and/or the UDM_A 50 and/or the PCF_A 60. The network connection unit_D 1020 is a transmission and/or reception unit through which the SMF_A 230 transmits and/or receives the control information to and/or from the AMF_A 240 and/or the UPF_A 235 and/or the UDM_A 50.

The network connection unit_D 1020 is a function unit through which the UPF_A 235 connects to the AN node_A 122 and/or the SMF_A 230 and/or the DN_A 5 and/or the DN_B 105. The network connection unit_D_1020 is a transmission and/or reception unit through which the UPF_A 235 transmits and/or receives the user data and/or the control information to and/or from the AN node_A 122 and/or the SMF_A 230 and/or the DN_A 5 and/or the DN_B 105.

The storage unit_D 1040 is a function unit for storing programs, data, and the like necessary for each operation of the PGW. The storage unit_D 1040 includes, for example, a semiconductor memory, an HDD, or the like. The storage unit_D 1040 may store at least identification information and/or control information and/or a flag and/or a parameter included in a control message which is transmitted and/or received in a communication procedure described later.

As illustrated in the drawing, the storage unit_D 1040 stores an EPS bearer context 1042. Note that the EPS bearer context 1042 may include an EPS bearer context stored for each UE, an EPS bearer context stored for each APN, an EPS bearer context stored for each PDU session or PDN connection, and an EPS bearer context stored for each bearer, which may be separately stored in the EPS bearer context 1042. Furthermore, the EPS bearer context may be a context stored by the UPGW and/or the SMF_A 230 and/or the UPF_A 235.

FIG. 12(b) illustrates information elements included in the EPS bearer context stored for each UE. As illustrated in the drawing, the EPS bearer context stored for each UE includes SUPI, ME Identity, MSISDN, and RAT type.

Next, FIG. 12(c) illustrates the EPS bearer context stored for each APN. As illustrated in the drawing, the EPS hearer context stored for each APN of the storage unit of the PGW includes APN in use. Note that the EPS hearer context stored for each APN may be stored for each Data Network Identifier.

FIG. 12(d) illustrates the EPS bearer context for each PDU session or PDN connection stored for each PDU session or PDN connection. As illustrated in the drawing, the EPS bearer context for each PDU session or PDN connection includes Assigned Session Type, IP Address(es), SGW F-TEID, PGW F-TEID, and Default Bearer.

Furthermore, FIG. 12(*e*) illustrates the EPS bearer context stored for each EPS bearer. As illustrated in the drawing, the EPS bearer context includes EPS Bearer ID, TFT, SGW F-TEID, and PGW F-TEID.

1.3. Description of Initial Procedure

Next, before describing detailed processes of initial procedure in the present embodiment, in order to avoid redundant descriptions, terminology specific to the present embodiment and primary identification information used in each procedure will be described beforehand.

A Subscriber Permanent Identifier (SUPI) is identification information assigned to the registered person. The SUPI may be an International Mobile Subscriber Identity (IMSI) or a Network Access Identifier (NAI).

CM state is information used to manage the state of a connection of a NAS signal between the UE and the AMF. The CM state includes a CM-IDLE state where there is no connection between the UE and the AMF and CM-CONNECTED in which a connection between the UE and the AMF is being established.

The UE in the CM-IDLE state is in a state in which there is no connection of a NAS signal with the AMF and a state in which the connection with the access network is released. in a case that the UE in CM-IDLE transmits an uplink signal or user data, a service request procedure may be initiated to request a transition to CM-CONNECTED. The AMF in the CM-IDLE state may initiate the service request procedure by transmitting paging to the UE and initiate transitioning to the CM-IDLE state.

On the other hand, the UE in the CM-CONNECTED state may be in a state in which a connection of a NAS signal with the AMF has been established and a state in which a connection with the access network has been established.

Data Network Name (DNN) is information for identifying a Data Network (DN). The DNN may be Access Point Name (APN).

The first PDU session is a PDU session that configures the route with the UPF_A 235 as the anchor point. In other words, the anchor point of the first PDU session is the UPF_A 235.

The second PDU session is a PDU session that configures the route with the UPF_B 236 as the anchor point. In other words, the anchor point of the first PDU session is the UPF_B 236.

The first state is a state in which the first PDU session has been established and a state in which the second PIM session is not established. Further, the first state is the REGISTERD state.

Here, the REGISTERD state may be a state where the UE is registered with network and a state where the AMF stores contexts for the UE.

The second state is a state in which the first PDU session is not established and a state in which the second PDU session is not established. Further, in the second state, the network may be in a state of storing information about the first PDU session. In other words, the second state may be a state in which the AMF_A 240 stores the SMF ID identifying the SMF selected in the first PDU session and/or a state in which the SMF_A 230 stores the UPF ID identifying the UPF selected in the first PDU session. Further, the second state may be the REGISTERD state.

Note that the SMF_A 230 may store the UPF ID identifying UPF selected in the first PDU session as the UPF to be prohibited during the PDU session re-establishment procedure, or instead may select and store the UPF of the relocation destination.

The third state is a state in which the first PDU session is not established and a state in which the second Pali session has been established. In other words, the third state is a state in which the first PDU session has been released and a state in which the second PDU session has been established. Further, the third state is the REGISTERD state.

The fourth state is a state in which the first PDU session has been established and a state in which the second PDU session has been established. In other words, the fourth state is a state in which the first PDU session and the second PDU session are concurrently established. Further, the fourth state may be the REGISTERD state.

Session and Service Continuity (SSC) mode indicates a mode of Session and Service Continuity supported by a system and/or each apparatus in the 5GC. More particularly, the SSC mode may be a mode indicating a type of the session and service continuity supported by a PDU session established between the UE_A 10 and the anchor point. Here, the anchor point may be the UPGW or may be the UPF_A 235. Note that the SSC mode may be a mode indicating a type of the session and service continuity configured for each PDU session. Furthermore, the SSC mode may be configured to include three modes of SSC mode 1, SSC mode 2, and SSC mode 3. The SSC mode is associated with the anchor point and cannot be modified while the PDU session is being established.

Furthermore, SSC mode 1 in the present embodiment is a mode of the session and service continuity in which the same UPF is continuously continued as the anchor point regardless of the access technology such as the Radio Access Technology (RAT) and the cell which the UE_A 10 uses to connect to a network. More particularly, SSC mode 1 may be a mode in which even in a case that the mobility of the UE_A 10 occurs, the session and service continuity is achieved without changing the anchor point used by the established PDU session.

Furthermore, the SSC mode 2 in the present embodiment is a mode of the session and service continuity to release the PDU session before subsequently establishing the PDU session, in a case that an anchor point associated with one SSC mode 2 is included within the PDU session. More particularly, SSC mode 2 is a mode to delete the PDU session once and then newly establish a PDU session in a case that a relocation of the anchor point occurs.

Furthermore, SSC mode 2 is a mode of the session and service continuity in which the same UPF is continuously continued as the anchor point only in a serving area of the UPF. More particularly, SSC mode 2 may be a mode in which so long as the UE_A 10 is in the serving area of the UPF, the session and service continuity is achieved without changing the UPF used by the established PDU session. Furthermore, SSC mode 2 may be a mode in which in a case that the mobility that the UE_A 10 leaves the serving area of the UPF occurs, the session and service continuity is achieved by changing the UPF used by the established PDU session.

Here, the serving area of the TUPF may be an area in which one UPF can provide a session and service continuity function, or a subset of the access network such as the RAT or the cell used in a case that the UE_A 10 connects to a network. Furthermore, the subset of the access network may be a network including one or multiple RATs and/or cells, or may be a TA.

Furthermore, SSC mode 3 in the present embodiment is a mode of the session and service continuity in which a PDU session can be established between a new anchor point and the UE for the same DN without releasing the PDU session between the UE and anchor point.

Furthermore, SSC mode 3 is a mode of the session and service continuity that allows a new PDU session and/or communication path to be established via a new UPF to the same DN before releasing a PDU session and/or communication path established between the UE_A 10 and the UPF, Furthermore, SSC mode 3 may be a mode of the session and service continuity that allows the UE_A 10 to be multi homed.

And/or, SSC mode 3 may be a mode that allows the session and service continuity using multiple PDU sessions and/or the UPFs associated with the PDU sessions. In other words, in the case of SSC mode 3, each apparatus may achieve the session and service continuity by using multiple PDU sessions, or may achieve the session and service continuity by using multiple TUPFs.

Here, in the case that each apparatus establishes a new PDU session and/or communication path, a new UPF may be selected by the network, or a new UPF may be an optimal UPF for a place at which the UE_A 10 connects to the network. Furthermore, in a case that multiple PDU sessions and/or the UPFs used by the PDU sessions are effective, the UE_A 10 may associate the application and/or flow communication with to a new established PDU session, immediately or based on completion of the communication.

A multi home PDU session indicates a PDU session associated with multiple IPv6 prefixes. In other words, the multi homed PDU session provides access, route, and user data path to a DN via one or more anchor points.

A PDU session type is information indicating a type of connection provided by the PDU session, and indicates IPv4, IPv6, Ethernet Type, or non-IP Type.

A default route is a selectable communication path in a case there is no route associated with a particular traffic. More specifically, the default route is a path to a default router in which the UE transmits user data in a case that there is no route associated with a particular traffic. Note that, in a case that multiple PDU sessions or a PDU session including multiple routes are established between the UE and the DN, the default route indicates a route used as default or a route included in the PDU session. The default route may be one for each PDU session, or multiple default routes may be assigned for each PDU session.

The UE may establish multiple PDU sessions, and may establish a default route for every PDU session.

In this way, the UE may establish multiple default routes. Note that the UE may store a default router in association with each default route. Accordingly, the UE may store multiple default routers. Alternatively, only one default router having high preference may be managed. At that time, other default routers and/or default routes associated with the default routers may be deleted.

The Network Slice Instance (NSI) in the present embodiment is an entity of each of one or multiple Network Slices configured in the core network_B 190. The NSI in the present embodiment may include a virtual Network Function (NF) generated using a Network Slice Template (NST). Here, the NST is associated with a resource request for providing a required communication service or capability, and is a logical expression of one or multiple Network Functions (NFs).

Specifically, the NSI may be an aggregation including multiple NFs in the core network_B 190. The NSI may be a logical network configured to classify the user data delivered through a service or the like. The network slice may include at least one or more NFs. The NF included in the network slice may be or may not be an apparatus shared by another network slice.

The UE can be assigned to one or multiple network slices, based on UE usage type and/or one or multiple network slice type IDs and/or registration information such as one or multiple NS IDs and/or the APN.

Next, the identification information in the present embodiment will be described.

The first identification information in the present embodiment is information indicating whether or not to cause the network to notify the Preference information of the route to the UE. Specifically, the first identification information is information indicating whether or not to cause an UPF being an anchor point and/or an RTR (router) or a SMF configured as a UPF being an anchor point to notify the Preference information of the route to the UE. The first identification information may be information indicating that the UE determines a default route. Alternatively, the first identification information may be Capability information indicating that the UE is equipped with a function of determining a default route.

In addition, the first identification information may be information indicating the SSC mode requested by the UE. Specifically, in a case that the SSC mode requested by the UE is SSC mode 2 and/or SSC mode 3, then the U network may notify the UE of the Preference information. On the other hand, in a case that the SSC mode requested by the UE is SSC mode 1, the network may not notify the UE of the Preference information. The first identification information may be the second identification information.

In addition, the first identification information may be a DNN. Specifically, in a case that the DNN is information indicating a DN of a MEC, the network may notify the UE of Preference information.

In addition, the first identification information may be information indicating whether or not the UE supports the establishment of a multi horned PDU session. Specifically, in a case that the UE supports or requests the establishment of a multi homed PDU session, the network may notify the UE of the Preference information. The first identification information may be the third identification information.

Note that in a case that the network notifies the UE of the Preference information, the UPF and/or the RTR or the SMF may transmit the Preference information included in Router Advertisement (RA), or the SMF may transmit the Preference information included in a NAS message.

The second identification information in the present embodiment is information indicating an SSC mode requested by the UE. The second information may be information indicating SSC mode 1, SSC mode 2, or SSC mode 3. The second information may be determined by the LTE, based on the PDU session type or application. Alternatively, the second information may be information indicating the type of PDU session or information indicating the application.

Note that in a case that the second identification information is information indicating SSC mode 3, the first identification information and the second identification information may be configured as a single piece of identification information having respective meanings. In a case that the present embodiment describes that the first identification information and the second identification information indicating SSC mode 3 are included in and transmitted and/or received in a single control message, identification information configured as one piece of identification information having respective meanings may be transmitted and/or received.

The third identification information in the present embodiment is information indicating to request the establishment of a multi homed PDU session. The third identification information may be Capability information indicating that the UE supports the establishment function of the multi homed PDU session. In other words, the third identification information may be information indicating that the UE supports the establishment of the multi homed PDU session.

Note that the first identification information and the third identification information may be configured as a single piece of identification information having respective meanings. In a case that the present embodiment describes that the first identification information and the third identification information are included in and transmitted and/or received in a single control message, identification information configured as one piece of identification information having respective meanings may be transmitted and/or received.

The fourth identification information in the present embodiment is information to identify a network slice. The fourth identification information may be Single Network Slice Selection Assistance Information (S-NSSAI). The fourth identification information may be information associated with the fifth identification information. The fourth identification information may be information indicating the type of network slice requested by the UE and the type of application.

The fifth identification information in the present embodiment is information indicating the DN requested by the UE, The fifth identification information may be a Data Network Name (DNN).

The sixth identification information in the present embodiment is information indicating the PDU session requesting the connection. The sixth identification information may be PDU session ID, The sixth identification information may be information managed by the UE. The sixth identification information may be information indicating that the established PDU session is a new PDU session. The sixth identification information may be information indicating the PDU session once released.

The seventh identification information in the present embodiment is information indicating the type of the request. The seventh identification information may be a Request type. The seventh identification information may be information associated with the sixth identification information, indicating that the PDU session identified by the PDU session ID indicated by the sixth identification information is already established in the non-3GPP, or may be information indicating that the PDU session identified by the PDU session ID indicated by the sixth identification information corresponds to a PDN connectivity established in the 3GPP.

In the present embodiment, the 11th identification information is the preference information of the route (Route Preference (Prf)) included in the established PDU session. The 11th identification information may be information indicating a level of preference of a route, and may be represented, for example, by "High", "Medium", "Low". Alternatively, the same three grades may be represented as "High", "Medium", "Low". Note that "Medium" or "medium" may be used as information indicating the default. Alternatively, a level of preference of a route may be expressed with a higher granularity. Alternatively, a level of preference of a route may be expressed with a lower granularity. The 11th identification information may be determined based on the operator policy, the location information of the UE, the RAT type, the S-NSSAI, or the congested condition of the UPF, or may be determined based on information of two or more of these plurality of information.

Further, the 11th identification information may be information for selecting a default route. More specifically, the 11th identification information may be information for selecting a default router. For example, in a case that a default router and Preference information are stored per PDU session, then a default router associated with Preference information having high level of preference may be selected to transmit data. In this way, a default route may be selected by selecting a default router.

Note that preference information may be information associated with a default router and/or a default route and/or an IPv6 network prefix. Accordingly, a different level of preference may be configured per default router and/or per default route and/or per IPv6 network prefix.

The 12th identification information in the present embodiment is an SSC mode supported by the anchor point of the established PDU session. The 12th identification information may be information selected and determined by the SMF. The 12th identification information may be determined based on the registration information of the UE.

The 13th identification information in the present embodiment may be capability information indicating to support the establishment of the multi homed PDU session. In other words, the 13th information may be information indicating that the network supports the establishment of the multi homed PDU session, or may be intbrmation indicating that the network allows the establishment of the multi homed PDU session.

The 14th identification information in the present embodiment is information indicating a PDU session type. The 14th identification information may be information indicating an address. More specifically, the 14th identification information may be an IPv6 network prefix. Furthermore, the 14th identification information may include information indicating that the PDU session type of the PDU session established or modified by the present procedure has become the PDU session type indicated by the present identification information, or may be information indicating that the address associated with the PDU session established or modified by the present procedure has become the address indicated by the present identification information, and/or the address of the PDU session type indicated in the present embodiment.

Furthermore, the 14th identification information may be information indicating that the PDU session type of the address used in the user data communication performed for the DN has become the PDU session type indicated by the present identification information, or may be information indicating that the address used in the user data communication performed for the DN has become the address indicated by the present identification information, and/or the address of the PDU session type indicated in the present embodiment.

Furthermore, the 14th identification information may include multiple pieces of information indicating a PDU session type and/or an address, may include information indicating whether or not each PDU session type is a PDU session type used in the user data communication performed for the DN, or may include information indicating whether or not each address is an address used in the user data communication performed for the DN.

Furthermore, the 14th identification information may be information indicating that a PDU session connecting to the DN has been established, may be information indicating that the connection destination of the PDU session has been modified to the DN, or may be information indicating that the PDU session established or modified by the present procedure has become the PDU session used in the user data communication performed for the second DN.

The 15th identification information in the present embodiment is information indicating a cause. The 15th identification information may be information indicating that the establishment of the PDU session has been rejected.

The 15th identification information may be information indicating that a PDU session that supports the SSC mode requested by the UE and that configures the anchor point cannot be established. In other words, the 15th identification information may be information indicating that the network does not support the SSC mode requested by the UE.

The 15th identification information may be information indicating that the establishment of the multi homed PDU session is not supported. In other words, the 15th identification information may be information indicating that the network does not support the establishment of the multi home PDU session, or may be information indicating that the network does not allow the establishment of the multi home PDU session.

Note that the 15th identification information may be information indicating a plurality of causes, or may be treated as independent information for each cause.

The 21st identification information in the present embodiment is information indicating that the network is temporarily continuing a storage of information related to the PDU session to be released. Further, the 21st information may be Temporary information associated with information related to the PDU session that the network temporarily stores. In other words, information related to the PDU session temporarily stored may be associated with the 21st identification information and may be stored by the AMP and/or the SMF. Temporary Information may be PDU session ID identifying the PDU session to be released.

The 21st information may be information indicating that the network requests the PDU session to be established again for the DN same as the PDU session to be released. In other words, the 21st identification information may be information for causing the UE to initiate a PUD session re-establishment procedure.

Here, the network temporarily storing information related to the PDU session may be the AMP storing the SMF ID identifying the SMF associated with the PDU session ID identifying the PDU session to be released, and/or the SMF storing the UPF ID identifying the UPF associated with the PDU session.

The SMF may manage the UPF associated with the PDU session as the UPF to prohibit PDU session re-establishment, and store the UPF ID. Alternatively, the SMF may determine the UPF of the relocation destination in advance, and store the UPF ID identifying the UPF of the relocation destination.

The 21st information may be information indicating an SSC mode. Specifically, in a case that the 21st identification information is information indicating SSC mode 2, the 21st identification information may indicate that the network is temporarily continuing the storage of information related to the PDU session to be released. Alternatively, the 21st identification information may be the 22nd identification information.

The 22nd identification information in the present embodiment may be information indicating that the network requests the PDU session to be established again for the DN same as the PDU session to delete or release. Alternatively, the 22nd identification information may be information indicating that it is necessary for the network to establish the PDU session again for the DN same as the PDU session to delete or release. In other words, the 22nd identification information may be information for causing the UP to initiate a PDU session re-establishment procedure. The 22nd identification information may be information indicating a cause.

The 31st identification information in the present embodiment is information indicating to request an establishment of a PDU session, based on a request from the network. In other words, the 31st identification information may indicate that the UP is requesting and initiating a PDU session establishment procedure, based on a request from the network. Furthermore, the 31st identification information may indicate that the UE is requesting and initiating an establishment of a PDU session aimed at relocation of the anchor point.

The 32nd identification information in the present embodiment is information indicating information related to the PDU session requesting the establishment. The 32nd identification information may be the same as the 21st identification information. In other words, the 32nd identification information may be information associated with information related to the PDU session temporarily stored by the network. The 32nd identification information may be information used by the AMP to select the SMF, or may be information used by the SMF to select the UPF.

The 32nd identification information may be the 33rd identification information.

The 33rd identification information in the present embodiment is PDU session identification information for identifying the PDU session that is released right before, namely the old PDU session. The 33rd identification information may indicate that the UP is requesting and initiating a PDU session establishment procedure, based on a request from the network. Furthermore, the 31st identification information may indicate that the UE is requesting and initiating an establishment of a PDU session aimed at relocation of the anchor point.

The 41st identification information in the present embodiment is information indicating to request the release of the PDU session, based on Preference information. In other words, the 41st identification information is information indicating that the UP determines the PDU session to release, based on Preference information, and initiates or requests initiation of a PDU session release procedure. The 41st identification information may be information indicating a cause.

Furthermore, the 41st identification information may be information indicating to request the release of the PDU session.

The 51st identification information in the present embodiment is information indicating a cause. The 51st identification information may be information indicating that the Preference information has been updated. The 51st identification information may be information indicating that the request of the UE and the Preference information are not matched.

Specifically, in a case that the Preference information is different, as a result of the network confirming the Preference information for each route managed by the network, based on the reception of the 41st identification information, the network transmits the 51st identification information to the UE. In other words, the 51st identification information may be information indicating that the Preference information stored by the UE is different from the information stored by the network, or that the Preference information has been updated.

The 61st identification information in the present embodiment is information indicating a cause. The 61st identification information may be information indicating to request a modification of the default route of the PDU session. Furthermore, the 61st identification information may be information requesting an update of the Preference information in order to request a modification of the default route. In other words, the 61st identification information may be information requesting the network for an update of the Preference information and notification of the updated Preference information.

The 61st identification information may be information indicating a type of modification of the PDU session, and may be a PDU session modification type.

The 62nd identification information in the present embodiment is information for identifying the route requesting an update or a modification of the Preference information. The 62nd identification information may be the route ID identifying the route, may be the UPF ID identifying the anchor point, or the IP address. Furthermore, the 62nd identification information may be information indicating the default route. In other words, the 62nd identification information may indicate the route at which the UE wants to modify to the default route. Alternatively, the 62nd identification information may be information indicating the route at which the UE wants to update the Preference information.

The 71st identification information in the present embodiment is information indicating a cause. The 71st identification information may be information indicating an update or a modification of the Preference information. In other words, the 71st identification information may be information indicating that the network has updated or modified the Preference information. Furthermore, the 71st identification information may be information indicating an update or a modification of the PDU session due to the movement of the UE. In other words, the 71st identification information may be information indicating that the network has updated or modified information related to the PDU session in response to the update of the UE location information.

The 72nd identification information in the present embodiment is information indicating the updated or modified Preference information. The 72nd information may be information that the network notifies the update or the modification of the Preference information of the route or anchor point included in the PDU session. The 72nd identification information may be the same as the 11th identification information.

The 81st identification information in the present embodiment is information indicating a cause. The 81st identification information may be information indicating that the update of the Preference information is not supported. The 81st identification information may be information indicating that the update of the Preference information does not meet the request of the UE.

Figure 13:
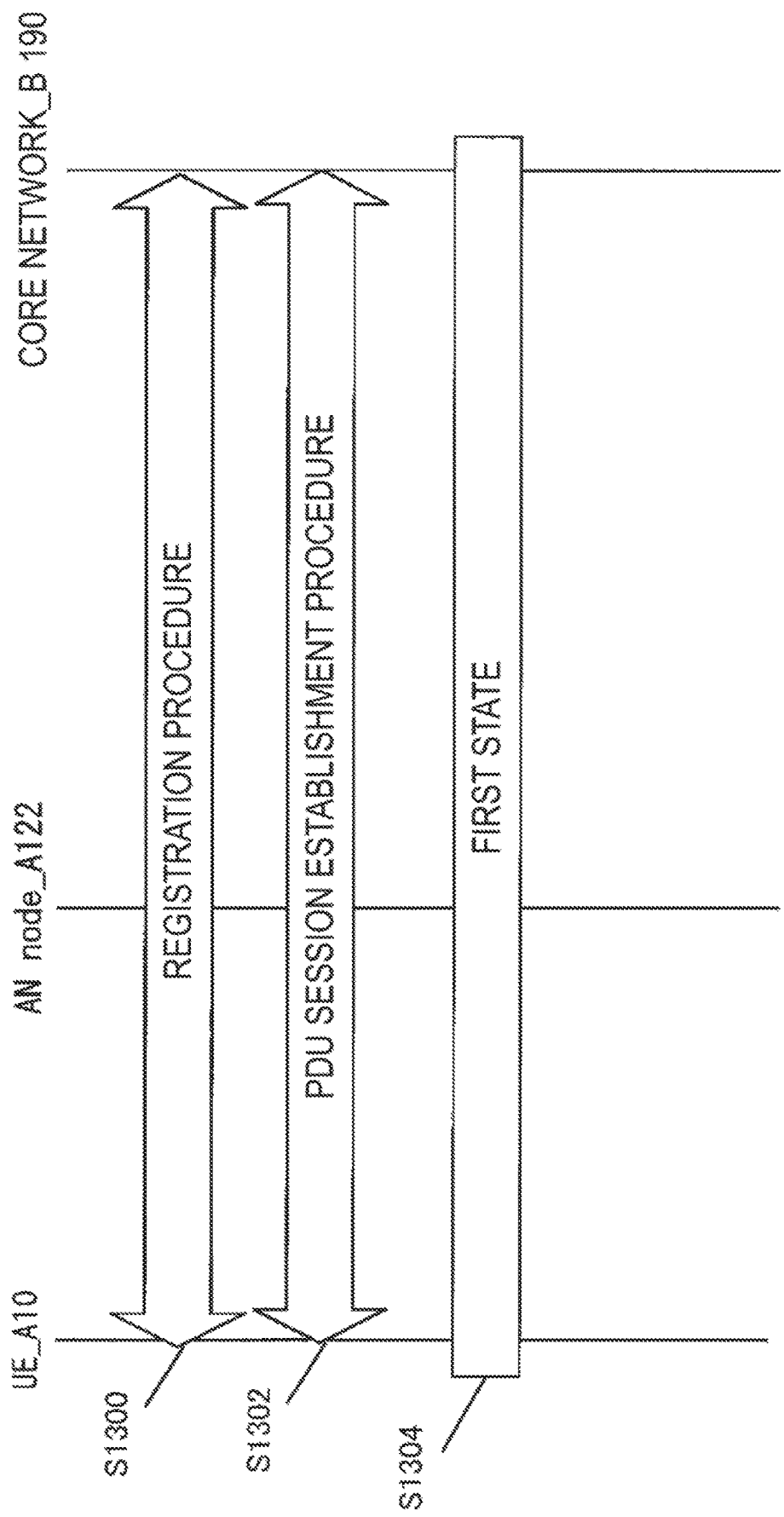
FIG. 13 is a diagram illustrating an initial procedure.

Next, an initial procedure according to the present embodiment will be described with reference to FIG. 13. In the present embodiment, each apparatus performs an initial procedure to transition to the first state, and the UE_A 10 establishes a first PDU session via the core network_B 190. The present procedure hereinafter refers to an initial procedure, and each procedure includes a registration procedure, and a PDU session establishment procedure. Details of each procedure will be described below.

In the present procedure, first, each apparatus performs a registration procedure (S1300), and the UE_A 10 transitions to a state connected to the network. Next, each apparatus performs a PDU session establishment procedure (S1302), and transitions to the first state (S1304). Note that each apparatus may exchange various pieces of capability information and/or various pieces of request information of each apparatus in the registration procedure and/or the PDU session establishment procedure.

Note that in a case that each apparatus performs exchange of various pieces of information and/or negotiation of various requests in the registration procedure, each apparatus may not perform exchange of various pieces of information and/or negotiation of various requests in the PDU session establishment procedure. On the other hand, in a case that each apparatus does not perform exchange of various pieces of information and/or negotiation of various requests in the registration procedure, each apparatus may perform exchange of various pieces of information and/or negotiation of various requests in the PDU session establishment procedure. Exchange and negotiation are not limited to the cases described above. Even in a case that each apparatus performs exchange of various pieces of information and/or negotiation of various requests in the registration procedure, each apparatus may perform exchange of various pieces of information and/or negotiation of various requests in the PDU session establishment procedure.

Each apparatus may perform the PDU session establishment procedure in the registration procedure, or may perform the PDU session establishment procedure after completion of the registration procedure. in a case that the PDU session establishment procedure is performed in the registration procedure, the PDU session establishment request message may be included in the registration request message and transmitted and/or received, the PDU session establishment accept message may be included in the registration accept message and transmitted and/or received, the PDU session establishment complete message may be included in the registration complete message and transmitted and/or received, and the PDU session establishment reject message may be included in the registration reject message and transmitted and/or received. Furthermore, in a case that the PDU session establishment procedure is performed in the registration procedure, each apparatus may establish a PDU session, based on completion of the registration procedure, or may transition to the first state.

Through the procedures described above, each apparatus completes the present procedure, Note that each apparatus involved in the present procedure may transmit and/or receive each control message described in the present procedure to transmit and/or receive one or more pieces of identification information included in each control message, and may store each transmitted and/or received piece of identification information as a context. Furthermore, each apparatus may transition to the first state, based on completion of the present procedure, 1.3.1. Overview of Registration Procedure First, an overview of a registration procedure will be described. The registration procedure is a procedure initiated by the UE_A 10 to connect to the network (the access network, and/or the core network_B 190, and/or the DN_A 5). In a state in which the UE_A 10 is not connected to the network, the UE_A 10 can perform the present procedure at any timing such as timing of terminal power activation. In other words, the UE_A 10 may initiate the present procedure at any timing in a case that the UE_A 10 is in a deregistered state (RM-DEREGISTERED). Each apparatus may transition to a registered state (RM-REGISTERED), based on completion of the registration procedure.

Furthermore, the present procedure may be a procedure to update the location registration information of the UE_A 10 in the network, and/or for the UE_A 10 to regularly notify the network of a state of the UE_A 10, and/or to update particular parameters related to the UE_A 10 in the network.

The UE_A 10 may initiate the present procedure in a case that the UE_A 10 performs mobility across TAs. In other words, the UE_A 10 may initiate the present procedure in a case that the UE_A 10 enters a TA different from a TA indicated in a held TA list. Furthermore, the UE_A 10 may initiate the present procedure in a case that the running timer expires. Furthermore, the UE_A 10 may initiate the present procedure in a case that a context of each apparatus needs to be updated due to release or invalidation of a PDU session and/or an EPS bearer. Furthermore, the UE_A 10 may initiate the present procedure in a case that a change occurs in capability information and/or preference concerning PDU session establishment of the UE_A 10. Furthermore, the UE_A 10 may initiate the present procedure regularly. Note that, not limited to these timings, the UF_A 10 can perform the present procedure at any timing in a state that a PDU session has been established.

1.3.2. Overview of PDU Session Establishment Procedure and Registration Procedure Hereinafter, a case in which the PDU session establishment procedure is performed during the registration procedure will be described.

The present procedure hereinafter refers to the PDU session establishment procedure and the registration procedure. The present procedure is a procedure for each apparatus to establish a PDU session. Note that each of the apparatuses may perform the PDU session establishment procedure with the registration procedure completed. Each apparatus may initiate the PDU session establishment procedure in the registered state, or may initiate the PDU session establishment procedure at any timing after the registration procedure. Each apparatus may establish a PDU session, based on completion of the present procedure. Furthermore, each apparatus may perform the PDU session establishment procedure not included in the registration procedure multiple times to establish a plurality of PDU sessions.

1.3.2.1. Example of PDU Session Establishment Procedure

Figure 15:
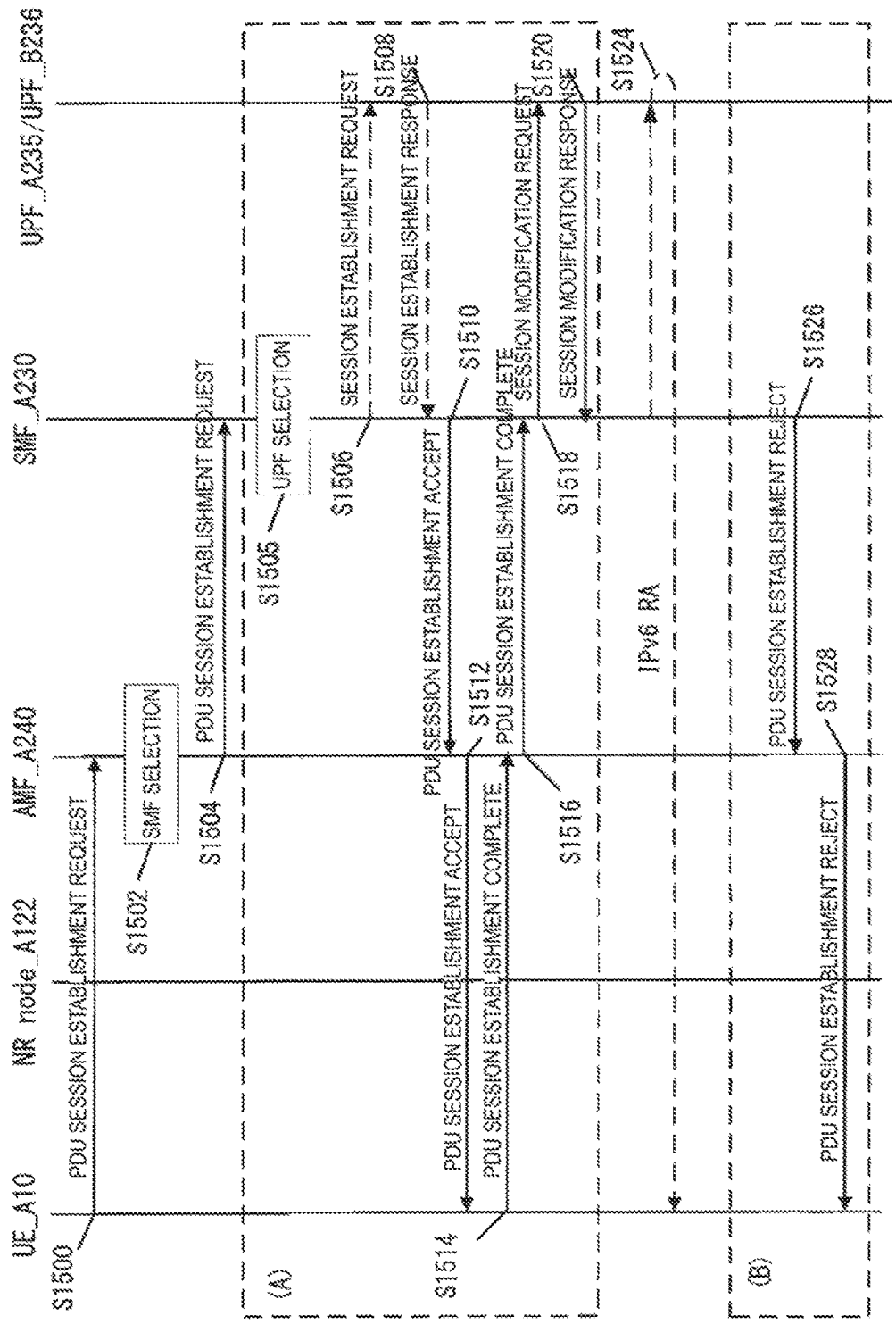
FIG. 15 is a diagram illustrating a PDU session establishment procedure.

With reference to FIG. 15, an example of a process of performing a PDU session establishment procedure will be described. Each step of the present procedure will be described below. First, the UE_A 10 transmits a PDU session establishment request message to the SMF_A 230 via the AN node_A 122 and the AMF_A 240 (S1500) (S1502) (S1504), and initiates a PDU session establishment procedure.

Note that the PDU session establishment request message may be included in the Registration request message to be transmitted. For example, the registration request message may include a PDU session establishment request message as a SM message or may include a PDU session establishment request message as a NAS message.

Specifically, the UE_A 10 transmits a PDU session establishment request message to the AMF_A 240 with the N1 interface (S1500), and the AMF_A 240 having received the PDU session establishment request message selects the SMF_A 230 as the NF of the routing destination of the PDU session establishment request message (S1502) and transmits the PDU session establishment request message to the SMF_A 230 selected with the N11 interface (S1504). Here, the AMF_A 240 may select the SMF_A 230 of the routing destination, based on the information included in the PDU session establishment request message. More particularly, the AMF_A 240 may select the SMF_A 230 of the routing destination, based on each identification information, and/or subscriber information, and/or capability information of the network, and/or the operator policy, and/or the state of the network, and/or the context already held by the AMF_A 240, obtained based on reception of the PDU session establishment request message.

Note that in a case that the PDU session is PDN connection, the PDU session establishment request message may be a PDN connectivity request message. Furthermore, the PDU session establishment request message may be a NAS message transmitted and/or received on the N1 interface and the N11 interface, or may be included in the NAS message. The PDU session establishment request message is not limited to the PDU session establishment request message described above, and may be a message for requesting an establishment of a PDU session.

Here, the UE_A 10 may include at least one or more pieces of identification information out of the first to seventh identification information in the PDU session establishment request message and/or the registration request message and/or the NAS message, or may include these pieces of identification information in the PDU session establishment request message and/or the registration request message and/or the NAS message to indicate a request of the UE_A 10.

Furthermore, the UE_A 10 may transmit one or more pieces of identification information out of the first to seventh identification information to request to establish the PDU session to connect to the DN_A 5. More particularly, the UE_A 10 may transmit the fifth identification information and/or transmit the fourth identification information and the fifth identification information in association with each other to request to establish the PDU session to connect to the DN_A 5.

Furthermore, the UE_A 10 may transmit the sixth identification information and/or transmit the fifth identification information and the sixth identification information in association with each other to request to establish the PDU session identified by the PDU session ID indicated by the sixth identification information, or to request the connection destination of the established PDU session to be the DN_A 5.

Furthermore, the UE_A 10 may transmit the seventh identification information and/or transmit the sixth identification information and the seventh identification information in association with each other to indicate that the PDU session identified by the PDU session ID identified by the sixth identification information is the request type indicated by the seventh identification information.

Additionally, the UE_A 10 may transmit the first identification information and/or transmit the sixth identification information and the first identification information in association with each other to request to transmit the preference information from the anchor point during or after establishment of the PDU session indicated by the sixth identification information.

Furthermore, the UE_A 10 may transmit the second identification information and/or transmit the sixth identification information and the second identification information in association with each other to request the SSC mode of the PDU session identified by the PDU session ID identified by the sixth identification information.

Furthermore, the UE_A 10 may transmit the third identification information and/or transmit the sixth identification information and the third identification information in association with each other to request the establishment of the multi homed PDU session, to request an adding or delete procedure of the route by adding or deleting the anchor point for the PDU session identified by the PDU session ID identified by the sixth identification information, to request support of the procedure related to the multi homed PDU session, or to request connection to the anchor point supporting the procedure related to the multi homed PDU session.

Note that the UE_A 10 may determine which piece of identification information out of the first to seventh identification information is to be included in the PDU session establishment request message and/or the registration request message and/or the NAS message, based on capability information of the UE_A 10, and/or a policy such as a UE policy, and/or preference of the UE_A 10. Note that determination performed by the UE_A 10 as to which piece of identification information is to be included in the PDU session establishment request message and/or the registration request message and/or the NAS message is not limited to the determination described above.

For example, in a case that the UE_A 10 transmits the second identification information indicating SSC mode 3, and/or in a case that the UE_A 10 requests the establishment of the PDU of SSC mode 3, and/or in a case that the UE_A 10 transmits the third identification information, and/or in a case that the UE_A 10 requests the establishment of a multi homed PDU session, the UE_A 10 may include the first identification information in the PDU session establishment request message and/or the registration request message and/or NAS message to transmit.

Furthermore, the UE_A 10 may transmit information indicating whether to receive the information indicating the preference of a PDU session by a Router Advertizement (RA) message or to receive the information indicating the preference of a PDU session by a PDU session accept message. Note that this information may be information indicating any of the reception methods described above. Note that the reception method may be determined based on the UE policy. As such, the UE_A 10 may request the reception method of information indicating the preference of the PDU session. Hereinafter, the identification information described above will be described using the name of the reception method request information. Note that in a case that the first identification information and/or the second identification information indicating SSC mode 3 and/or the third identification information are included in the PDU session establishment request message and/or the registration request message and/or the NAS message, the UE_10 may include the control message included in the reception method request information to transmit.

The SMF_A 230 receives the PDU session establishment request message, and performs first condition determination. The first condition determination is intended to determine whether or not the SMF_A 230 accepts a request of the UE_A 10, in the first condition determination, the SMF_A 230 determines whether the first condition determination is true or false. The SMF_A 230 initiates the procedure of (A) in the present procedure in a case that the first condition determination is true, and initiates the procedure of (B) in the present procedure in a case that the first condition determination is false. Note that steps in a case that the first condition determination is false will be described later.

As follows, steps in a case that the first condition determination is true, in other words, each step of the procedure of (A) in the present procedure will be described. The SMF_A 230 selects the UPF_A 235 of the establishment destination of the PDU session (S1505), transmits a Session Establishment request message to the selected UPF_A 235 (S1506), and initiates the procedure of (A) in the present procedure.

Here, the SMF_A 230 may select one or multiple UPFs_A 235, based on each identification information, and/or capability information of the network, and/or subscriber information, and/or the operator policy, and/or the state of the network, and/or the context already held by the SMF_A 230, obtained based on reception of the PDU session establishment request message. Note that in a case that a plurality of UPFs_A 235 are selected, the SMF_A 230 may transmit a session establishment request message to each UPF_A 235.

The UPF_A 235 receives the session establishment request message and creates a context for the PDU session. Furthermore, the UPF_A 235 transmits a Session Establishment response message to the SMF_A 230 (S1508), based on the reception of the session establishment request message and/or the creation of the context for the PDU session. Furthermore, the SMF_A 230 receives the session establishment response message. Note that the session establishment request message and the session establishment response message may be control messages transmitted and/or received on the N4 interface. Furthermore, the session establishment response message may be a response message to the session establishment request message.

Furthermore, the SMF_A 230 may perform address assignment of the address assigned to the UE_A 10, based on the reception of the PDU session establishment request message and/or the selection of the UPF_A 235 and/or the reception of the session establishment response message. Furthermore, the SMF_A 230 may associate the address assigned to the UE_A 10 with information indicating the address used for the communication to the DN_A 5. Note that the SMF_A 230 may perform the address assignment of the address assigned to the UE_A 10 during the PDU session establishment procedure, or may perform the address assignment of the address assigned to the UE_A 10 after the completion of the PDU session establishment procedure.

Specifically, in a case that the SMF_A 230 assigns the IPv4 address without using DHCPv4, the SME_A 230 may perform address assignment or may transmit the assigned address to the UE_A 10 during the PDU session establishment procedure. Furthermore, in a case that the SMF_A 230 uses DHCPv4 or DHCPv6 or Stateless Address Autoconfiguration (SLAAC) to assign an IPv4 address and/or an IPv6 address and/or an IPv6 prefix, the SMF_A 230 may perform the address assignment after the PDU session establishment procedure, or may include the assigned address in the RA message to transmit to the UE_A 10. Note that the address assignment performed by the SMF_A 230 is not limited to these.

Furthermore, based on the completion of the address assignment of the address assigned to UE_A 10, the SMF_A 230 may transmit the assigned address to the UE_A. 10 including the 14th identification information, or may associate information indicating the assigned address with information indicating whether or not the assigned address is an address that can be used for the user data communication performed with the DN_A 5 to transmit to the UE_A 10, without including the 14th identification information. In this case, the UE_A 10 may receive the 14th identification information and/or information indicating the assigned address and/or information indicating whether or not the assigned address is an address that can be used for the user data communication performed with the DN_A 5, transmitted by the SMF_A 230.

The SMF_A 230 transmits a PDU session establishment accept message to the UE_A 10 via the AMF_A 240 (S1510) (S1512), based on the reception of the PDU session establishment request message and/or the selection of the UPF_A 235 and/or the reception of the session establishment response message and/or the completion of the address assignment of the address assigned to the UE_A 10.

Note that, in a case that the PDU session establishment request message is included in the Registration request message and transmitted, the PDU session establishment accept message may be included in the Registration accept message to transmit. For example, the registration accept message may include a PDU session establishment accept message as a SM message or may include a PDU session establishment accept message as a NAS message.

Specifically, SMF_A 230 transmits the PDU session establishment accept message to the AMF_A 240 with the N11 interface (S1510), and the AMF_A 240 having received the PDU session establishment request message transmits the PDU session establishment accept message to the UE_A 10 with the N1 interface (S1512).

Note that in a case that the PDU session is PDN connection, the PDU session establishment accept message may be a PDN connectivity accept message. Furthermore, the PDU session establishment accept message may be a NAS message transmitted and/or received on the N11 interface and the N1 interface, or may be included in the NAS message to transmit. The PDU session establishment accept message is not limited to the PDU session establishment accept message described above, and may be a message indicating that the establishment of the PDU session has been accepted.

Here, the SMF_A 230 and/or the AMF_A 240 may include at least one or more pieces of identification information out of the 11th to 14th identification information in the PDU session establishment accept message and/or the registration accept message and/or the NAS message, or may include these pieces of identification information in the PDU session establishment accept message and/or the registration accept message and/or the NAS message to indicate that the request of the UE_A 10 has been accepted.

Furthermore, the SMF_A 230 may transmit one or more pieces of identification information out of the 11th to 14th identification information to indicate that the network has accepted the request of the establishment of the PDU session to connect to the DN_A 5, or to indicate that the establishment of the PDU session to connect to the DN_A 5 have been allowed.

More particularly, the SMF_A 230 and/or the AMF_A 240 may transmit the 11th identification information and/or transmit the 14th identification information and the 11th identification information in association with each other to notify the established PDU session and/or the preference information of the route included in the PDU session, or to notify the preference information of the route by the address indicated by the 14th identification information.

Furthermore, the SMF_A 230 and/or the AMF_A 240 may transmit the 12th identification information to notify the established PDU session and/or the SSC mode of the route included in the PDU session, or to indicate that the SSC mode requested by the UE_A 10 has been allowed.

Furthermore, the SMF_A 230 and/or the AMF_A 240 may transmit the 13th identification information to indicate that the established PDU session is a multi homed PDU session, to indicate that an anchor point can be added or deleted to the established PDU session, or to indicate that the request of the UE_A 10 has been allowed.

Further, the SMF_A 230 and/or the AMF_A 240 may transmit the 14th identification information to indicate that the PDU session to connect to the DN_A 5 has been established, or to indicate that the address used in the user data communication performed for the DN_A 5 by using the PDU session established is the address of the PDU session type indicated by the 14th identification information and/or the address indicated by the 14th identification information.

Note that the SMF_A 230 and/or the AMF_A 240 may determine which piece of identification information out of the 11th to 14th identification information is to be included in the PDU session establishment accept message and/or the registration accept message and/or the NAS message, based on a received piece of identification information, and/or capability information of the network, and/or a policy such as an operator policy, and/or a state of the network. Note that determination performed by the SMF_A 230 and/or the AMF_A 240 as to which piece of identification information is to be included in the PDU session establishment accept message and/or the registration accept message and/or the NAS message is not limited to the determination described above.

The UE_A 10 receives the PDU session establishment accept message, and further transmits a PDU session establishment complete message to the SMF_A 230 via the AMF_A 240 (S1514) (S1516). Furthermore, the SMF_A 230 receives the PDU session establishment complete message, and performs second condition determination.

Specifically, the UE_A 10 transmits the PDU session establishment complete message to the AMF_A 240 with the N1 interface (S1514), and the AMF_A 240 having received the PDU session establishment complete message transmits the PDU session establishment complete message to the SMF_A 230 with the N11 interface (S1516).

Note that in a case that the PDU session is PDN connection, the PDU session establishment complete message may be a PDN Connectivity complete message, or an Activate default EPS bearer context accept message. Furthermore, the PDU session establishment complete message may be a NAS message transmitted and/or received on the N1 interface and the N11 interface. The PDU session establishment complete message may be a response message in response to the PDU session establishment accept message. However, the PDU session establishment complete message is not limited to this, and may be a message for indicating that the PDU session establishment procedure is to complete.

The second condition determination is intended to determine a type of a message on the N4 interface transmitted and/or received. In a case that the second condition determination is true, then the SMF_A 230 transmits a Session Modification request message to the UPF_A 235 (S1518), and further receives a session modification accept (Session Modification response) message transmitted by the UPF_A 235 having received the session modification request message (S1520). In a case that the second condition determination is false, then the SMF_A 230 transmits a Session establishment request message to the UPF_A 235 (S1518), and further the UPF_A 235 having received the session establishment request message receives a Session Modification accept message transmitted (S1520). Each apparatus completes the procedure of (A) in the present procedure, based on the transmission and/or reception of the PDU session establishment complete message and/or the transmission and/or reception of the session modification response message and/or the transmission and/or reception of the session establishment response message.

Note that in the procedure of (A) in the present procedure, in a case that the address assigned to the UE_A 10 has not been notified to the UE_A 10, the SMF_A 230 may transmit the RA via the UPF_A 235 serving as the anchor point (S1524), Here, the RA may include an IPv6 prefix and default router address associated with the PDU session to transmit, Note that the default router address may be an address of the UPF_A 235. Furthermore, the UE_A 10 having received the RA may generate an IPv6 address by using the IPv6 network prefix included in the RA.

Furthermore, the SMF_A 230 and/or the UPF_A 235 may transmit one or more pieces of identification information out of the 11th identification information and the 14th identification information to the RA to notify that the PDU session for the DN_A 5 has been established, or to notify that an address has been assigned to the UE_A 10. Here, the 11th identification information indicates information indicating a medium preference level, and may be information indicating, for example, "Medium". Thus, in a case that the preference of a PDU session established thereafter and/or the IPv6 prefix associated with the PDU session is high, the UE_A 10 can perform transmission of user data by using the PDU session with high preference and/or the IPv6 prefix associated with the PDU session.

Note that the SMF_A 230 may transmit the 11th identification information to the UE_A 10, based on the condition. For example, in a case of having received the first identification information and/or in a case of having received the second identification information indicating SSC mode 3 and/or in a case of having received the third identification information, the 11th identification information may be transmitted to the UE_A 10.

Additionally, in a case that the above-described condition is not satisfied, the SMF_A 230 may not transmit the 11th identification information. Alternatively, in a case that the above-described condition is not satisfied, the 11th identification information indicating the default may be transmitted. Note that the information indicating the default may be information representing "medium". For example, in a case that the second identification information indicating SSC mode 1 is received, and/or in a case that the first identification information is not received, and/or in a case that the third identification information is not received, the 11th identification information may be configured not to be transmitted. Alternatively, in such a case, the 11th identification information indicating the default may be configured to be transmitted.

The SMF_A 230 may select whether to transmit the 11th identification information included in the RA or to transmit the 11th identification information included in the PDU session accept message. Note that the SMF_A 230 may select a method indicated by the reception method request information, based on the reception method request information transmitted by the UE_A 10.

Next, each step of the procedure of (B) in the present procedure will be described. The SMF_A 230 transmits a PDU session establishment reject message to the UE_A 10 via the AMF_A 240 (S1526) (S1528), and initiates the procedure of (B) in the present procedure.

Specifically, the SMF_A 230 transmits the PDU session establishment reject message to the AMF_A 240 with the N11 interface (S1526), and the AMF_A 240 having received the PDU session establishment request message transmits the PDU session establishment reject message to the UE_A 10 with the N1 interface (S1528).

Note that in a case that the PDU session is PDN connection, the PDU session establishment reject message may be a PDN connectivity reject message. Furthermore, the PDU session establishment reject message may be a NAS message transmitted and/or received on the N11 interface and the N1 interface, or may be included in the NAS message to transmit. The PDU session establishment reject message is not limited to the PDU session establishment reject message described above, and may be a message indicating that the establishment of the PDU session has been rejected.

Here, the SMF_A 230 and/or the AMF_A 240 may include at least the 15th identification information in the PDU session establishment reject message and/or the NAS message, or may include these pieces of identification information in the PDU session establishment reject message and/or the NAS message to indicate that the request of the UE_A 10 has been rejected.

Furthermore, the SMF_A 230 and/or the AMF_A 240 may transmit the 15th identification information to indicate that the network has rejected the request of the establishment of the PDU session to connect to the DN_A 5, or to indicate that the establishment of the PDU session to connect to the DN_A 5 have not been allowed. Furthermore, the SMF_A 230 may transmit the 15th identification information to indicate that the PDU session that connects to the DN_A 5 has not been established.

For example, the SMF_A 230 and/or the AMF_A 240 may transmit the 15th identification information to indicate that the connection to the DN_A 5 has been rejected, indicate the rejected cause, indicate that the request of UE_A 10 has been rejected, indicate that the connection supporting the requested SSC mode cannot be established, or indicate that the establishment of the multi home PDU session is not supported.

Each apparatus completes the present procedure, based on the completion of the procedure of (A) or (B) in the present procedure or the transmission and/or reception of S1524. Note that each apparatus may transition to a state in which a PDU session is established, based on completion of the procedure of (A) in the present procedure. Each apparatus may recognize that the present procedure has been rejected, or may transition to a state in which a PDU session is not established, based on completion of the procedure of (B) in the present procedure.

Furthermore, each apparatus may perform processing based on identification information transmitted and/or received in the present procedure, based on completion of the present procedure.

For example, the UE_A 10 may perform a procedure to add or delete an anchor point to the established PDU session in a case that one or more pieces of identification information out of the 11th to 13th identification information has been received. Specifically, based on the reception of the 11th identification information, the UE_A 10 may compare preference information for other routes included in the PDU session and initiate an anchor point deletion procedure. Alternatively, an adding procedure of an anchor point may be initiated based on the reception of the 11th identification information. Alternatively, based on that the SSC mode indicated by the 12th identification information is SSC mode 2 or SSC mode 3 and further the reception of the 13th identification information, the UE_A 10 may initiate and/or perform a procedure of adding or deleting an anchor point to the PDU session.

Furthermore, in a case of having received the 11th identification information, the UE_A 10 may store preference information indicated by the 11th identification information in the storage unit. In this case, in a case that preference information for other routes is already stored, it may be stored additionally, and in a case that preference information for the same route is stored, the information indicated by the 11th identification information may be updated.

Furthermorein a case that the UE_A 10 receives the 12th identification information, the UE_A 10 may control the performance of the relocation of the anchor point, based on the SSC mode indicated by the 12th identification information. Specifically, in a case that the SSC mode indicated by the 12th identification information is SSC mode 1, the relocation of the anchor point may not be performed, and in a case that the SSC mode indicated by the 12th identification information is SSC mode 2 or SSC mode 3, the relocation of the anchor point with the indicated SSC mode may be performed.

Furthermore, the SMF_A 230 and/or the AMF_A 240 may perform a procedure to add or delete an anchor point to the established PDU session in a case that one or more pieces of identification information out of the first to third identification information has been received. Specifically, in a case that the first identification information is information requesting a notification of preference information, and/or in a case that the SSC mode indicated by the second identification information is SSC mode 2 or SSC mode 3, and/or in a case that the third identification information requests the establishment of the multi home PDU session, then the SMF_A 230 and/or the AMF_A 240 may perform a procedure to add or delete an anchor point to the PDU session.

Furthermore, the AMF_A 240 and/or the SMF_A 230 may transition the state associated with the UE_A 10 to a state where a PDU session has not been established, or may transition the state associated with UE_A 10 to an abnormal state, based on the transmission of the PDU session establishment reject message and/or the transmission of each identification information included in the PDU session establishment reject message. Note that, a state to which the state associated with the UE_A 10 transitions, based on the completion of the present procedure, is not limited to these states.

The first condition determination may be performed based on identification information, and/or subscriber information obtained from the UDM_A 50, and/or an operator policy included in the PDU session establishment request message and/or the registration request message and/or the NAS message. For example, the first condition determination may be true in a case that the request of the UE_A 10 is allowed by the network. The first condition determination may be false in a case that the request of the UE_A 10 is not allowed by the network. Furthermore, the first condition determination may be true in a case that the network of the connection destination of the UE_A 10 and/or an apparatus in the network supports the function that the UE_A 10 requests, and may be false in a case that such network and/or apparatus does not support the function that the UE_A 10 requests. Note that conditions with which true or false of the first condition determination is determined may not be limited to the previously described conditions. The second condition determination may be performed based on whether or not a session on the N4 interface for the PDU session has been established. For example, the second condition determination may be true in a case that a session on the N4 interface for the PDU session has been established, and may be false in a case that a session on the N4 interface for the PDU session has not been established. Note that conditions with which true or false of the second condition determination is determined may not be limited to the previously described conditions.

1.4. Overview of PDU Session Anchor Relocation Procedure

In this section, an overview of the PDU session anchor relocation procedure will be described.

1.4.1. Description of First PDU Session Anchor Relocation Procedure

Figure 16:
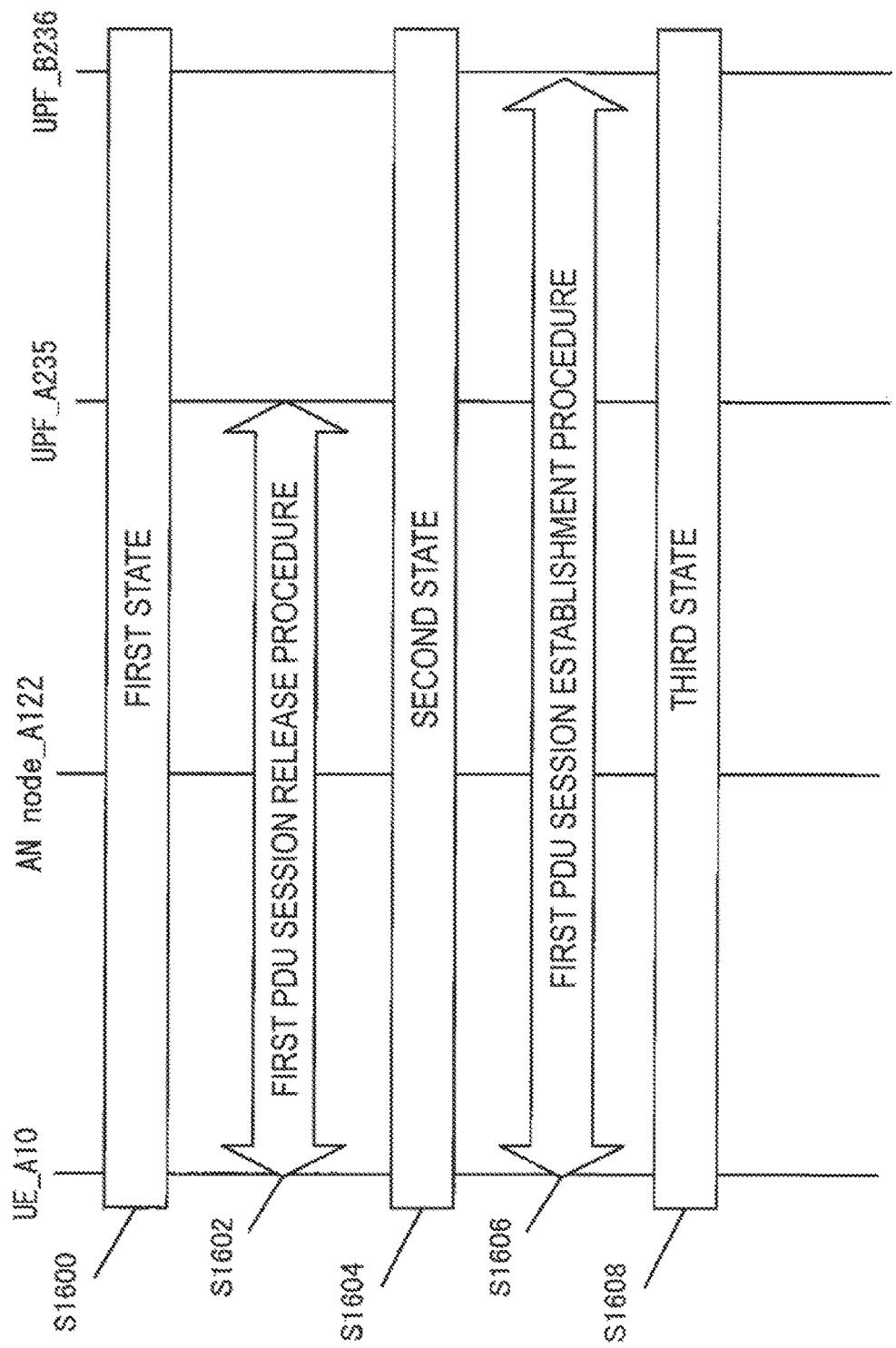
FIG. 16 is a diagram illustrating a first PDU session anchor relocation establishment procedure.

First, a first PDU session anchor relocation will be described using FIG. 16. In the present embodiment, each apparatus initiates with the state of having transitioned to the first state (S1600). Hereinafter, the present procedure refers to a first Pall session anchor relocation procedure, and each procedure includes a first PDU session release procedure and a first PDU session establishment procedure. Details of each procedure will be described below.

Here, the PDU session anchor ocation is a procedure for modifying an anchor point of an established session.

Note that in a case of performing the first PDU session anchor relocation, the UPF_A 235 may be in a state of being associated with SSC mode 2 to establish the PDU session. In other words, in the initial procedure for transitioning to the first state, each apparatus may be in a state of associating SSC mode 2 and the UPF_A 235 to establish a PDU session, and each apparatus may be in a state of associating SSC mode 2 and the UPF_A 235 to store. Specifically, in the initial procedure, the UE_A 10 may receive the 12th identification information from the network, and further the 12th identification information may be information indicating SSC mode 2.

In the present procedure, each apparatus at first performs a first PDU session release procedure (S1602), and transitions to the second state (S1604). Next, each apparatus performs a first PDU session establishment procedure (S1606), and transitions to the third state (S1608).

Note that each apparatus may exchange each piece of capability information and/or each piece of main request information of each apparatus in the first PDU session release procedure and/or the first PDU session establishment procedure.

Through the procedures described above, each apparatus completes the present procedure. Note that each apparatus involved in the present procedure may transmit and/or receive each control message described in the present procedure to transmit and/or receive one or more pieces of identification information included in each control message, and may store each transmitted and/or received piece of identification information as a context. Furthermore, each apparatus may transition to the third state, based on completion of the present procedure.

1.4.1.1. Example of First PDU Session Release Procedure

First, an overview of the first PDU session release procedure will be described. The present procedure hereinafter refers to the first PDU session release procedure. The procedure is a procedure for each apparatus to release the PDU session to perform the PDU session anchor relocation for the PDU session using the anchor (UPF_A 235) associated with SSC mode 2. Note that the PDU session may include one or multiple routes. In other words, the PDU session may be assigned one or multiple anchor points.

Alternatively, each apparatus may initiate the PDU session release procedure at any timing after transitioning to the first state.

An example of a process of performing the first PDU session establishment procedure will be described with reference to FIG. 17 below. Each step of the present procedure will be described below. First, the SMF_A 230 determines the initiation of the performance of the anchor (UPF) relocation (S1702). The SMF_A 230 may determine that relocation of the anchor is necessary.

The SMF_A 230 may determine the anchor relocation, based on the UPF_A 235 being in an overflow state and/or based on the UE_A 10 having moved and/or based on modification of a network policy and/or based on a request from another NF. Note that the factors for determining the relocation of the anchor are not limited to these.

Next, the SMF_A 230 transmits a Session release request message to the UPF_A 235 of the relocation source (S1704), and initiates a session release procedure between the SMF_A 230 and the UPF_A 235. Here, the SMF_A 230 may select one or multiple UPFs, based on the determination of UPF relocation and/or based on the context already held by the SMF_A 230. Note that in a case that a plurality of UPFs_A 235 are selected, the SMF_A 230 may transmit the session release request message to each UPF_A 235.

The UPF_A 235 receives the session release request message and deletes a context for the PDU session. Furthermore, the UPF_A 235 transmits a Session release response message to the SMF_A 230 (S1706), based on the reception of the session release request message and/or the deletion of the context for the PDU session. Furthermore, the SMF_A 230 receives the session release response message. Note that the session release request message and the session release response message may be control messages transmitted and/or received on the N4 interface. Furthermore, the session release response message may be a response message to the session release request message.

Next, the SMF_A 230 transmits a PDU session release command message to the UE_A 10 via the AMF_A 240 (S1708), based on the reception of the PDU session release response message and/or determination of the PDU session anchor relocation.

Specifically, the SMF_A 230 transmits the PDU session release command message to the AMF_A 240 (S1708), and the AMF_A 240 having received the PDU session release command message transmits the PDU session release command message to the UE_A 10 (S1710).

Note that in a case that the PDU session is PDN connection, the PDU session release command message may be a Deactivate EPS bearer context request (Deactivate EPS bearer request) message. Furthermore, the PDU session release command message may be a NAS message transmitted and/or received on the N11 interface and the N1 interface, or may be included in the NAS message to transmit. The PDU session release command message is not limited thereto, and may be a message indicating that release of the PDU session has been requested from the network and/or that the network has determined the release of the PDU session.

Here, the SMF_A 230 and/or the AMF_A 240 may include at least one or more pieces of identification information out of the 21st to 22nd identification information in the PDU session release command message and/or the NAS message, or may include these pieces of identification information in the PDU session release command message and/or the NAS message to indicate the request of the release of the PDU session.

Furthermore, the SMF_A 230 and/or the AMF_A 240 may transmit one or more pieces of identification information out of the 21st to 22nd identification inform ation to indicate that the network has accepted the request of the establishment of the PDU session to connect to the DN_A 5, or to indicate that the establishment of the PDU session to connect to the DN_A 5 have been allowed.

More particularly, the SMF_A 230 and/or the AMF_A 240 may transmit the 21st identification information to indicate to continue information related to the PDU session released for a period of time after the PDU session has been released. Specifically, the SMF_A 230 may store information related to the UPF_A 235 associated with the PDU session in association with the 21st identification information, and the AMF_A 240 may store information for identifying the SMF_A 230, for example, SMF ID, in association with the 21st identification information.

Furthermore, the SMF_A 230 and/or the AMF_A 240 may transmit the 22nd identification information to indicate that the release of the PDU session is performed for the PDU session anchor relocation.

Note that the SMF_A 230 and/or the AMF_A 240 may determine which piece of identification information out of the 21st to 22nd identification information is to be included in the PDU session release command message and/or the NAS message, based on a received piece of identification information, and/or capability information of the network, and/or a policy such as an operator policy, and/or a state of the network. Note that determination performed by the SMF_A 230 and/or the AMF_A 240 as to which piece of identification information is to be included in the PDU session release command message and/or the NAS message is not limited to the determination described above.

The UE_A 10 receives the PDU session release command message, and further transmits a PDU session release accept message to the SMF_A 230 via the AMF_A 240 (S1712) (S1714).

Specifically, the UE_A 10 transmits the PDU session release accept message to the AMF_A 240 with the N1 interface (S1712), and the AMF_A 240 having received the PDU session release accept message transmits the PDU session release accept message to the SMP_A 230 with the N11 interface (S1714).

Note that in a case that the PDU session is PDN connection, the PDU session release accept message may be a Deactivate EPS bearer context accept message. Furthermore, the PDU session release accept message may be a NAS message transmitted and/or received on the N1 interface and the N11 interface, or may be included in the NAS message to transmit and/or receive. The PDU session release accept message may be a response message in response to the PDU session release command message. However, the PDU session release accept message is not limited to this, and may be a message for indicating that the PDU session release procedure is to complete.

Subsequently, the SMF_A 230 transmits a PDU session release notification message to the AMF_A 240 (S1716). The SMF_A 230 may transmit the PDU session release notification message to notify the completion of the release of the PDU session, and may notify that the PDU session has been released but still continue storing part of information for the relocation. Note that the PDU session release notification message is not limited to the PDU session release notification message described above, and may be a message for notifying a release of a PDU session.

Note that the AMF_A 240 may initiate counting the timer with a timer to manage the storage of information related to the PDU session, based on the reception of the PDU session release accept message and/or based on the reception of the PDU session release notification message and/or the transmission of the PDU session release command message. Furthermore, the AMF_A 240 may initiate associating and storing the 21st identification information and information related to the PDU session, for example, the SMF ID identifying the SMF_230.

Alternatively, the AMF_A 240 may initiate storing the information described above, based on more detailed conditions. For example, in a case that the PDU session release notification message including the 21st identification information and/or the 22nd identification information is received, and/or in a case of releasing the PDU session of SSC mode 2, based on the reception of the PDU session release accept message and/or the reception of the PDU session release notification message and/or the transmission of the PDU session release command message, the AMF_A 240 may initiate storing the information described above. Note that such detailed conditions may be determined by a system, an operator policy, or the like. Furthermore, in a case that these conditions are not satisfied, the AMF_A 240 may not store the information described above and initiate counting the timer. The timer for managing the storage of the information related to the PDU session may be stored by the AMF_A 240 in pre-configuration, or may be determined based on a received piece of identification information, and/or capability information of the network, and/or a policy such as an operator policy, and/or a state of the network.

Furthermore, in a case that the counting of the timer using the timer that manages the storage of information related to the PDU session has expired, the AMF_A 240 may release information related to the PDU session and/or the context.

The SMF_A 230 may initiate counting the timer with a timer to manage the storage of information related to the PDU session, based on the reception of the PDU session release accept message and/or based on the transmission of the PDU session release notification message and/or the reception of the PDU session release command message. Furthermore, the SMF_A 230 may initiate associating and storing the 21st identification information and information related to the PDU session.

Alternatively, the SMF_A 230 may initiate storing the information described above, based on more detailed conditions. For example, in a case of having received the PDU session release accept message including the 21st identification information and/or the 22nd identification information, and/or in a case that the PDU session release notification message including the 21st identification information and/or the 22nd identification information is transmitted, and/or in a case of releasing the PDU session of SSC mode 2, based on the reception of the PDU session release accept message and/or the transmission of the PDU session release notification message and/or the reception of the PDU session release command message, the SMF_A 230 may initiate associating and storing the counting of the timer described above, the 21st identification information, and information related to the PDU session.

Note that such detailed conditions may be determined by a system, an operator policy, or the like. Furthermore, in a case that these conditions are not satisfied, the SMF_A 230 may not store the information described above and initiate counting the timer. Here, the information related to the PDU session may be the UPF ID identifying the UPF_A 235 of the relocation source, and in this case, the SMF_A 230 selects the UFP_B 236 of the relocation destination during the first PDU session establishment procedure.

Alternatively, information related to the PDU session may be the UPF ID identifying the UPF_B 236 of the relocation destination, and in this case, the SMF_A 230 may select the UPF_B 236 of the relocation destination, based on the reception of the PDU session release response message and/or the determination of the PDU session anchor relocation.

Here, the timer for managing the storage of the information related to the PDU session may be stored by the SMF_A 230 in pre-configuration, or may be determined based on a received piece of identification information, and/or capability information of the network, and/or a policy such as an operator policy, and/or a state of the network.

Furthermore, in a case that the counting of the timer using the timer that manages the storage of information related to the PDU session has expired, the SMF_A 230 may release information related to the PDU session and/or the context.

Each apparatus completes the present procedure, based on the transmission and/or reception of S1716. Note that each apparatus may transition to a state in which the first PDU session has been released, based on completion of the present procedure. Furthermore, each apparatus may perform processing based on identification information transmitted and/or received in the present procedure, based on completion of the present procedure.

For example, in a case that the UE_A 10 has received one or more pieces of identification information out of the 21st to 22nd identification information, the UE_A 10 may immediately initiate the first PDU session establishment procedure.

Furthermore, in a case that the UE_A 10 has received one or more pieces of identification information out of the 21st to 22nd identification information, the UE_A 10 may not temporarily release information related to the PDU session or may immediately release information related to the PDU session.

Figure 17:
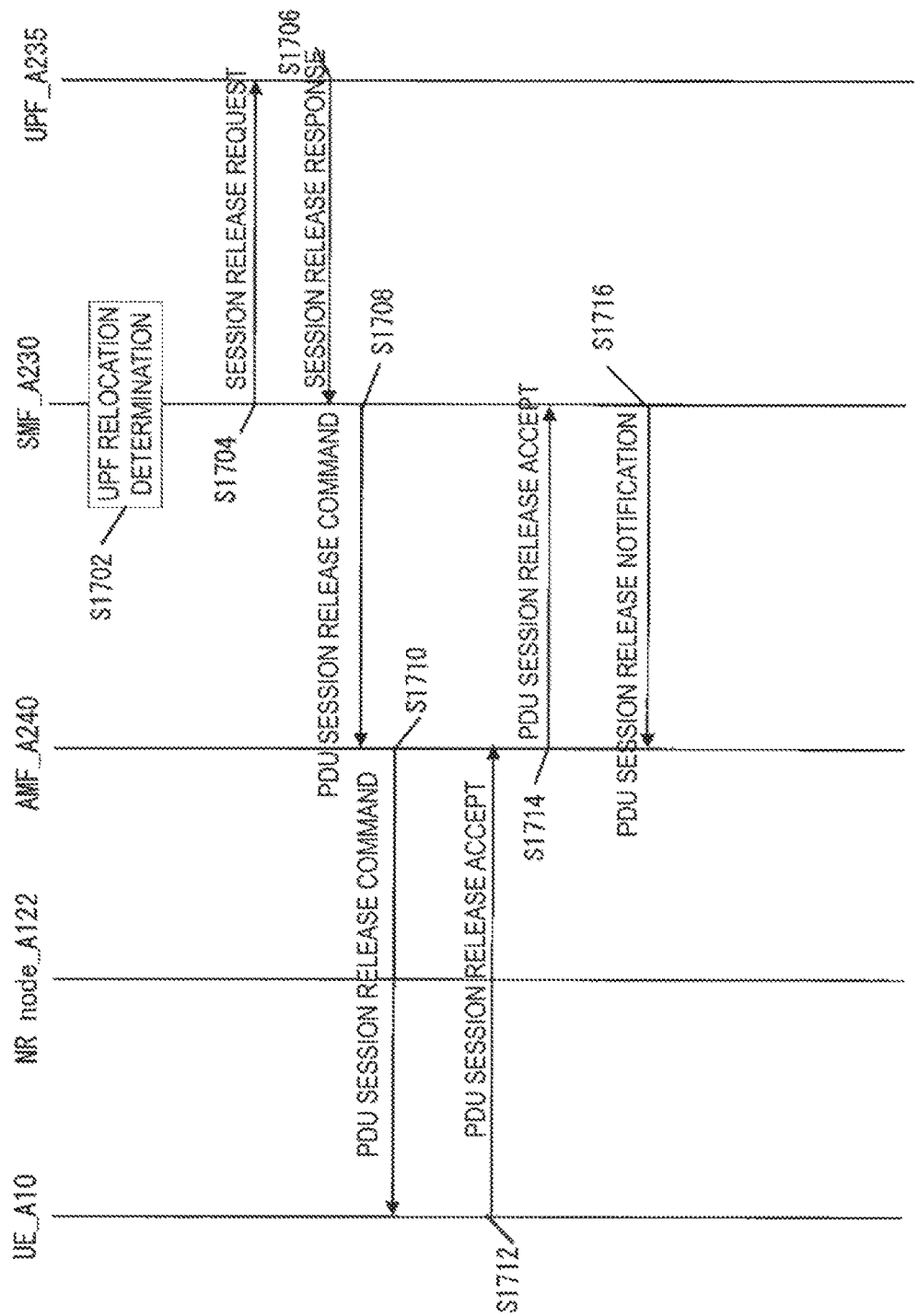
FIG. 17 is a diagram illustrating a first Pall session release procedure.

Note that in the example of the present procedure, the procedure in which the SMF_A 230 initiates to release the PDU session is described based on FIG. 17, but the present procedure is not limited to this, and other procedures may be used. For example, the SMF_A 230 may perform the UPF relocation determination process at S1702 and then transmit a NAS message including the 21st identification information and/or the 22nd identification information to the UE_A 10 via the AMF_A 240. Note that the NAS message may be a control message including PDU session ID to release, and may be control information indicating to request the initiation of the UE-initiated PDU session release procedure to the UE_A 10, or to notify the UE-initiated PDU session release procedure to initiate.

Based on the reception of the NAS message described above, the UE_A 10 may transmit the PDU session release request message to the AMF_A 240. Furthermore, the AMF_A 240 may transmit the received PDU session release request message to the SMF_A 230. Here, the UE_A 10 may include the PDU session ID received based on the NAS message described above and/or the 21st identification information in the PDU session release request message. Note that the procedure after the SMF_A 230 has received the PDU session release request message may be the subsequent procedure after S1704 described with reference to FIG. 17.

1.4.1.2. Description of First PDU Session Establishment Procedure

The present procedure hereinafter refers to a first PDU session establishment procedure. The present procedure is a procedure for each apparatus in the second state to establish a second PDU session. Note that each apparatus may perform the first PDU session establishment procedure from a state where the first PDU session release procedure has been completed. In addition, each apparatus may initiate the first PDU session establishment procedure in the registered state.

Each apparatus may establish a second PDU session, based on completion of the present procedure.

The first PDU session establishment procedure will be described with reference to FIG. 15. Each step of the present procedure will be described below. First, the UE_A 10 transmits a PDU session establishment request message to the SMF_A 230 via the AN node_A 122 and the AMF_A 240 (S1500) (S1502) (S1504), and initiates a PDU session establishment procedure.

Specifically, the UE_A 10 transmits a PDU session establishment request message to the AMF_A 240 with the N1 interface (S1500), and the AMF_A 240 having received the PDU session establishment request message selects the SMF_A 230 as the NF of the routing destination of the PDU session establishment request message (S1502) and transmits the PDU session establishment request message to the SMF_A 230 selected with the N11 interface (S1504).

Note that in a case that the PDU session is PDN connection, the PDU session establishment request message may be a PDN connectivity request message. Furthermore, the PDU session establishment request message may be a NAS message transmitted and/or received on the N1 interface and the N11 interface, or may be included in the NAS message. The PDU session establishment request message is not limited to the PDU session establishment request message described above, and may be a message for requesting an establishment of the PDU session requested by the network by the PDU session anchor relocation.

Here, the UE_A 10 may include at least one or more pieces of identification information out of the first to seventh identification information in the PDU session establishment request message and/or the NAS message, may further include one or more pieces of identification information out of the 31st to 33rd identification information in the PDU session establishment request message and/or the NAS message, or may in include these pieces of identification information in the PDU session establishment request message and/or the NAS message to indicate a request of the UE_A 10.

Furthermore, the UE_A 10 may transmit one or more pieces of identification information out of the 31st to 33rd identification information to request to establish the PDU session to connect to the DN_A 5.

Specifically, the UE_A 10 may transmit the 31st identification information to indicate to request establishment of the PDU session, based on the request from the network, or to indicate to request establishment of the PDU session by the PDU session anchor relocation.

Furthermore, the UE_A 10 may transmit the 32nd identification information to indicate the PDU session which the UE_A 10 requests an establishment, or to indicate information related to the PDU session temporarily stored by the network.

Furthermore, the UE_A 10 may transmit the 33rd identification information to indicate the PDU session of the PDU session anchor relocation source.

Note that the UE_A 10 may determine which piece of identification information out of the 31st to 33rd identification information is to be included in the PDU session establishment request message and/or the NAS message, based on capability information of the UE_A 10, and/or a policy such as a UE policy, and/or preference of the UE_A 10. Note that determination performed by the UE_A 10 as to which piece of identification information is to be included in the PDU session establishment request message and/or the NAS message is not limited to the determination described above.

Note that the AMF_A 240 and/or the SMF_A 230 may stop the timer that manages the storage of information related to the PDU session in a case that the timer is running that is initiated in the first PDU session release procedure to manage the storage of information related to the PDU session.

Note that the AMF_A 240 may select the SMF_A 230 to transmit the PDU session establishment request message, based on information included in the PDU session establishment request message. More particularly, the AMF_A 240 may select the SMF_A 230 of the routing destination, based on each identification information, for example, the 31st identification information, and/or subscriber information, and/or capability information of the network, and/or the operator policy, and/or the state of the network, and/or the context already held by the AMF_A 240, obtained based on reception of the PDU session establishment request message.

More specifically, the AMF_A 240 may select the SMF_A 230 from information stored in a case that the PDU session is released based on one or more pieces of identification information out of the 31st to 33rd identification information. More particularly, the AMF_A 240 may select the SMF_A 230, by identifying the PDU session ID that has been previously released based on one or more pieces of identification information out of the 31st to 33rd identification information and identifying the SMF ID from the stored information associated with the identified PDU session ID.

Note that the AMF_A 240 may delete information related to the PDU session and stop the timer that manages the storage of information related to the PDU session, in a case that the timer is running that is initiated in the first PDU session release procedure to manage the storage of information related to the PDU session, based on reception of the PDU session establishment request messages, and/or that the PDU session establishment request includes any one or more pieces of the 31st to 33rd identification information, and/or transmission of the PDU session establishment accept message described below, and/or reception of the PDU session establishment complete message described below, and/or completion of the selection of the SMF_A 230 described above, and/or transmission of the PDU session establishment request.

The SMF_A 230 receives the PDU session establishment request message, and performs first condition determination. The first condition determination is intended to determine whether or not the SMF_A 230 accepts a request of the UE_A 10. In the first condition determination, the SMF_A 230 determines Whether the first condition determination is true or false. The SMF_A 230 initiates the procedure of (A) in the present procedure in a case that the first condition determination is true, and initiates the procedure of (B) in the present procedure in a case that the first condition determination is false. Note that steps in a case that the first condition determination is false will be described later.

As follows, steps in a case that the first condition determination is true, in other words, each step of the procedure of (A) in the present procedure will be described. The SWF_A 230 selects the UPF_B 236 of the establishment destination of the PDU session (S1505), transmits a Session Establishment request message to the selected UPF_B 236 (S1506), and initiates the procedure of (A) in the present procedure.

Here, the SMF_A 230 may select one or multiple UPFs, based on each identification information, for example, the 31st identification information, and/or capability information of the network, and/or subscriber information, and/or the Operator policy, and/or the state of the network, and/or the context already held by the SMF_A 230, obtained based on reception of the PDU session establishment request message. Note that in a case that a plurality of UPFs are selected, the SMF_A 230 may transmit a session establishment request message to each UPF.

A case that the SMF_A 230 selects the UPF_B 236 by the UPF selection process will be described below. Note that, in a case that another UPF is selected, the PDU session can be established by replacing the UPF_B 236 described below with UPF selected and performing the procedure.

Note that, as a specific technique for selecting the UPF_B 236 by the UPF selection process, the SMF_A 230 may select the UPF_B 236 from information stored in a case that the PDU session is released based on one or more pieces of identification information out of the 31st to 33rd identification information. More particularly, the SMF_A 230 may select the UPF_B 236, by identifying the PDU session ID that has been previously released based on one or more pieces of identification information out of the 31st to 33rd identification information and identifying the UPF_B 236 as the UPF of the relocation destination from the stored information associated with the identified PDU session ID.

Note that the SMF_A 230 may delete information related to the PDU session including information of the relocation destination and stop the timer that manages the stored information, in a case that the timer is running that is initiated in the first PDU session release procedure to manage the storage of information related to the PDU session, based on reception of the PDU session establishment request messages, and/or that the PDU session establishment request includes any one or more pieces of the 31st to 33rd identification information, and/or transmission of the PDU session establishment accept message described below, and/or reception of the PDU session establishment complete message described below, and/or completion of the selection of the UPF_B 236 described above, and/or transmission of the PDU session establishment request.

The UPF_B 236 receives the session establishment request message and creates a context for the PDU session. Furthermore, the UPF_B 236 transmits a Session Establishment response message to the SMF_A 230 (S1508), based on the reception of the session establishment request message and/or the creation of the context for the PDU session. Furthermore, the SMF_A 230 receives the session establishment response message. Note that the session establishment request message and the session establishment response message may be control messages transmitted and/or received on the N4 interface. Furthermore, the session establishment response message may be a response message to the session establishment request message.

Furthermore, the SMF_A 230 may perform address assignment of the address assigned to the UE_A 10, based on the reception of the PDU session establishment request message and/or the selection of the UPF_B 236 and/or the reception of the session establishment response message. Furthermore, the SMF_A 230 may associate the address assigned to the UE_A 10 with information indicating the address used for the communication to the DN_A 5. Note that the SMF_A 230 may perform the address assignment of the address assigned to the UE_A 10 during the PDU session establishment procedure, or may perform the address assignment of the address assigned to the UE_A 10 after the completion of the PDU session establishment procedure.

Specifically, in a case that the SMF_A 230 assigns the IPv4 address without using DHCPv4, the SMF_A 230 may perform address assignment or may transmit the assigned address to the UE_A 10 during the PDU session establishment procedure. Furthermore, in a case that the SMF_A 230 uses DHCPv4 or DHCPv6 or Stateless Address Autoconfiguration (SLAAC) to assign an IPv4 address and/or an IPv6 address and/or an IPv6 prefix, the SMF_A 230 may perform the address assignment after the PDU session establishment procedure, or may transmit the assigned address to the UE_A 10 by using the RA. Note that the address assignment performed by the SMF_A 230 is not limited to these.

Furthermore, based on the completion of the address assignment of the address assigned to UE_A 10, the SMF_A 230 may transmit the assigned address to the UE_A 10 including the 14th identification information, or may associate information indicating the assigned address with information indicating whether or not the assigned address is an address that can be used for the user data communication performed with the DN_A 5 to transmit to the UE_A 10, without including the 14th identification information. In this case, the UE_A 10 may receive the 14th identification information and/or information indicating the assigned address and/or information indicating whether or not the assigned address is an address that can be used for the user data communication performed with the DN_A 5, transmitted by the SMF_A 230.

The SMF_A 230 transmits a PDU session establishment accept message to the UE_A 10 via the AMF_A 240 (S1510) (S1512), based on the reception of the PDU session establishment request message and/or the selection of the UPF_B 236 and/or the reception of the session establishment response message and/or the completion of the address assignment of the address assigned to the UE_A 10.

Note that, in a case that the PDU session establishment request message is included in the Registration request message and transmitted, the PDU session establishment accept message may be included in the Registration accept message to transmit. For example, the registration accept message may include a PDU session establishment accept message as a SM message or may include a PDU session establishment accept message as a NAS message.

Specifically, the SMF_A 230 transmits the PDU session establishment accept message to the AMF_A 240 with the N11 interface (S1510), and the AMF_A 240 having received the PDU session establishment request message transmits the PDU session establishment accept message to the UE_A 10 with the N1 interface (S1512).

Note that in a case that the PDU session is PDN connection, the PDU session establishment accept message may be a PDN connectivity accept message. Furthermore, the PDU session establishment accept message may be a NAS message transmitted and/or received on the N11 interface and the N1 interface, or may be included in the NAS message to transmit. The PDU session establishment accept message is not limited to the PDU session establishment accept message described above, and may be a message indicating that the establishment of the PDU session has been accepted.

Here, the SMF_A 230 and/or the AMF_A 240 may include at least one or more pieces of identification information out of the 11th to 14th identification information in the PDU session establishment accept message and/or the registration accept message and/or the NAS message, or may include these pieces of identification information in the PDU session establishment accept message and/or the registration accept message and/or the NAS message to indicate that the request of the UE_A 10 has been accepted.

Furthermore, the SMF_A 230 may transmit one or more pieces of identification information out of the 11th to 14th identification information to indicate that the network has accepted the request of the establishment of the PDU session to connect to the DN_A 5, or to indicate that the establishment of the PDU session to connect to the DN_A 5 have been allowed.

Note that the SMF_A 230 and/or the AMF_A 240 may determine which piece of identification information out of the 11th to 14th identification information is to be included in the PDU session establishment accept message and/or the registration accept message and/or the NAS message, based on a received piece of identification information, and/or capability information of the network, and/or a policy such as an operator policy, and/or a state of the network. Note that determination performed by the SMF_A 230 and/or the AMF_A 240 as to which piece of identification information is to be included in the PDU session establishment accept message and/or the registration accept message and/or the NAS message is not limited to the determination described above.

The UE_A 10 receives the PDU session establishment accept message, and further transmits a PDU session establishment complete message to the SMF_A 230 via the AMF_A 240 (S1514) (S1516). Furthermore, the SMF_A 230 receives the PDU session establishment complete message, and performs second condition determination.

Specifically, the UE_A 10 transmits the PDU session establishment complete message to the AMF_240 with the N1 interface (S1514), and the AMF_A 240 having received the PDU session establishment complete message transmits the PDU session establishment complete message to the SMF_A 230 with the N11 interface (S1516).

Note that in a case that the PDU session is PDN connection, the PDU session establishment complete message may be a PDN Connectivity complete message, or an Activate default EPS bearer context accept message. Furthermore, the PDU session establishment complete message may be a NAS message transmitted and/or received on the N1 interface and the N11 interface. The PDU session establishment complete message may be a response message in response to the PDU session establishment accept message. However, the PDU session establishment complete message is not limited to this, and may be a message for indicating that the PDU session establishment procedure is to complete.

The second condition determination is intended to determine a type of a message on the N4 interface transmitted and/or received. In a case that the second condition determination is true, then the SMF_A 230 transmits a Session Modification request message to the UPF_B 236 (S1518), and further receives a session modification accept (Session Modification response) message transmitted by the UPF_B 236 having received the session modification request message (S1520). In a case that the second condition determination is false, then the SMF_A 230 transmits a Session establishment request message to the UPF_B 236 (S1518), and further the UPF_B 236 having received the session establishment request message receives a Session Modification accept message transmitted (S1520). Each apparatus completes the procedure of (A) in the present procedure, based on the transmission and/or reception of the PDU session establishment complete message and/or the transmission and/or reception of the session modification response message and/or the transmission and/or reception of the session establishment response message.

Note that in the procedure of (A) in the present procedure, in a case that the address assigned to the UE_A 10 has not been notified to the UE_A 10, the SMF_A 230 may transmit the RA via the UPF_B 236 serving as the anchor point (S1524).

The SMF_A 230 and/or the UPF_B 236 may transmit one or more pieces of identification information out of the 11th identification information and the 14th identification information to the RA to notify that the PDU session for the DN_A 5 has been established, or to notify that an address has been assigned to the UE_A 10.

Next, each step of the procedure of (B) in the present procedure will be described. The SMF_A 230 transmits a PDU session establishment reject message to the UE_A 10 via the AMF_A 240 (S1526) (S1528), and initiates the procedure of (B) in the present procedure.

Specifically, the SMF_A 230 transmits the PDU session establishment reject message to the AMF_A 240 with the N11 interface (S1526), and the AMF_A 240 having received the PDU session establishment request message transmits the PDU session establishment reject message to the UE_A 10 with the N1 interface (S1528).

Note that in a case that the PDU session is PDN connection, the PDU session establishment reject message may be a PDN connectivity reject message. Furthermore, the PDU session establishment reject message may be a NAS message transmitted and/or received on the N11 interface and the N1 interface, or may be included in the NAS message to transmit. The PDU session establishment reject message is not limited to the PDU session establishment reject message described above, and may be a message indicating that the establishment of the PDU session has been rejected.

Here, the SMF_A 230 and/or the AMF_A 240 may include at least the 15th identification information in the PDU session establishment reject message and/or the NAS message, or may include these pieces of identification information in the PDU session establishment reject message and/or the NAS message to indicate that the request of the UE_A 10 has been rejected.

Furthermore, the SMF_A 230 and/or the AMF_A 240 may transmit the 15th identification information to indicate that the network has rejected the request of the establishment of the PDU session to connect to the DN_A 5, or to indicate that the establishment of the PDU session to connect to the DN_A 5 have not been allowed. Furthermore, the SMF_A 230 may transmit the 15th identification information to indicate that the PDU session that connects to the DN_A 5 has not been established.

For example, the SMF_A 230 and/or the AMF_A 240 may transmit the 15th identification information to indicate that the connection to the DN_A 5 has been rejected, indicate the rejected cause, indicate that the request of UE_A 10 has been rejected, indicate that the connection supporting the requested SSC mode cannot be established, or indicate that the establishment of the multi home PDU session is not supported.

Each apparatus completes the present procedure, based on the completion of the procedure of (A) or (B) in the present procedure or the transmission and/or reception of S1524. Note that each apparatus may transition to a state in which a PDU session is established, based on completion of the procedure of (A) in the present procedure. Each apparatus may recognize that the present procedure has been rejected, or may transition to a state in which a PDU session is not established, based on completion of the procedure of (B) in the present procedure.

Furthermore, each apparatus may perform processing based on identification information transmitted and/or received in the present procedure, based on completion of the present procedure.

The first condition determination may be performed based on identification information, and/or subscriber information obtained from the UDM_A 50, and/or an operator policy included in the PDU session establishment request message and/or the registration request message and/or the NAS message. For example, the first condition determination may be true in a case that the request of the UE_A 10 is allowed by the network. The first condition determination may be false in a case that the request of the UE_A 10 is not allowed by the network. Furthermore, the first condition determination may be true in a case that the network of the connection destination of the UE_A 10 and/or an apparatus in the network supports the function that the UE_A 10 requests, and may be false in a case that such network and/or apparatus does not support the function that the UE_A 10 requests. Note that conditions with which true or false of the first condition determination is determined may not be limited to the previously described conditions. The second condition determination may be performed based on whether or not a session on the N4 interface for the PDU session has been established. For example, the second condition determination may be true in a case that a session on the N4 interface for the PDU session has been established, and may be false in a case that a session on the N4 interface for the PDU session has not been established. Note that conditions with which true or false of the second condition determination is determined may not be limited to the previously described conditions.

1.4.2. Description of Second PDU Session Anchor Relocation Procedure

Figure 18:
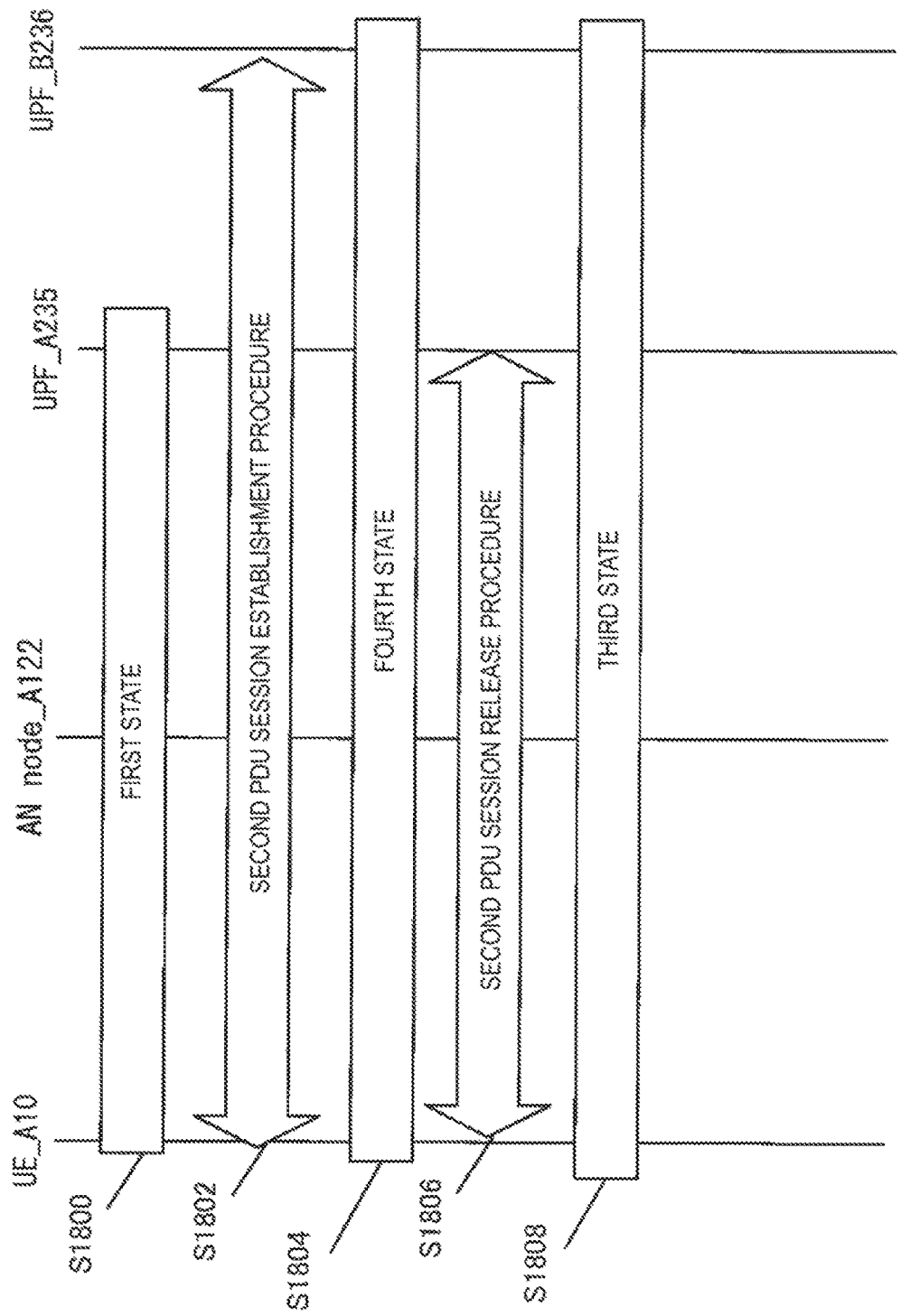
FIG. 18 is a diagram illustrating a second PDU session anchor relocation establishment procedure.

Next, a second PDU session anchor relocation will be described using FIG. 18. In the present embodiment, similar to the first PDU session anchor relocation procedure described in section 1.4.1, each apparatus initiates with the state of having transitioned to the first state (S1800). Hereinafter, the present procedure refers to a second PDU session anchor relocation procedure, and each procedure includes a second PDU session release procedure and a second PDU session establishment procedure. Details of each procedure will be described below.

Here, the PDU session anchor relocation is a procedure for modifying an anchor point of an established session.

Note that in a case of performing the second PDU session anchor relocation, the UPF_A 235 may be in a state of being associated with SSC mode 3 to establish the PDU session. In other words, in the initial procedure for transitioning to the first state, each apparatus may be in a state of associating SSC mode 3 and the UPF_A 235 to establish a PDU session, and each apparatus may be in a state of associating SSC mode 3 and the UPF_A 235 to store. Specifically, in the initial procedure, the UE_A 10 may receive the 12th identification information from the network, and further the 12th identification information may be information indicating SSC mode 3.

In the present procedure, each apparatus at first performs a second PDU session establishment procedure (S1802), and transitions to the fourth state (S1804). Next, each apparatus performs a second PDU session release procedure (S1806), and transitions to the third state (S1808).

Note that each apparatus may exchange each piece of capability information and/or each piece of main request information of each apparatus in the second PDU session release procedure and/or the first PDU session establishment procedure.

Through the procedures described above, each apparatus completes the present procedure. Note that each apparatus involved in the present procedure may transmit and/or receive each control message described in the present procedure to transmit and/or receive one or more pieces of identification information included in each control message, and may store each transmitted and/or received piece of identification information as a context. Furthermore, each apparatus may transition to the third state, based on completion of the present procedure.

1.4.2.1. Description of Second PDU Session Establishment Procedure

The present procedure hereinafter refers to a second PDU session establishment procedure. The present procedure is a procedure for each apparatus in the first state to establish a second PDU session. Note that each apparatus may initiate the second PDU session establishment procedure without performing the PDU session release procedure, unlike the first PDU session anchor relocation procedure described in section 1.4.1. In addition, each apparatus may initiate the second PDU session establishment procedure in the registered state.

Note that the UE_A 10 may initiate the second PDU session establishment procedure at any timing. Alternatively, the second PDU session establishment procedure may be initiated as a trigger of detecting that the TA or area where the UE_A 10 is located has changed in association with the movement of the UE_A 10, detecting that the UE_A 10 has been entered into the TA or area where the second PDU session establishment procedure can be performed, receiving a notification from the core network indicating that the UE_A 10 has entered into the TA or area in which the second PDU session establishment procedure can be performed, or receiving a notification from the core network indicating that the second PDU session establishment procedure can be performed, or the like.

More specifically, in the first state, the UE_A 10 has established the PDU session with the UFP_A 235, and the PDU session established is managed by the SMF_A 230. In that state, the SMF_A 230 may determine relocation of the UPF. Note that the specific processing in the determination may be the same as the UPF relocation process described in section S1702 in section 1.4.1.1. The SMF_A 230 may transmit the NAS message after the determination of the relocation to the UE_A 10 via the AMF_A 240.

The SMF_A 230 may notify to cause the PDU session to be released after a certain amount of time has elapsed by the NAS message. Furthermore, the SMF_A 230 may request to initiate the UE-initiated PDU session establishment procedure for the UE_A 10. Here, the SMF_A 230 may include information indicating a time until the PDU session is released in the NAS message. Furthermore, the PDU session identification information to be released may be included. Note that the DN for the PDU session requesting establishment to the UE_A 10 and the DN to which the released PDU session is connected may be the same. That is, the PDU session may be requested to be established for the DN to which the release PDU session is connected. Accordingly, the SMF_A 230 may include and transmit the DNN identifying the DN requesting connection to the NAS message.

Thus, the UE_A 10 may receive the NAS message transmitted by the SMF_A 230 to initiate the UE-initiated PDU session establishment procedure.

Note that the SMF_A 230 may determine to modify the anchor apparatus to the UPF_B 236, and may store the identification information of the UPF_B 236 and the PDU session identification information in association with each other, in the process of determining the relocation of the UPF.

The second PDU session establishment procedure will be described as a UE-initiated PDU session establishment procedure with reference to FIG. 15 below. Each step of the present procedure will be described below. First, the UE_A 10 transmits a PDU session establishment request message to the SMF_A 230 via the AN node_A 122 and the AMF_A 240 (S1500) (S1502) (S1504), and initiates a PDU session establishment procedure.

Specifically, the UE_A 10 transmits a PDU session establishment request message to the AMF_A 240 with the N1 interface (S1500), and the AMF_A 240 having received the PDU session establishment request message selects the SMF_A 230 as the NF of the routing destination of the PDU session establishment request message (S1502) and transmits the PDU session establishment request message to the SMF_A 230 selected with the N11 interface (S1504).

Note that in a case that the PDU session is PDN connection, the PDU session establishment request message may be a PDN connectivity request message. Furthermore, the PDU session establishment request message may be a NAS message transmitted and/or received on the N1 interface and the N11 interface, or may be included in the NAS message. The PDU session establishment request message is not limited to the PDU session establishment request message described above, and may be a message for requesting an establishment of the PDU session requested by the network by the PDU session anchor relocation.

Here, the UE_A 10 may include at least one or more pieces of identification information out of the first to seventh identification information in the PDU session establishment request message and/or the NAS message, may further include one or more pieces of identification information out of the 31st to 33rd identification information in the PDU session establishment request message and/or the NAS message, or may in include these pieces of identification information in the PDU session establishment request message and/or the NAS message to indicate a request of the UE_A 10.

Furthermore, the UE_A 10 may transmit one or more pieces of identification information out of the 31st to 33rd identification information to request to establish the PDU session to connect to the DN_A 5.

Specifically, the UE_A 10 may transmit the 31st identification information to indicate to request establishment of the PDU session, based on the request from the network, or to indicate to request establishment of the PDU session by the PDU session anchor relocation.

Furthermore, the UE_A 10 may transmit the 32nd identification information to indicate the PDU session which the UE_A 10 requests an establishment, or to indicate information related to the PDU session temporarily stored by the network.

Furthermore, the UE_A 10 may transmit the 33rd identification information to indicate the PDU session of the PDU session anchor relocation source.

Note that the UE_A 10 may determine which piece of identification information out of the 31st to 33rd identification information is to be included in the PDU session establishment request message and/or the NAS message, based on capability information of the UE_A 10, and/or a policy such as a UE policy, and/or preference of the UE_A 10. Note that determination performed by the UE_A 10 as to which piece of identification information is to be included in the PDU session establishment request message and/or the NAS message is not limited to the determination described above.

Note that the AMF_A 240 may select the SMF_A 230 to transmit the PDU session establishment request message, based on information included in the PDU session establishment request message. More particularly, the AMF_A 240 may select the SMF_A 230 of the routing destination, based on each identification information, for example, the 31st identification information, and/or subscriber information, and/or capability information of the network, and/or the operator policy, and/or the state of the network, and/or the context already held by the AMF_A 240, obtained based on reception of the PDU session establishment request message.

More specifically, the AMF_A 240 may select the SMF_A 230 from information stored in a case that the PDU session is released based on one or more pieces of identification information out of the 31st to 33rd identification information. More particularly, the AMF_A 240 may select the SMF_A 230, by identifying the PDU session ID that has been previously released based on one or more pieces of identification information out of the 31st to 33rd identification information and identifying the SMF ID from the stored information associated with the identified PDU session ID.

The SMF_A 230 receives the PDU session establishment request message, and performs first condition determination. The first condition determination is intended to determine whether or not the SMF_A 230 accepts a request of the UE_A 10. In the first condition determination, the SMF_A 230 determines Whether the first condition determination is true or false. The SMF_A 230 initiates the procedure of (A) in the present procedure in a case that the first condition determination is true, and initiates the procedure of (B) in the present procedure in a case that the first condition determination is false. Note that steps in a case that the first condition determination is false will be described later.

As follows, steps in a case that the first condition determination is true, in other words, each step of the procedure of (A) in the present procedure will be described. The SMF_A 230 selects the UPF_B 236 of the establishment destination of the PDU session (S1505), transmits a Session Establishment request message to the selected UPF_B 236 (S1506), and initiates the procedure of (A) in the present procedure.

Here, the SMF_A 230 may select one or multiple UPFs, based on each identification information, for example, the 31st identification information, and/or capability information of the network, and/or subscriber information, and/or the operator policy, and/or the state of the network, and/or the context already held by the SMF_A 230, obtained based on reception of the PDU session establishment request message. Note that in a case that a plurality of UPFs are selected, the SMF_A 230 may transmit a session establishment request message to each UPF.

Alternatively, the SMF_A 230 at the beginning of the procedure may determine to modify the anchor apparatus to the UPF_B 236 and store in diversity in the process of determining the relocation of the UPF, and select the UPF_B 236, based on information associating the identification information of the UPF_B 236 and the PDU session identification information.

A case that the SMF_A 230 selects the UPF_B 236 by the UPF selection process will be described below. Note that, in a case that another UPF is selected, the PDU session can be established by replacing the UPF_B 236 described below with UPF selected and performing the procedure.

The UPF_236 receives the session establishment request message and creates a context for the PDU session. Furthermore, the UPF_B 236 transmits a Session Establishment response message to the SMF_A 230 (S1508), based on the reception of the session establishment request message and/or the creation of the context for the PDU session. Furthermorethe SMF_A 230 receives the session establishment response message. Note that the session establishment request message and the session establishment response message may be control messages transmitted and/or received on the N4 interface. Furthermore, the session establishment response message may be a response message to the session establishment request message.

Furthermore, the SMF_A 230 may perform address assignment of the address assigned to the UE_A 10, based on the reception of the PDU session establishment request message and/or the selection of the UPF_B 236 and/or the reception of the session establishment response message. Furthermore, the SMF_A 230 may associate the address assigned to the UE_A 10 with information indicating the address used for the communication to the DN_A 5. Note that the SMF_A 230 may perform the address assignment of the address assigned to the UE_A 10 during the PDU session establishment procedure, or may perform the address assignment of the address assigned to the UE_A 10 after the completion of the PDU session establishment procedure.

Specifically, in a case that the SMF_A 230 assigns the IPv4 address without using DHCPv4, the SMF_A 230 may perform address assignment or may transmit the assigned address to the UE_A 10 during the PDU session establishment procedure. Furthermore, in a case that the SMF_A 230 uses DHCPv4 or DHCPv6 or Stateless Address Autoconfiguration (SLAAC) to assign an IPv4 address and/or an IPv6 address and/or an IPv6 prefix, the SMF_A 230 may perform the address assignment after the PDU session establishment procedure, or may transmit the assigned address to the UE_A 10 by using the RA. Note that the address assignment performed by the SMF_A 230 is not limited to these.

Furthermore, based on the completion of the address assignment of the address assigned to UE_A 10, the SMF_A 230 may transmit the assigned address to the UE_A 10 including the 14th identification information, or may associate information indicating the assigned address with information indicating whether or not the assigned address is an address that can be used for the user data communication performed with the DN_A 5 to transmit, without including the 14th identification information. In this case, the UE_A 10 may receive the 14th identification information and/or information indicating the assigned address and/or information indicating whether or not the assigned address is an address that can be used for the user data communication performed with the DN_A 5, transmitted by the SMF_A 230.

The SMF_A 230 transmits a PDU session establishment accept message to the UE_A 10 via the AMF_A 240 (S1510) (S1512), based on the reception of the PDU session establishment request message and/or the selection of the UPF_B 236 and/or the reception of the session establishment response message and/or the completion of the address assignment of the address assigned to the UE_A 10.

Note that, in a case that the PDU session establishment request message is included in the Registration request message and transmitted, the PDU session establishment accept message may be included in the Registration accept message to transmit. For example, the registration accept message may include a PDU session establishment accept message as a SM message or may include a PDU session establishment accept message as a NAS message.

Specifically, the SMF_A 230 transmits the PDU session establishment accept message to the AMF_A 240 with the N11 interface (S1510), and the AMF_A 240 having received the PDU session establishment request message transmits the PDU session establishment accept message to the UE_A 10 with the N1 interface (S1512).

Note that in a case that the PDU session is PDN connection, the PDU session establishment accept message may be a PDN connectivity accept message. Furthermore, the PDU session establishment accept message may be a NAS message transmitted and/or received on the N11 interface and the N1 interface, or may be included in the NAS message to transmit. The PDU session establishment accept message is not limited to the PDU session establishment accept message described above, and may be a message indicating that the establishment of the PDU session has been accepted.

Here, the SMF_A 230 and/or the AMF_A 240 may include at least one or more pieces of identification information out of the 11th to 14th identification information in the PDU session establishment accept message and/or the registration accept message and/or the NAS message, or may include these pieces of identification information in the PDU session establishment accept message and/or the registration accept message and/or the NAS message to indicate that the request of the UE_A 10 has been accepted.

Furthermore, the SMF_A 230 may transmit one or more pieces of identification information out of the 11th to 14th identification information to indicate that the network has accepted the request of the establishment of the PDU session to connect to the DN_A 5, or to indicate that the establishment of the PDU session to connect to the DN_A 5 have been allowed.

Note that the SMF_A 230 and/or the AMF_A 240 may determine which piece of identification information out of the 11th to 14th identification information is to be included in the PDU session establishment accept message and/or the registration accept message and/or the NAS message, based on a received piece of identification information, and/or capability information of the network, and/or a policy such as an operator policy, and/or a state of the network. Note that determination performed by the SMF_A 230 and/or the AMF_A 240 as to which piece of identification information is to be included in the PDU session establishment accept message and/or the registration accept message and/or the NAS message is not limited to the determination described above.

Note that the SMF_A 230 may determine whether or not the 11th identification information and/or the 14th identification information are included in the PDU session accept message, based on the request of the UE_A 10. In other words, the UE_A 10 may transmit, to the SMF_A 230 via the AMF_A 240, information indicating that the SMF_A 230 includes the 11th identification information in the PDU session accept message to transmit and/or information indicating that the SMF_A 230 includes the 14th identification information in the PDU session accept message to transmit. Note that such request information may include the PDU session establishment request message in establishing the second PDU session, the PDU session establishment request message in establishing the first PDU session, and/or the registration request message to transmit.

Furthermore, the SMF_A 230 may transmit the 11th identification information, in a case that the first identification information and/or the second identification information indicating SSC mode 3 and/or the third identification information is received by the PDU session establishment request message in establishing the second PDU session, the PDU session establishment request message in establishing the first PDU session, and/or the registration request message.

The SMF_A 230 may include the default router address in the PDU session accept message to transmit, based on conditions similar to conditions to include the 11th identification information and/or the 14th identification information. Note that the default router address may be an address indicating the UPF_B 236 or identification information.

Here, the 11th identification information indicates information indicating a high preference level, and may be information indicating "High", for example. Thus, the first PDU session and/or the IPv6 prefix associated with the first PDU session may be notified of higher preference of the second PDU session and/or the IPv6 prefix associated with the second PDU session to the UE_A 10.

The UE_A 10 receives the PDU session establishment accept message, and further transmits a PDU session establishment complete message to the SMF_A 230 via the AMF_A 240 (S1514) (S1516). Furthermore, the SMF_A 230 receives the PDU session establishment complete message, and performs second condition determination.

Specifically, the UE_A 10 transmits the PDU session establishment complete message to the AMF_A 240 with the N1 interface (S1514), and the AMF_A 240 having received the PDU session establishment complete message transmits the PDU session establishment complete message to the SMF_A 230 with the N11 interface (S1516).

Note that in a case that the PDU session is PDN connection, the PDU session establishment complete message may be a PDN Connectivity complete message, or an Activate default EPS bearer context accept message. Furthermore, the PDU session establishment complete message may be a NAS message transmitted and/or received on the N1 interface and the N11 interface. The PDU session establishment complete message may be a response message in response to the PDU session establishment accept message. However, the PDU session establishment complete message is not limited to this, and may be a message for indicating that the PDU session establishment procedure is to complete.

The second condition determination is intended to determine a type of a message on the N4 interface transmitted and/or received. In a case that the second condition determination is true, then the SMF_A 230 transmits a Session Modification request message to the UPF_B 236 (S1518), and further receives a session modification accept (Session Modification response) message transmitted by the UPF_B 236 having received the session modification request message (S1520). In a case that the second condition determination is false, then the SMF_A 230 transmits a Session establishment request message to the UPF_B 236 (S1518), and further the UPF_B 236 having received the session establishment request message receives a Session Modification accept message transmitted (S1520), Each apparatus completes the procedure of (A) in the present procedure, based on the transmission and/or reception of the PDU session establishment complete message and/or the transmission and/or reception of the session modification response message and/or the transmission and/or reception of the session establishment response message.

Note that in the procedure of (A) in the present procedure, in a case that the address assigned to the UE_A 10 has not been notified to the UE_A 10, the SMF_A 230 may transmit the RA via the UPF_B 236 as the anchor point (S1524).

Here, the RA may include an IPv6 prefix and default router address associated with the PDU session to transmit. Note that the default router address may be an address of the UPF_B 236. Furthermore, the UE_A 10 having received the RA may generate an IPv6 address by using the IPv6 network prefix included in the RA. Here, the IPv6 network prefix may be information different from that associated with the first PDU session.

The SMF_A 230 and/or the UPF_B 236 may transmit one or more pieces of identification information out of the 11th identification information and the 14th identification information to the RA to notify that the PDU session for the DN_A 5 has been established, or to notify that an address has been assigned to the UE_A 10.

Note that the SMF_A 230 may determine whether or not the 11th identification information and/or the 14th identification information are included in the RA message, based on the request of the UE_A 10. In other words, the UE_A 10 may transmit, to the SMF_A 230 via the AMF_A 240, information indicating that the SMF_A 230 includes the 11th identification information in the PDU session accept message to transmit and/or information indicating that the SMF_A 230 includes the 14th identification information in the PDU session accept message to transmit. Note that such request information may include the PDU session establishment request message in establishing the second PDU session, the PDU session establishment request message in establishing the first PDU session, and/or the registration request message to transmit.

Furthermore, the SMF_A 230 may transmit the 11th identification information, in a case that the first identification information and/or the second identification information indicating SSC mode 3 and/or the third identification information is received by the PDU session establishment request message in establishing the second PDU session, the PDU session establishment request message in establishing the first PDU session, and/or the registration request message.

The SMF_A 230 may include the default router address in the RA message to transmit, based on conditions similar to conditions to include the 11th identification information and/or the 14th identification information. Note that the default router address may be an address indicating the UPF_B 236 or identification information.

Here, the 11th identification information indicates information indicating a high preference level, and may be information indicating "High", for example. Thus, the first PDU session and/or the IPv6 prefix associated with the first PDU session may be notified of higher preference of the second PDU session and/or the IPv6 prefix associated with the second PDU session to the UE_A 10.

Next, each step of the procedure of (B) in the present procedure will be described. The SMF_A 230 transmits a PDU session establishment reject message to the UE_A 10 via the AMF_A 240 (S1526) (S1528), and initiates the procedure of (B) in the present procedure.

Specifically, the SMF_A 230 transmits the PDU session establishment reject message to the AMF_A 240 with the N11 interface (S1526), and the AMF_A 240 having received the PDU session establishment request message transmits the PDU session establishment reject message to the UE_A 10 with the N1 interface (S1528).

Note that in a case that the PDU session is PDN connection, the PDU session establishment reject message may be a PDN connectivity reject message. Furthermore, the PDU session establishment reject message may be a NAS message transmitted and/or received on the N11 interface and the N1 interface, or may be included in the NAS message to transmit. The PDU session establishment reject message is not limited to the PDU session establishment reject message described above, and may be a message indicating that the establishment of the PDU session has been rejected.

Here, the SMF_A 230 and/or the AMF_A 240 may include at least the 15th identification information in the PDU session establishment reject message and/or the NAS message, or may include these pieces of identification information in the PDU session establishment reject message and/or the NAS message to indicate that the request of the UE_A 10 has been rejected.

Furthermore, the SMF_A 230 and/or the AMF_A 240 may transmit the 15th identification information to indicate that the network has rejected the request of the establishment of the PDU session to connect to the DN_A 5, or to indicate that the establishment of the PDU session to connect to the DN_A 5 have not been allowed. Furthermore, the SMF_A 230 may transmit the 15th identification information to indicate that the PDU session that connects to the DN_A 5 has not been established.

For example, the SMF_A 230 and/or the AMF_A 240 may transmit the 15th identification information to indicate that the connection to the DN_A 5 has been rejected, indicate the rejected cause, indicate that the request of UE_A 10 has been rejected, indicate that the connection supporting the requested SSC mode cannot be established, or indicate that the establishment of the multi home PDU session is not supported.

Each apparatus completes the present procedure, based on the completion of the procedure of (A) or (B) in the present procedure or the transmission and/or reception of S1524. Note that each apparatus may transition to a state in which a PDU session is established, based on completion of the procedure of (A) in the present procedure. Each apparatus may recognize that the present procedure has been rejected, or may transition to a state in which a PDU session is not established, based on completion of the procedure of (B) in the present procedure.

Furthermore, each apparatus may perform processing based on identification information transmitted and/or received in the present procedure, based on completion of the present procedure.

The first condition determination may be performed based on identification information, and/or subscriber information obtained from the UDM_A 50, and/or an operator policy included in the PDU session establishment request message and/or the registration request message and/or the NAS message. For example, the first condition determination may be true in a case that the request of the UE_A 10 is allowed by the network. The first condition determination may be false in a case that the request of the UE_A 10 is not allowed by the network. Furthermore, the first condition determination may be true in a case that the network of the connection destination of the UE_A 10 and/or an apparatus in the network supports the function that the UE_A 10 requests, and may be false in a case that such network and/or apparatus does not support the function that the UE_A 10 requests. Note that conditions with which true or false of the first condition determination is determined may not be limited to the previously described conditions. The second condition determination may be performed based on whether or not a session on the N4 interface for the PDU session has been established. For example, the second condition determination may be true in a case that a session on the N4 interface for the PDU session has been established, and may be false in a case that a session on the N4 interface for the PDU session has not been established. Note that conditions with which true or false of the second condition determination is determined may not be limited to the previously described conditions.

As described above, the UE_A 10 establishes the PDU session with the UPF_B 236 as the anchor point. As a result, the UE_A 10 becomes in a state where the PDU session with the UPF_A 235 as the inexpensive point and the PDU session with the UPF_B 236 as the anchor point are simultaneously established. Note that these PDU sessions may be PDU sessions established for the same DN.

As a result, the UE_A 10 is in a state of holding a plurality of communication paths. In transmitting and/or receiving user data, the UE_A 10 may select a route, based on route preference information associated with each PDU session. That is, the user data may be transmitted and/or received by using a PDU session with high preference. At that time, the IPv6 prefix and/or the default route and/or the default router associated with a PDU session of high preference may be selected to transmit user data.

1.4.2.2. Description of Second PDU Session Release Procedure

After completing the second PDU session establishment procedure, the UE_A 10 may perform the second PDU session release procedure. Note that the second PDU session release procedure is a procedure for releasing the PDU session with the UPF_A 235 as the anchor point.

An example of a process of performing the first PDU session establishment procedure will be described with reference to FIG. 19 below. Each step of the present procedure will be described below.

First, the UE_A 10 transmits the PDU session release release request message to the AMF_A 240 to initiate the PDU session release release procedure (S1900). The UE_A 10 may include information for identifying the PDU session with the UPF_A 235 as the anchor point and/or information indicating that the UPF_A 235 is an anchor point and/or the DNN in the PDU session release release request message to transmit.

Information for identifying the PDU session with the UPF_A 235 as the anchor point may be, for example, the PDU session ID identifying the first PDU session, in case that the PDU session ID identifying the first PDU session and the PDU session ID identifying the second PDU session established based on the procedure described in section 1.4.2.1. are different IDs.

Alternatively, information for identifying the PDU session with the UPF_A 235 as the anchor point may be information indicating the old PDU session and/or information indicating the PDU session with low route preference. By including this, the UE_A 10 may request to release the old PDU session and/or release the PDU session with low route preference.

Alternatively, information for identifying the PDU session with the UPF_A 235 as the anchor point may be information indicating SSC mode 3. By including this, the UE_A 10 may request to release the old PDU session and/or release the PDU session with low route preference.

Alternatively, information for identifying the PDU session with the UPF_A 235 as the anchor point may be information indicating SSC mode 3. By including this, the UE_A 10 may request to release the old PDU session and/or release the PDU session with low route preference.

Alternatively, information for identifying the PDU session with the UPF_A 235 as the anchor point may be information indicating the IPv6 prefix. By including this, the UE_A 10 may request to release the PDU session corresponding to the IPv6 prefix.

Alternatively, information for identifying the PDU session with the UPF_A 235 may be a group of information in which one or more pieces of the information described above are combined.

Next, the AMF_A 240 receives the PDU session release request and transmits the received PDU session release request to the SMF_A 230 (S1902).

The SMF_A 230 receives the PDU session release request and detects the UPF_A 235 as the PDU session to release based on the PDU session release request and/or the anchor point of the PDU session to release.

The SMF_A 230 may store information related to the PDU session established by the UE_10 in association with the anchor point of the PDU session and select the UPF_A 235 as the anchor point of the PDU session, based on the PDU session release request included in the PDU session release request message. Here, information related to the PDU session may be information indicating the PDU session ID and/or the DNN and/or preference information of the PDU session and/or the IPv6 prefix and/or SSC mode 3.

Alternatively, in the process of determining the relocation of the UPF at the beginning of the second PDU session establishment procedure described in section 1.4.2.1, the SMF_A 230 may store information related to the PDU session to release and/or information of the anchor point of the PDU session to release. The SMF_A 230 may select the UPF_A 235 as the anchor point of the PDU session to releases based on such information.

Next, the SMF_A 230 transmits a Session release request message to the UPF_A 235 (S1906), and initiates a session release procedure between the SMF_A 230 and the UPF_A 235.

The UPF_A 235 receives the session release request message and deletes a context for the PDU session. Furthermore, the UPF_A 235 transmits a Session release response message to the SMF_A 230 (S1908), based on the reception of the session release request message and/or the deletion of the context for the PDU session. Furthermore, the SMF_A 230 receives the session release response message. Note that the session release request message and the session release response message may be control messages transmitted and/or received on the N4 interface. Furthermore, the session release response message may be a response message to the session release request message.

Next, the SMF_A 230 transmits a PDU session release command message to the UE_A 10 via the AMF_A 240 (S1910), based on the reception of the PDU session release response message and/or determination of the PDU session anchor relocation.

Specifically, the SMF_A 230 transmits the PDU session release command message to the AMF_A 240 (S1910), and the AMF_A 240 having received the PDU session release command message transmits the PDU session release command message to the UE_A 10 (S1912).

Note that in a case that the PDU session is PDN connection, the PDU session release command message may be a Deactivate EPS bearer context request (Deactivate EPS bearer request) message. Furthermore, the PDU session release command message may be a NAS message transmitted and/or received on the N11 interface and the N1 interface, or may be included in the NAS message to transmit. The PDU session release command message is not limited thereto, and may be a message indicating that release of the PDU session has been requested from the network and/or that the network has determined the release of the PDU session.

Here, the SMF_A 230 and/or the AMF_A 240 may include at least one or more pieces of identification information out of the 21st to 22nd identification information in the PDU session release command message and/or the NAS message, or may include these pieces of identification information in the PDU session release command message and/or the NAS message to indicate the request of the release of the PDU session.

Furthermore, the SMF_A 230 and/or the AMF_A 240 may transmit one or more pieces of identification information out of the 21st to 22nd identification information to indicate that the network has accepted the request of the establishment of the PDU session to connect to the DN_A 5, or to indicate that the establishment of the PDU session to connect to the DN_A 5 have been allowed.

More particularly, the SMF_A 230 and/or the AMF_A 240 may transmit the 21st identification information to indicate to continue information related to the PDU session released for a period of time after the PDU session has been released. Specifically, the SMF_A 230 may store information related to the UPF_A 235 associated with the PDU session in association with the 21st identification information, and the AMF_A 240 may store information for identifying the SMF_A 230, for example. SMF ID, in association with the 21st identification information.

Furthermore, the SMF_A 230 and/or the AMF_A 240 may transmit the 22nd identification information to indicate that the release of the PDU session is performed for the PDU session anchor relocation.

Note that the SMF_A 230 and/or the AMF_A 240 may determine which piece of identification information out of the 21st to 22nd identification information is to be included in the PDU session release command message and/or the NAS message, based on a received piece of identification information, and/or capability information of the network, and/or a policy such as an operator policy, and/or a state of the network. Note that determination performed by the SMF_A 230 and/or the AMF_A 240 as to which piece of identification information is to be included in the PDU session release command message and/or the NAS message is not limited to the determination described above.

The UE_A 10 receives the PDU session release command message, and further transmits a PDU session release accept message to the SMF_A 230 via the AMF_A 240 (S1914) (S1916).

Specifically, the UE_A 10 transmits the PDU session release accept message to the AMF_A 240 with the N1 interface (S1914), and the AMF_A 240 having received the PDU session release accept message transmits the PDU session release accept message to the SMF_A 230 with the N11 interface (S1916).

Note that in a case that the PDU session is PDN connection, the PDU session release accept message may be a Deactivate EPS bearer context accept message. Furthermore, the PDU session release accept message may be a NAS message transmitted and/or received on the N1 interface and the N11 interface, or may be included in the NAS message to transmit and/or receive. The PDU session release accept message may be a response message in response to the PDU session release command message. However, the PDU session release accept message is not limited to this, and may be a message for indicating that the PDU session release procedure is to be completed.

Subsequently, the SMF_A 230 transmits a PDU session release notification message to the AMF_A 240 (S1918). The SMF_A 230 may transmit the PDU session release notification message to notify the completion of the release of the PDU session, and may notify that the PDU session has been released but still continue storing part of information for the relocation. Note that the PDU session release notification message is not limited to the PDU session release notification message described above, and may be a message for notifying a release of a PDU session.

Note that the AMF_A 240 may initiate counting the timer with a timer to manage the storage of information related to the PDU session, based on the reception of the PDU session release accept message and/or based on the reception of the PDU session release notification message and/or the transmission of the PDU session release command message. Furthermore, the AMF_A 240 may initiate associating and storing the 21st identification information and information related to the PDU session, for example. the SMF ID identifying the SMF_230.

Alternatively, the AMF_A 240 may initiate storing the information described above, based on more detailed conditions. For example, in a case that the PDU session release notification message including the 21st identification information and/or the 22nd identification information is received, and/or in a case of releasing the PDU session of SSC mode 2, based on the reception of the PDU session release accept message and/or the reception of the PDU session release notification message and/or the transmission of the PDU session release command message, the AMF_A 240 may initiate storing the information described above. Note that such detailed conditions may be determined by a system, an operator policy, or the like. Furthermore, in a case that these conditions are not satisfied, the AMF_A 240 may not store the information described above and initiate counting the timer. The timer for managing the storage of the information related to the PDU session may be stored by the AMF_A 240 in pre-configuration, or may be determined based on a received piece of identification information, and/or capability information of the network, and/or a policy such as an operator policy, and/or a state of the network.

Furthermore, in a case that the counting of the timer using the timer that manages the storage of information related to the PDU session has expired, the AMF_A 240 may release information related to the PDU session and/or the context.

The SMF_A 230 may initiate counting the timer with a timer to manage the storage of information related to the PDU session, based on the reception of the PDU session release accept message and/or based on the transmission of the PDU session release notification message and/or the reception of the PDU session release command message. Furthermore, the SMF_A 230 may initiate associating and storing the 21st identification information and information related to the PDU session.

Alternatively, the SMF_A 230 may initiate storing the information described above, based on more detailed conditions. For example, in a case of having received the PDU session release accept message including the 21st identification information and/or the 22nd identification information, and/or in a case that the PDU session release notification message including the 21st identification information and/or the 22nd identification information is transmitted, and/or in a case of releasing the PDU session of SSC mode 2, based on the reception of the PDU session release accept message and/or the transmission of the PDU session release notification message and/or the reception of the PDU session release command message, the SMF_A 230 may initiate associating and storing the counting of the timer described above, the 21st identification information, and information related to the PDU session.

Note that such detailed conditions may be determined by a system, an operator policy, or the like. Furthermore, in a case that these conditions are not satisfied, the SMF_A 230 may not store the information described above and initiate counting the timer. Here, the information related to the PDU session may be the UPF ID identifying the UPF_A 235 of the relocation source, and in this case, the SMF_A 230 selects the UFP_B 236 of the relocation destination during the first PDU session establishment procedure.

Alternatively, information related to the PDU session may be the UPF ID identifying the UPF_B 236 of the relocation destination, and in this case, the SMF_A 230 may select the UPF_B 236 of the relocation destination, based on the reception of the PDU session release response message and/or the determination of the PDU session anchor relocation.

Here, the timer for managing the storage of the information related to the PDU session may be stored by the SMF_A 230 in pre-configuration, or may be determined based on a received piece of identification information, and/or capability information of the network, and/or a policy such as an operator policy, and/or a state of the network. Furthermore, in a case that the counting of the timer using the timer that manages the storage of information related to the PDU session has expired, the SMF_A 230 may release information related to the PDU session and/or the context.

Each apparatus completes the present procedure, based on the transmission and/or reception of S1716. Note that each apparatus may transition to a state in which the first PDU session has been released, based on completion of the present procedure.

Figure 19:
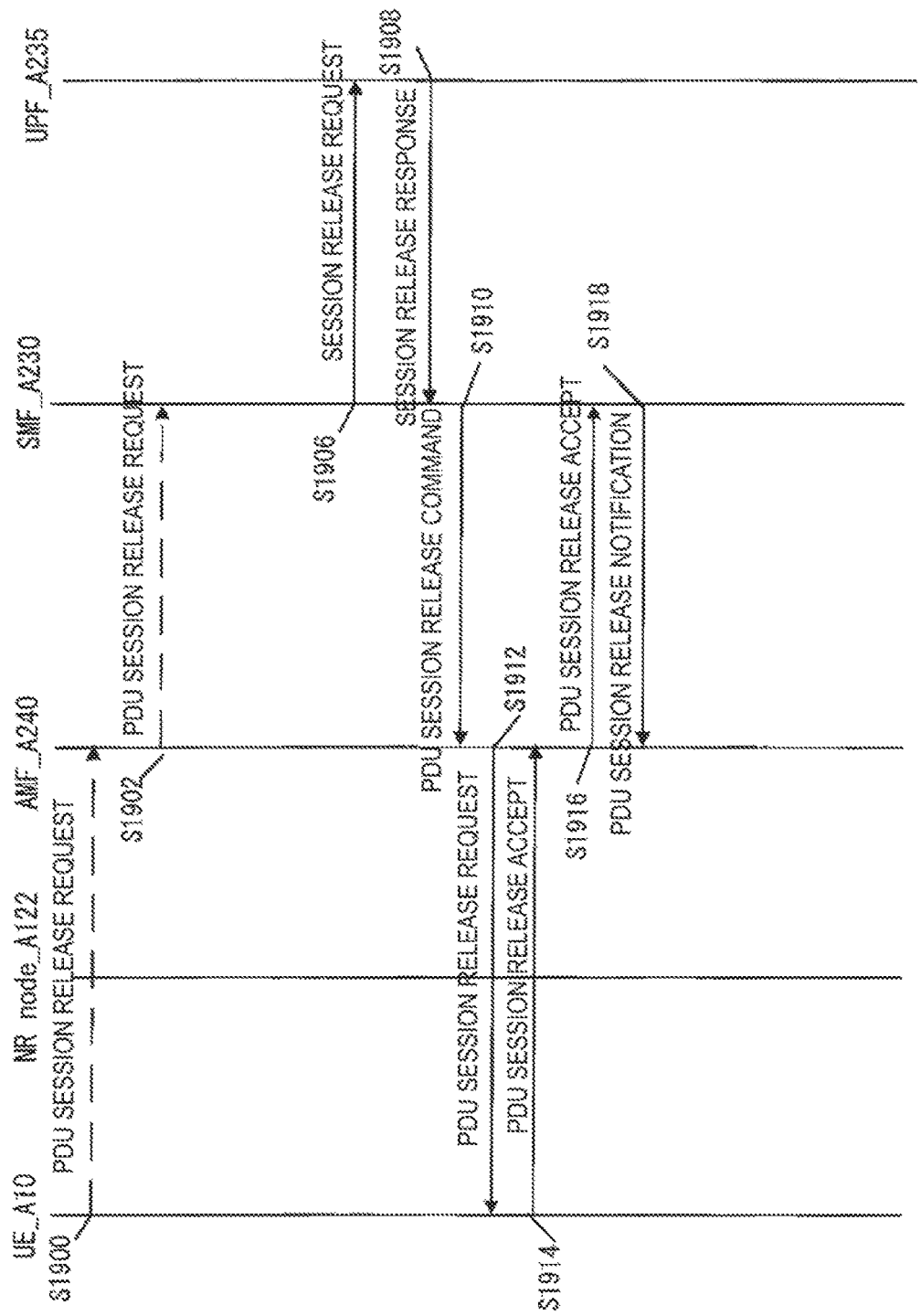
FIG. 19 is a diagram illustrating a second PDU session release procedure.

Note that in the example of the present procedure, the procedure in which the SMF_A 230 initiates to release the PDU session is described based on FIG. 19, but the present procedure is not limited to this, and other procedures may be used. For example, the network may initiate the procedure to release the PDU session to perform. In this case, in the PDU session release procedure described above, a procedure may be performed where steps of S1900 and S1902 which are part that the UE_A 10 initiates the procedure are omitted. This can cause performing the PDU session release procedure initiated by the SMF_A 230.

1.5. Overview of PDU Session Modification Procedure

Next, an overview of a PDU session modification procedure will be described. The present procedure hereinafter refers to a PDU session modification procedure. The present procedure is a procedure for each apparatus to modify the state of the PDU session. Note that each apparatus may perform the present procedure in a state after each apparatus has completed the PDU session establishment procedure, or may perform the present procedure during the PDU session establishment procedure. Each apparatus may initiate the present procedure in a registered state, or may initiate the present procedure at any timing after the PDU session establishment procedure. Each apparatus may modify the state of the PDU session, based on completion of the PDU session modification procedure. Furthermore, each apparatus may perform the present procedure multiple times to modify a state of each PDU session in a case of having established a plurality of PDU sessions.

1.5.1. Example of PDU Session Modification Procedure

Figure 14:
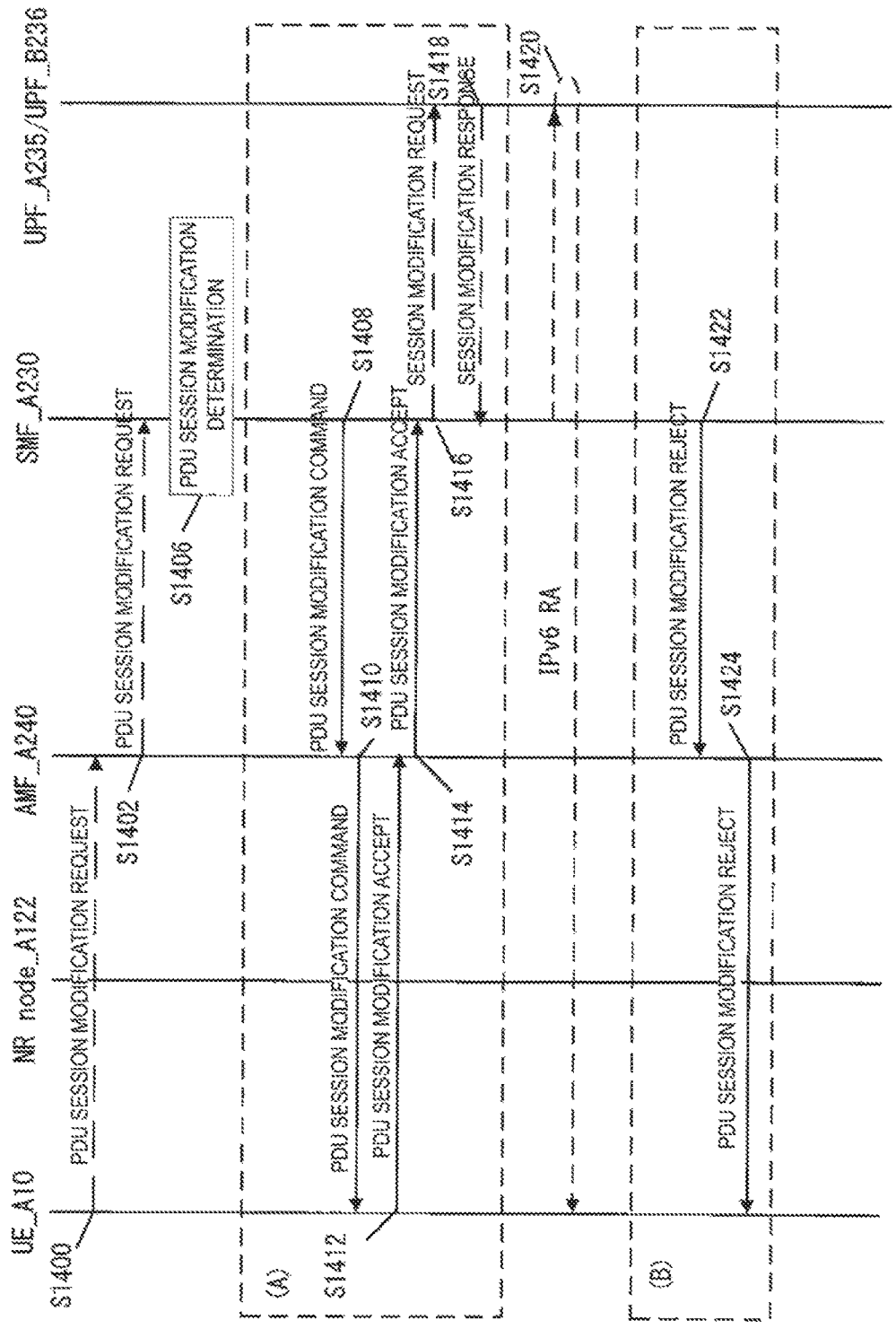
FIG. 14 is a diagram illustrating a PDU session modification procedure.

With reference to FIG. 14, an example of a process of performing a PDU session modification procedure will be described. Each step of the present procedure will be described below, First, the UE_A 10 transmits a PDU session modification request message to the SMF_A 230 via the AMF_A 240 (S1400) (S1402). Specifically, the UE_A 10 transmits the PDU session modification request message to the AMF_A 240 with the N1 interface (S1400), and the AMF_A 240 having received the PDU session modification request message transmits the PDU session modification request message to the SMF_A 230 with the N11 interface (S1402).

Note that the trigger for the UE_A 10 to transmit the PDU session modification request message may be that the UE_A 10 has moved, may be that a request to modify the default route has occurred, or may be that a policy of the UE_A 10 has changed.

Here, the UE_A 10 may include at least one or more pieces of identification information out of the 61st to 62nd identification information in the PDU session modification request message, or may indicate a request of the UE_A 10, by including these pieces of identification information.

Furthermore, the UE_A 10 may transmit one or more pieces of identification information out of the 61st to 62nd identification information to request modification of the connection destination of the PDU session or to request modification of information related to the connection.

More particularly, the UE_A 10 may transmit the 61st identification information and/or transmit the 62nd identification information and the 61st identification information in association with each other to request update of preference information of the route indicated by the 62nd identification information or update of information related to the PDU session including the route indicated by the 62nd identification information, or request to modify the route to the default route.

Furthermore, the UE_A 10 may transmit the 62nd identification information to indicate a route requesting update of preference information.

Next, the SMF_A 230 determines modification of the PDU session (S1406). The SMF_A 230 may determine the modification of the PDU session, based on reception of the PUD session modification request message, or may determine the modification of the PDU session, based on the operator policy, the network policy, the movement of the UE_A 10, or the subscriber information.

That is, the SMF_A 230 may initiate the PDU session modification procedure without receiving the PDU session modification request from the UE_A 10. In other words, the PDU session modification procedure may be a procedure initiated by the UE or may be a procedure initiated by the network.

In a case that the SMF_A 230 has received the PDU session modification request message, the SMF_A 230 performs first condition determination. The first condition determination is intended to determine whether or not the SMF_A 230 accepts a request of the UE_A 10. In the first condition determination, the SMF_A 230 determines whether the first condition determination is true or false. The SMF_A 230 initiates the procedure of (A) in the present procedure in a case that the first condition determination is true, and initiates the procedure of (B) in the present procedure in a case that the first condition determination is false. Note that steps in a case that the first condition determination is false will be described later.

Note that, in a case that the SMF_A 230 does not receive the PDU session modification request message, the SMF_A 230 may initiate the procedure of (A) in the present procedure without performing the first condition determination.

Each step of the procedure of (A) in the present procedure will be described below. The SMF_A 230 transmits the PDU session modification command message to the UE_A 10 via the AMF_A 240 (S1408) (S1410). Specifically, the SMF_A 230 transmits the PDU session modification command message to the AMF_A 240 with the N11 interface (S1408), and the AMF_A 240 having received the PDU session modification command message transmits the PDU session modification command message to the UE_A 10 with the N1 interface (S1410).

Note that the trigger for the SMF_A 230 to transmit the PDU session modification command message may be reception of a state change notification message transmitted from the AMF_A 240, may be reception of a request message from the AF, or may be detection of change in state of the SMF_A 230 itself.

Furthermore, the PDU session modification command message may be a NAS message transmitted and/or received on the N11 interface and the N1 interface, or may be included in the NAS message to transmit and/or receive. The PDU session modification command message is not limited to the PDU session modification command message described above, and may be a message indicating that the modification of the PDU session has been determined.

Furthermore, the state change notification message may be a message which the AMF_A 240 transmits to the SMF_A 230 by using the N11 interface, and may be information indicating that the state of the UE_A 10 has changed due to mobility of the UE_A 10, and the like. Furthermore, the state change notification message may be information indicating that the state of the UE_A 10 and/or network apparatus has changed due to that the subscriber information andlor the operator policy and/or the policy of the UE_A 10 has changed. Furthermore, the request message from the AF may be a request message transmitted from the AF, or may be a request message which another network apparatus has successfully transmitted.

Here, the SMF_A 230 may include at least one or more pieces of identification information out of the 71st to 72nd identification information in the PDU session modification command message, or may indicate a request of the SMF_A 230, by including these pieces of identification information.

Furthermore, the SMF_A 230 may transmit one or more pieces of identification information out of the 71st to 72nd identification information to request modification of the connection destination of the PDU session and information related to the PDU session. More particularly, the SMF_A 230 may transmit the 71st identification information and/or transmit the 72nd identification information and the 71st identification information in association with each other to request update of preference information, to request modification of the default route, or to notify modification of mobility.

Furthermore, the SMF_A 230 may transmit the 72nd identification information to notify the update of the preference information or to notify the updated preference information.

Note that the SMF_A 230 may determine which piece of identification information out of the 71st to 72nd identification information is to be included in the PDU session modification request message, based on capability information of the network, and/or a policy such as an operator policy, and/or a state of the network. Note that determination performed by the SMF_A 230 as to which piece of identification information is to be included in the PDU session modification request message is not limited to the determination described above.

The UE_A 10 having received the PDU session modification command message transmits a Pall session modification accept (PDU session establishment accept) message to the SMF_A 230 via the AMF_A 240 (S1412) (S1414).

Specifically, the UE_A 10 transmits the PDU session modification accept message to the AMF_A 240 with the N1 interface (S1412), and the AMF_A 240 having received the PDU session modification request message transmits the PDU session modification accept message to the SMF_A 230 with the N11 interface (S1414).

Note that the PDU session modification accept message may be a NAS message transmitted and/or received on the N1 interface and the N11 interface, or may be included in the NAS message to transmit and/or receive. The PDU session modification accept message is not limited to the PDU session modification accept message described above, and may be a message indicating that the establishment of the PDU session has been accepted.

The SMF_A 230 receives the PDU session modification accept message, and transmits the Session Modification request message to the UPF_A 235 (S1416), and further the UPF_A 235 having received the session modification request message receives the Session Modification accept (Session Modification response) message transmitted by the UPF_A 235 (S1418). Each apparatus completes the procedure of (A) in the present procedure, based on the transmission and/or reception of the PDU session modification accept message and/or the transmission and/or reception of the session modification response message.

Note that in the procedure of (A) in the present procedure, in a case that the address assigned to the UE_A 10 has not been notified to the UE_A 10, the SMF_A 230 may transmit the RA via the UPF_A 235 or the UPF_B 236 serving as the anchor point (S1420).

The SMF_A 230 and/or the UPF_A 235 may transmit the 72nd identification information to the RA to notify the modification of the preference information, or to notify the UE_A 10 of the modification of the address.

Next, each step of the procedure of (B) in the present procedure will be described. The SMF_A 230 transmits a PDU session modification reject (PDU session establishment reject) message via the AMF_A 240 (S1422) (S1424), and initiates the procedure of (B) in the present procedure.

Specifically, the SMF_A 230 transmits the PDU session modification reject message to the AMF_A 240 with the N11 interface (S1422), and the AMF_A 240 having received the PDU session modification reject message transmits the PDU session modification reject message to the UE_A 10 with the N1 interface (S1424).

Furthermore, the PDU session modification reject message may be a NAS message transmitted and/or received on the N11 interface and the N1 interface, or may be included in the NAS message to transmit and/or receive. The PDU session modification reject message is not limited to the PDU session modification reject message described above, and may be a message indicating that the modification of the PDU session has been rejected.

Here, the SMF_A 230 may include at least the 81st identification information in the PDU session modification reject message, or may notify rejection of the request, by including these pieces of identification information.

Furthermore, the SMF_A 230 may transmit the 81st identification information to reject the modification of information related to the PDU session. Specifically, the SMF_A 230 may transmit the 81st identification information to indicate to reject the request of the UE_A 10, to indicate that the preference information cannot be modified, or to indicate that the request of the preference information is not satisfied.

Furthermore, the AMF_A 240 and/or the SMF_A 230 may transition the state associated with the UE_A 10 to a state where a PDU session has not been established, or may transition the state associated with UE_A 10 to an abnormal state, based on the transmission of the PDU session modification reject message and/or the transmission of each identification information included in the PDU session modification reject message.

Similarly, the UE_A 10 may cause transitioning to the state where the PDU session is not established or transitioning to the abnormal state, based on the reception of the PDU session modification reject message and/or the reception of each identification information included in the PDU session modification reject message. Note that, a state to Which the state associated with the UE_A 10 transitions, based on the completion of the present procedure, is not limited to these states.

The first condition determination may be performed based on identification information and/or preference of the UE_A 10 and/or the policy of the UE_A 10 and/or the context held by the UE_A 10 included in the PDU session modification request message. Note that conditions with which true or false of the first condition determination is determined may not be limited to the previously described conditions.

2. Modifications

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage apparatus system.

Note that a program for realizing such functions of the embodiment according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. In a case that with advances in semiconductor technology, a circuit integration technology appears that replaces the present integrated circuits, one or multiple aspects of the present invention are also possible to use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 DN_A
10 UE_A
45 eNB_A
50 UDM_A
60 PCF_A
80 E-UTRAN_A
120 5G RAN_A
122 AN node_A
123 AN node_B
125 WLAN ANc
126 WAG_A
190 Core network_B
230 SMF_A
235 UPF_A
236 UPF_B
240 AMF_A

The invention claimed is:

1. A UE (User Equipment) comprising:
transmission and reception circuitry; and
a controller, wherein
a first procedure is performed, in order to change an anchor, for releasing a first existing PDU (Packet Data Unit) session after having established a second PDU session,
in the first procedure, the transmission and reception circuitry is configured for
receiving a NAS (Non-Access Stratum) message which is transmitted from an apparatus in a core network, based on determining that the anchor needs to be changed, and
the controller is configured for
initiating a UE-requested PDU session establishment procedure, based on receiving the NAS message, wherein
the NAS message includes information indicating time until the first existing PDU session is released, and
in the UE-requested PDU session establishment procedure, the transmission and reception circuitry is further configured for:
transmitting, to the core network, information indicating the first existing PDU session and information indicating the second PDU session and a PDU session establishment request message containing information indicating that the UE supports an establishment of a multi homed PDU session; and
receiving, from the core network, a RA (Router Advertisement) message containing Route Preference information.

2. The UE according to claim 1, wherein the controller is further configured for:
starting a PDU session release procedure by transmitting, to the apparatus in the core network, a PDU session release request message including the information indicating the first existing PDU session after completion of the UE-requested PDU session establishment procedure.

3. An apparatus in a core network comprising:
transmission and reception circuitry, wherein
a first procedure is performed, in order to change an anchor, for releasing a first existing PDU (Packet Data Unit) session after having established a second PDU session,
in the first procedure, the transmission and reception circuitry is configured for:
transmitting, to a UE (User Equipment), a NAS (Non-Access Stratum) message, based on determining that the anchor needs to be changed; and
receiving a PDU session establishment message in a UE-requested PDU session establishment procedure initiated by the UE, based on the NAS message,
wherein
the NAS message includes information indicating time until the first existing PDU session is released, and
in the UE-requested PDU session establishment procedure, the transmission and reception circuitry is further configured for:
receiving information indicating the first existing PDU session and information indicating the second PDU session and a PDU session establishment request message containing information indicating that the UE supports an establishment of a multi homed PDU session; and
transmitting, to the UE, a RA (Router Advertisement) message containing Route Preference information.

4. The apparatus in the core network according to claim 3, wherein the transmission and reception circuitry is further configured for:
receiving, from the UE, a PDU session release request message including the information indicating the first existing PDU session after completion of the UE-requested PDU session establishment procedure.

* * * * *